(12) United States Patent
Ruan et al.

(10) Patent No.: US 11,627,444 B2
(45) Date of Patent: Apr. 11, 2023

(54) VEHICLE-TO-EVERYTHING SESSION AND SERVICE CONTINUITY IN AUTOMOTIVE EDGE COMPUTING SYSTEMS

(71) Applicant: Intel Corporation, Santa Clara, CA (US)

(72) Inventors: Leifeng Ruan, Beijin (CN); Soo Jin Tan, Shanghai (CN); Xiaopeng Tong, Beijing (CN); Dario Sabella, Munich (DE); Qian Li, Beaverton, OR (US); Zongrui Ding, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 16/981,661

(22) PCT Filed: Jun. 5, 2019

(86) PCT No.: PCT/US2019/035660
§ 371 (c)(1),
(2) Date: Sep. 16, 2020

(87) PCT Pub. No.: WO2019/236755
PCT Pub. Date: Dec. 12, 2019

(65) Prior Publication Data
US 2021/0099848 A1    Apr. 1, 2021

Related U.S. Application Data

(60) Provisional application No. 62/791,636, filed on Jan. 11, 2019, provisional application No. 62/758,382, filed on Nov. 9, 2018.

(30) Foreign Application Priority Data

Jun. 6, 2018 (WO) ................ PCT/CN2018/090081

(51) Int. Cl.
*H04W 4/44* (2018.01)
*H04W 36/00* (2009.01)
(Continued)

(52) U.S. Cl.
CPC ............. *H04W 4/44* (2018.02); *H04W 8/205* (2013.01); *H04W 36/0033* (2013.01);
(Continued)

(58) Field of Classification Search
CPC ... H04W 4/44; H04W 8/205; H04W 36/0033; H04W 36/0079; H04W 36/03;
(Continued)

(56) References Cited

U.S. PATENT DOCUMENTS 10,687,175 B2 * 6/2020 Kim .................. H04W 74/0833
10,972,913 B2 * 4/2021 Kim ...................... H04W 76/27
(Continued)

FOREIGN PATENT DOCUMENTS

| CN | 107846708 A | 3/2018 |
|----|---|---|
| WO | WO 2017-030348 A1 | 2/2017 |
| WO | WO 2017-189035 A1 | 11/2017 |

OTHER PUBLICATIONS

Lien, Shao-Yu, et al. "Low latency radio access in 3GPP local area data networks for V2X: Stochastic optimization and learning." IEEE Internet of Things Journal 6.3 (2018) (Year: 2018).*
(Continued)

*Primary Examiner* — Sharad Rampuria
(74) *Attorney, Agent, or Firm* — Schwabe, Williamson & Wyatt, P.C.

(57) ABSTRACT

Systems, apparatuses, methods, and computer-readable media, are provided for managing background data transfer sessions based on network events monitored by one or more network elements. Embodiments may be relevant to multi-access edge computing (MEC) and Automotive Edge Com-
(Continued)

puting Consortium (AECC) technologies. Other embodiments may be described and/or claimed.

23 Claims, 22 Drawing Sheets

(51) Int. Cl.
- *H04W 8/20* (2009.01)
- *H04W 84/04* (2009.01)
- *H04W 88/18* (2009.01)

(52) U.S. Cl.
CPC ....... *H04W 36/0079* (2018.08); *H04W 36/03* (2018.08); *H04W 84/042* (2013.01); *H04W 88/18* (2013.01)

(58) Field of Classification Search
CPC . H04W 84/042; H04W 88/18; H04W 36/305; H04W 4/40; H04W 24/00; H04B 3/46; H04B 17/00; H04L 43/00; H04L 43/50
See application file for complete search history.

(56) References Cited

U.S. PATENT DOCUMENTS

| | | | |
|---|---|---|---|
| 11,096,036 B2* | 8/2021 | Poornachandran ... | H04W 24/08 |
| 11,234,204 B2* | 1/2022 | Ding ................. | G07C 5/008 |
| 2017/0201461 A1* | 7/2017 | Cheng ................. | H04L 47/286 |
| 2018/0049274 A1* | 2/2018 | Kim ................... | H04W 36/245 |
| 2019/0150082 A1* | 5/2019 | Kedalagudde ......... | H04W 4/46 370/329 |
| 2019/0174449 A1* | 6/2019 | Shan ................... | H04W 60/00 |
| 2019/0289610 A1* | 9/2019 | Ju ....................... | H04L 65/1036 |

OTHER PUBLICATIONS

Wang, Haoxin, et al. "Architectural design alternatives based on cloud/edge/fog computing for connected vehicles." IEEE Communications Surveys & Tutorials 22.4 (2020): 2349-2377. (Year: 2020).*

Extended European Search Report dated Feb. 9, 2022 for European Application No. 19814505.4, 10 pages.

"Mobile Edge Computing (MEC); Framework and Reference Architecture", Apr. 6, 2018, pp. 1-19, ETSI Draft Specification; MEC 003, European Telecommunications Standards Institute (ETSI), vol. ISG MEC Multi-access Edge Computing, No. V2.0.2, France.

Anonymous: "General Principle and Vision", Dec. 1, 2017, pp. 1-19, Automotive Edge Computing Consortium , White Paper, V.1.0.0.

ZTE Corporation: "MEC0018 v0.3.0 draft", Mar. 22, 2017, pp. 1-50, ETSI Draft; MEC(17)000220, European Telecommunications Standards Institute (ETSI),vol. ISG—MEC—Mobile-Edge Computing, France.

International Search Report and Written Opinion dated Sep. 27, 2019 for International Patent Application No. PCT/US2019/035660, 12 pages.

AECC, "General Principle and Vision", Automotive Edge Computing Consortium, White Paper, Version 1.0.0, Feb. 22, 2018, 19 pages, [retrieved on Sep. 9, 2019]. retrieved from <https://aecc.org/wp-content/uploads/2017/12/AECC_Whitepaper_v1.0.0.pdf> See sections 1.1-5; and figure 3.

AECC, "General Principal and Vision", Automotive Edge Computing Consortium, White Paper, Version 2.0.0, Apr. 25, 2018, 15 pages.

AECC, "General Principal and Vision", Automotive Edge Computing Consortium, White Paper, Version 2.1.0, Dec. 25, 2018, 15 pages.

Juniper Research, "Exploring Mobility-as-a-Service (MaaS)—The New Era of Urban Mobility", Aug. 13, 2018, 23 pages.

Koya Mori, "Global Standardization Activities—Automotive Edge Computing Consortium—a Global Effort to Develop a Connected Car Platform", Jun. 2018, 4 pages, vol. 16, No. 6.

3GGP, "3rd Generation Partnership Project;Technical Specification Group Services and System Aspects; Architecture enhancements for control and user plane separation of EPC nodes Stage 2 (Release 15)", 3GPP TS 23.214 V15.2.0; Mar. 2018, 92 pages.

3GGP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.3.0, Mar. 2018, 405 pages.

3GPP, "3rd Generation Partnership Project; Technical Specification Group Services and System Aspects;System Architecture for the 5G System; Stage 2 (Release 15)", 3GPP TS 23.501 V15.1.0, Mar. 2018, 201 pages.

3GPP, "3rd Generation Partnership Project; Technical Specification Group Services and System Aspects; Procedures for the 5G System; Stage 2 (Release 15)", 3GPP TS 23.502 V15.1.0, Mar. 2018, 285 pages.

3GPP, "3rd Generation Partnership Project; Technical Specification Group Services and System Aspects; Architecture enhancements to facilitate communications with packet data networks and applications (Release 15)", 3GPP TS 23.682 V15.4.0, Mar. 2018), 124 pages.

3GPP, "3rd Generation Partnership Project; Technical Specification Group Radio Access Network; Evolved Universal Terrestrial Radio Access Network (E-UTRAN); Architecture description (Release 15)", 3GPP TS 36.401 V15.0.0; Dec. 2017, 21 pages.

* cited by examiner

VEHICLE-TO-EVERYTHING SESSION AND SERVICE CONTINUITY IN AUTOMOTIVE EDGE COMPUTING SYSTEMS

RELATED APPLICATIONS

The present application is a national phase entry under 35 U.S.C. § 371 of Int'l App. No. PCT/US2019/035660 filed Jun. 5, 2019 entitled "VEHICLE-TO-EVERYTHING SESSION AND SERVICE CONTINUITY IN AUTOMOTIVE EDGE COMPUTING SYSTEMS", which designated, among the various States, the United States of America, which claims priority to, and/or is a continuation of, Int'l App. No. PCT/CN2018/090081 filed Jun. 6, 2018, U.S. Provisional App. No. 62/758,382 filed on Nov. 9, 2018, and U.S. Provisional App. No. 62/791,636 filed on Jan. 1, 2019, the contents of each of which are hereby incorporated by reference in their entireties.

FIELD

Various embodiments of the present application generally relate to the field of wireless communications, and in particular to Multi-access Edge Computing (MEC) technologies for supporting vehicle-to-everything (V2X) data session and service continuity.

BACKGROUND

Mobile communication in vehicles is increasing in importance for applications/services to make driving safer, improve traffic flow, provide energy consumption efficiencies, and reduce emissions. Several emerging services, such as intelligent driving, the creation of maps with real-time data and driving assistance based on cloud computing, may require vehicles to be connected to a cloud computing service and one or more networks to facilitate the transfer of large amounts of data among vehicles and between vehicles and the cloud. Cellular networks may provide mobile connectivity for vehicles, and 3GPP has produced standards for vehicle-based mobile networks. Current 3GPP standards for vehicle-based mobile networks (e.g., cellular V2X) mainly covers latency-sensitive safety applications and may not fully ensure the big data capacity growth between vehicles and the cloud.

Automotive Edge Computing Consortium (AECC) is a consortium for supporting network and computing infrastructure needs of automotive big data. AECC focuses on increasing network and computing capacity to accommodate automotive big data between vehicles and the cloud using edge computing and efficient system design. The AECC system architecture being developed lacks mechanisms for initiating and supporting V2X data session and service continuity at the application level, such as when a vehicle user equipment attaches to a new communication network. The AECC system architecture also lacks mechanisms to support V2X data session and service continuity across multiple edge servers in a multi-radio access technology (RAT) environment.

DETAILED DESCRIPTION

In the detailed description to follow, for ease of understanding, the present disclosure will be presented in the context of the AECC system being developed. However, the present disclosure is not limited to AECC compliant system only, and may be practiced in any AEC system in general. In the AECC system being developed, a vUE can access services from a Mobility Service Provider (MSP) center server via one of a plurality of MSP edge servers, each of which are communicatively coupled with a respective network. Each network may utilize different RATs and/or may be operated by different mobile network operators (MNOs). The MSP center server may be or represent, for example, a service provider platform, a cloud computing service, or the like. The MSP edge servers may be one or more application servers, Content Delivery Network (CDN) servers, MEC servers/hosts, or some other like server deployed at the "edge" of a network. In other words, the AECC system sits on top of an existing network access technology (e.g., LTE, 5G/NR, WiFi/DSRC, etc.). In embodiments, registration, session management, and service continuity related signaling procedures are managed by the MSP center server. The MSP center server monitors cellular network status, and initiates background data transfer sessions including start, resume, and stop actions.

I. Automotive Edge Computing Consortium (AECC) Aspects

Figure 1:
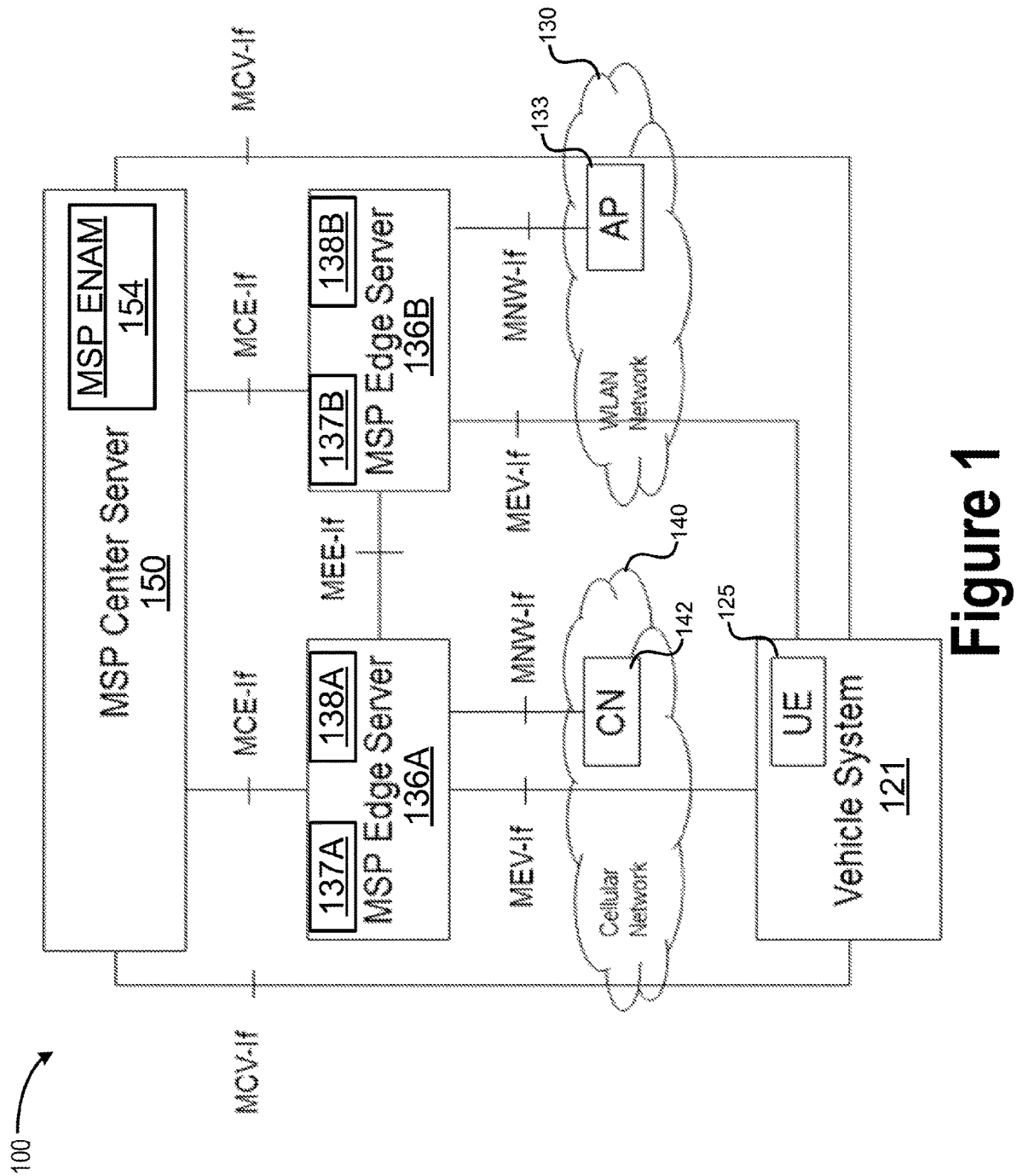
FIG. 1 illustrates an example AECC distributed cloud (or edge) computing architecture according to various embodiments.

Referring now to FIG. 1, which illustrates an example AECC system 100 according to various embodiments. The AECC system 100 maybe built on a distributed computing and networking architecture, which includes the vehicle system 121; one or more networks including the cellular network 140, the wireless local area network (WLAN) 130, a Mobility Service Provider (MSP) enterprise network (not shown by FIG. 1); and MSP servers including the MSP center server 150 and the MSP edge servers 136A and 136B (collectively referred to as "MSP edge servers 136" or "MSP edge server 136"). MSP edge servers 136A and 136B are respectively disposed at an edge of a communication network. For the purposes of the present disclosure, the "edge" of the communication network refers to the outermost part of a communication network that a client or user equipment connects to, and does not include the client or user equipment itself. In some embodiments, the AECC system 100 may be a cloud computing service used to run applications as needed.

As shown by FIG. 1, the MSP center server 150 is connected with individual MSP edge servers 136 via respective MCE-If reference points (discussed in more detail infra). In embodiments, the MSP center server 150 may include network interface circuitry (e.g., network controller circuitry 1335 of FIG. 13) coupled with processing circuitry (e.g., application circuitry 1305 of FIG. 13). The network interface circuitry may be arranged to communicatively couple the MSP center server 150 with the plurality of MSP edge servers 136. The processing circuitry is arranged to operate an MSP edge node allocation module (ENAM 154), which is an entity that manages data session and service continuity, and in particular, V2X data sessions and service continuity, for the vehicle system 121 (or vUE 125) across multiple MSP edge servers 136 in a multi-RAT environment, such as AECC system 100. For example, the processor circuitry may operate the MSP ENAM 154 to select an individual MSP edge server 136 of the plurality of MSP edge servers 136 to which traffic, computational tasks, and/or workloads of an individual vehicle system 121 (or vUE 125) should be offloaded, provision the individual vehicle system 121 (or vUE 125) with edge server information of the selected MSP edge server 136, provision the selected MSP edge server 136 with vehicle system 121 (or vUE 125) information, and handle/control MSP edge server 136 handover operations. The selection of an individual MSP edge server 136 is based on receipt of an access network selection message and/or an access network reselection message from the vehicle system 121 (or vUE 125), and/or the compute capabilities of the MSP edge servers 136 or the services provided by the MSP edge servers 136. These and other aspects are discussed in more detail infra with respect to FIGS. 3-7. In some implementations, the MSP center server 150 may be a content delivery network (CDN), a cloud service provider, and/or some other distributed computing platform.

Each of the plurality of MSP edge servers 136, as described earlier, are disposed at an edge of a corresponding communication network, and are arranged to provide network services and/or computing resources (e.g., computational task and/or workload offloading, cloud-computing capabilities, information technology (IT) services, and other like resources and/or services as discussed infra) in relatively close proximity to vehicle systems 121 and/or vehicle user equipment (vUEs) 125. In embodiments, the MSP center server 150 may include processing circuitry (e.g., application circuitry 1305 of FIG. 13) and network interface circuitry (e.g., network controller circuitry 1335 of FIG. 13) coupled with the processor circuitry. The network interface circuitry may be arranged to communicatively couple each MSP edge server 136 with a respective access network (e.g., cellular network 140 and WLAN network 130 in FIG. 1). In FIG. 1, the MSP edge server 136A is connected with the cellular core network (CN) 142 via a first MNW-If reference point, and MSP edge server 136B is connected with the access point (AP) 133 in the WLAN 130 via a second MNW-If reference point. Although FIG. 1 shows a one-to-one correspondence between MSP edge servers 136 and access networks, in some implementations, one or more MSP edge servers 136 may be communicatively coupled with multiple access networks. In some implementations, the MSP edge servers 136 may be edge computing servers, such as MEC servers (see e.g., FIGS. 8-10), CDN servers, application servers, and/or other like infrastructure equipment.

Each of the MSP edge servers 136 are also connected with the vehicle system 121 via respective MCV-If reference points. In addition, the MSP edge servers 136 are connected with each other via an MEE-If reference point (the MSP edge servers 136 may also connect with other MSP edge servers 136 via other MEE-If reference points, which are not shown by FIG. 1). Furthermore, the MSP center server 150 is connected with the vehicle system 121 via individual MCV-if reference points of respective networks 140 and 130. Although not shown by FIG. 1, the AECC system 100 may serve multiple vehicle systems 121.

The vehicle system 121 may be or may include a vehicle UE ("vUE") 125 capable of attaching to one of the networks 130 and 140, and communicating with the MSP edge servers 136 over the cellular network 140 or the WLAN 130 via individual MEV-If reference points. In some embodiments, the vehicle system 121 or the vUE 125 may include or operate a mobile communications module ("Mobile Comms Module") (not shown by FIG. 1), which is an application running in the vehicle system 121 (or vUE 125) that has the capability to interact with the MSP servers 150, 136 and/or other elements/devices in the AECC system 100. For example, in some embodiments, the vUE 125 may include baseband circuitry (e.g., baseband circuitry 1410 of FIG. 14) arranged to operate at least one wireless communication protocol entity to perform an attachment procedure to attach to an access network, and the vehicle system 121 or the vUE 125 may include application circuitry (e.g., processor circuitry 1402 of FIG. 14) communicatively coupled with the baseband circuitry. The application circuitry may be arranged to operate the Mobile Comms Module (also referred to as an "edge networking application" or the like) to register with the MSP center server 150 for accessing computational resources and/or edge networking services from the MSP edge server(s) 136. In some implementations, the Mobile Comms Module may be an internet layer or application layer entity (or application) that operates ontop of the access network technology (or control plane protocol stack), which is operated by the vUE 125 to attach to the cellular network 140 or the WLAN 130. In MEC implementations (e.g., where at least the MSP servers 136 are MEC servers), the Mobile Comms Module may be a device application, a client application, or a combination thereof. In some implementations, vUE 125 may include multiple baseband chips for connecting with individual access networks. For example, the vUE 125 may include a cellular network baseband System-on-Chip (SoC) for attaching to and receiving network connectivity from cellular network 140 and a WiFi based baseband SoC for attaching to and receiving network connectivity from WLAN 130. In another example, the vUE 125 may include a first cellular network baseband SoC associated with a first mobile network operator (MNO) and a second cellular network SoC associated with a second MNO different than the first MNO. In another example, the vUE 125 may include a cellular network baseband SoC configured with a first subscriber identity module (SIM) associated with a first MNO used to connect with and receive network services from a first cellular network, and the cellular network SoC may be configured with a second SIM associated with a second MNO different than the first MNO in order to connect with and receive network services from a second cellular network.

The vehicle system 121 may also perform data gathering and pre-processing, and is responsible for the access interfaces to the cellular network 140, WLAN 130, and/or other networks. In some embodiments, the vehicle system 121 or the vUE 125 may include or operate a data plane (DP) module (not shown by FIG. 1) for performing background data transfer operations with the MSP edge servers 136. The background data transfer procedure is a procedure used to transmit data between vehicle system 121 and an MSP edge server 136 over an Access Network, which can be initiated by MSP edge server 136 or the vehicle system 121. The DP module may be an internet layer or application layer entity that operates ontop of the access network technology (or user plane protocol stack) operated by the vUE 125 to communicate data to/from the cellular network 140 or the WLAN 130

The cellular network 140 may be a 5th generation (5G) or New Radio (NR) cellular network where the CN 142 is a 5G core network (5GC), or the cellular network 140 may be a Long Term Evolution (LTE) cellular network where the CN 142 is an evolved packet core (EPC). In some implementations, the cellular network 140 may be a non-standalone NR deployment, such as Evolved Universal Mobile Telecommunications Service Terrestrial Radio Access (E-UTRA)-NR Dual Connectivity (EN-DC) wherein the vUE 125 is connected to one evolved nodeB (eNB) that acts as a master node (MN) and one 5G or next generation nodeB (gNB) that acts as a secondary node (SN); NG-RAN E-UTRA-NR Dual Connectivity (NGEN-DC) wherein the vUE 125 is connected to one next generation eNB (ng-eNB) that acts as an MN and one gNB that acts as a SN; and NR-E-UTRA Dual Connectivity (NE-DC) wherein the vUE 125 is connected to one gNB that acts as an MN and one ng-eNB that acts as an SN. The vUE 125 uses an NR-Uu radio interface when the cellular network 140 is an NR/5G network, and the vUE 125 uses an LTE-Uu radio interface when the cellular network 140 is an LTE network.

The WLAN 130 may be a WiFi access technology based on the IEEE 802.11 standard or may be a 3GPP-based access technology (e.g., NR millimeter wave (mmWave) carriers).

In some implementations, the WLAN 130 may connect to the CN 142 and/or connect to an internet service provider (ISP) network. In some implementations, the vUE 125 may connect to an MSP enterprise network (not shown by FIG. 1), which may be a WiFi (IEEE 802.11) network or use a 3GPP-based access technology. In such implementations, the MSP enterprise network may include its own core network based on proprietary technology or 3GPP based CN technology. In some implementations, the MSP enterprise network may be a dedicated core network (DCN) or a Network Slice Subnet Instance (NSSI) comprising dedicated CN entities or network functions for carrying out various MSP functionality.

Data pre-processing is (or is also) done in the MSP edge servers 136 that communicate with the vehicle system 121 via the MEV-If and with other MSP edge servers 136 via the MEE-If. The MSP edge servers 136 may be deployed or located at suitable locations within the AECC system 100 (referred to as the network edge) where the balance between performance, efficiency, and availability is dependent on the particular use case, and may be different from embodiment to embodiment. Each of the MSP edge servers 136 include a respective control plane (CP) modules 137 (e.g., CP module 137A in MSP edge server 136A and CP module 137B in MSP edge server 136B) and respective data plane (DP) modules 138 (e.g., DP module 138A in MSP edge server 136A and DP module 138B in MSP edge server 136B). The CP modules 137 may be software elements (e.g., engines, modules, objects, or other like logical units) that, when executed by suitable processing device(s) of a corresponding MSP edge server 136, perform functions for handling provisioning of UE information by the MSP center server 150 (see e.g., operation 308 of FIG. 3); for subscribing to a suitable network function(s) (NF(s)) in the cellular network 140 and/or the WLAN 130 for notifications regarding network (NW) and/or vehicle system 121/vUE 125 related events (see e.g., operation 310 of FIG. 3), as well as handling received event notifications from the suitable NF(s); and for handling MSP edge server handover (HO) related procedures/operations (see e.g., operations 416-418 of FIG. 4). The DP modules 138 may be software elements (e.g., engines, modules, objects, or other like logical units) that, when executed by suitable processing device(s) of a corresponding MSP edge server 136, perform functions for performing background data transfers between the corresponding MSP edge server 136 and the vehicle system 121/vUE 125. Although not shown by FIG. 1, the vehicle system 121 (or the vUE 125) may also include its own DP module for performing background data transfers with an MSP edge server 136.

The MSP edge server 136A communicates with the cellular network 140 or the CN 142 (e.g., one or more network elements within the CN, such as a User plane Function (UPF), Service Capability Exposure Function (SCEF), Network Exposure Function (NEF)) via the MNW-If. In some implementations, the MNW-If may correspond to a T8 reference point or the SGi reference point when the CN 142 is an EPC, or the MNW-If may correspond to the N33 reference point (e.g., Nnef service-based interface) or the N6 interface/reference point when the CN is a 5GC. For the WLAN 130, the MNW-If may be some other suitable proprietary interface.

As discussed previously, the MSP center server 150 is communicatively coupled with MSP edge servers 136 via respective MCE-If reference points/interfaces, the MSP center server 150 is communicatively coupled with the vehicle system 121 via MCV-If points/interfaces, the MSP edge servers 136 are communicatively coupled with the vehicle system 121 via respective MEV-If reference points/interfaces, the MSP edge servers 136 are communicatively coupled with a respective access network (or network element) via respective MNW-If reference points/interfaces, and the MSP edge servers 136 are communicatively coupled with one another via MEE-If reference points/interfaces. For the purposes of the present disclosure, a reference point represents the interaction that exists between two or more elements described by a point-to-point reference point between any two elements. Communications taking place over a reference point may be direct (where no intermediate nodes are involved) or indirect (where at least one intermediate node is involved). The direct communication over a reference point may be based on a consumer (or subscriber)/producer model where a consumer is configured with a producer's profile and directly communicates with that producer. The indirect communication over a reference point may also be based on a consumer (or subscriber)/producer model where a consumer queries an intermediate node, selects an end point (or termination point), and the consumer sends the request to the selected producer via the intermediate node. In various embodiments, these reference points/interfaces may operate ontop of an existing wired/wireless communication protocol, such as those discussed herein or one or more proprietary communication protocols. Moreover, the vehicle system 121 (or vUE 125) can use multiple cellular networks operated by different MNOs as is shown by FIG. 2A.

Figure 2A:
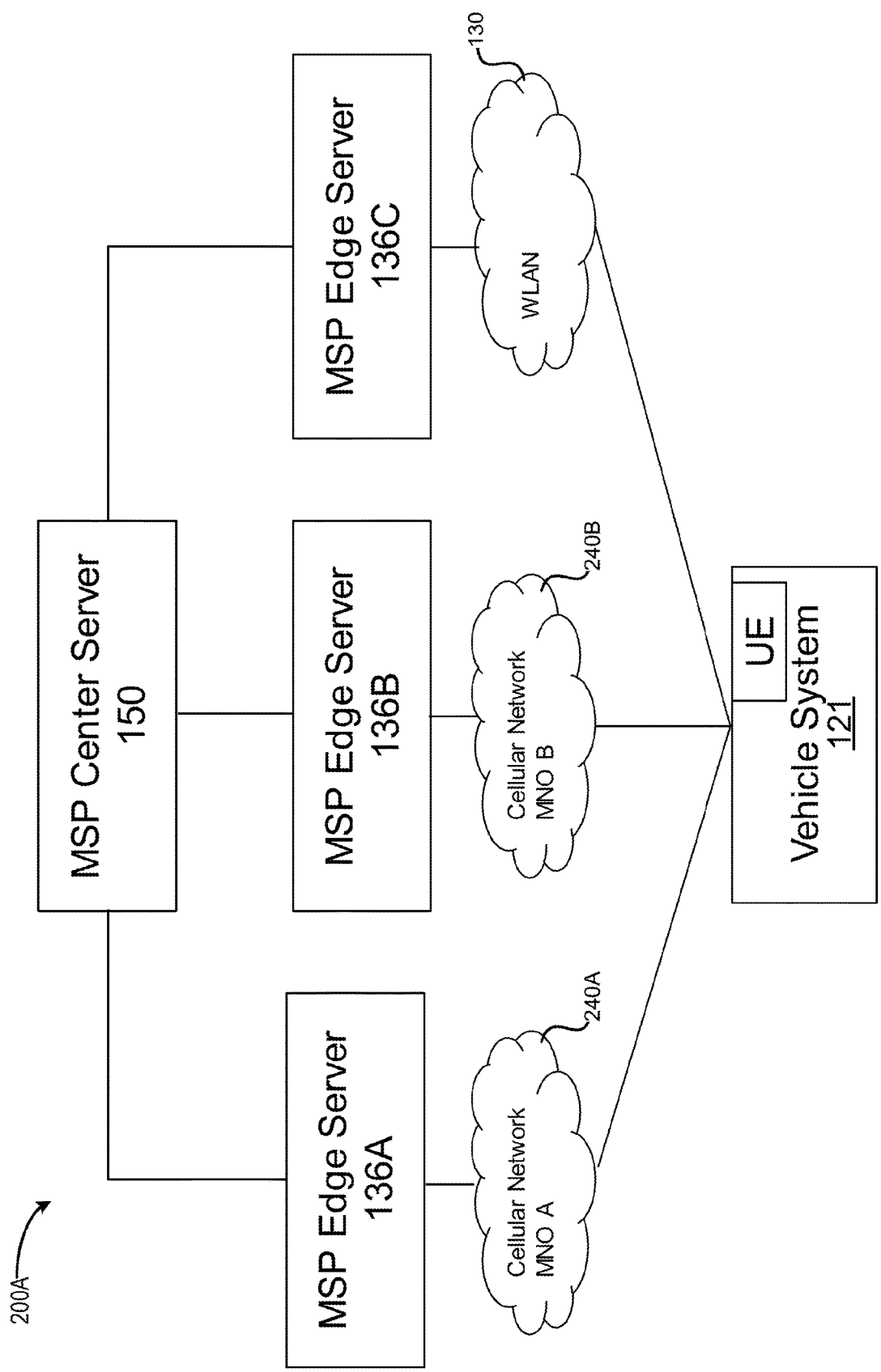
FIG. 2A illustrates another example of the AECC distributed cloud (or edge) computing architecture according to various embodiments.

FIG. 2A illustrates another example of the AECC system 200A according to various embodiments. In this example, the vehicle system 121 communicates with an MSP Edge Server 136A via a cellular network 240A associated with a mobile network operator (MNO) A, communicates with an MSP edge server 136B via a second cellular network 240B associated with an MNO B, and communicates with an MSP edge server 136C via WLAN 130. Each of the MSP edge servers 136A-C are communicatively coupled with the MSP center server 150 in a same or similar as discussed previously with respect to FIG. 1. In some embodiments, the WLAN 130 may be used when the cellular networks 240A-B are not available, and vice versa.

In an alternative embodiment, each MNO hosts (and eventually or potentially owns) individual MSP edge servers 136 so that the layered architecture of FIGS. 1 and 2 comprises two MSP edge servers 136 (e.g., MSP edge server 136 A and MSP edge server 136B) connected with one higher level MSP center server 150. This is because, in some cases, MNOs may have already deployed edge computing technology in their networks. In another embodiment, only one of the two MNOs deploys edge computing systems, while the other MNO only provides connectivity to an MSP edge server 136.

In embodiments, the AECC system 100 and 200A may be utilize or provide distributed computing on localized networks, where several localized networks accommodate the connectivity of vehicles 121 in their respective areas of coverage. A localized network is a local network that covers a limited number of connected vehicles 121 in a certain area. This splits the huge amount of data traffic into reasonable volumes per area of data traffic between vehicles and the cloud. In these embodiments, the MSP center server 150 may be in a cloud computing environment, and each localized network may include an access network and one or more MSP edge servers 136. In the example of FIG. 2A, a first localized network may include the MSP edge server 136A and cellular network 240A, a second localized network may include the MSP edge server 136B and cellular network 240B, and a third localized network may include the MSP edge server 136C and the WLAN 130. Computation power is added to these localized networks to enable them to process local data, allowing connected vehicles to obtain responses in a timely fashion. In these implementations, the MSP edge servers 136 provide distributed computing services and/or act as local data integration platforms, where computational resources are geographically distributed within the vicinity of one or more localized networks. This reduces the concentration of computation and shortens the processing time needed to conclude a transaction with a connected vehicle. Local data integration platforms integrate local data by utilizing a combination of one or more localized networks and distributed computation. By narrowing relevant information down to a specific area, data can be rapidly processed to integrate information and notify connected vehicles in real time.

Distributed computing on localized networks also encompasses edge computing technology. In automotive use cases, edge computing technology provides an end-to-end system architecture framework that enables distribution of computation processes over localized networks. The edge computing technology used for distributed computing on localized networks includes networking technology to split data traffic into several localities that cover a number of connected vehicles 121. The computational resources in the edge computing technology are hierarchically distributed and layered in a topology-aware fashion to accommodate localized data and to allow large volumes of data to be processed in a timely manner. In this infrastructure framework, localized data collected via local networks and wide area data stored in the cloud are integrated in the edge computing architecture to provide real-time information necessary for the services of connected vehicles 121. In the context of edge computing for automotive, the "edge" may refer to the hierarchically distributed non-central clouds where computation resources are deployed, and edge computing technology can be used to provide such a flexible topology-aware cloud infrastructure.

Unlike current AECC systems, the AECC systems 100 and 200A (including the distributed computing on localized networks discussed previously) include mechanisms for initiating and supporting V2X data session and service continuity at the application level, such as when the vehicle system 121 moves from or loses access to a access network (e.g., cellular network 240A) and reselects another access network (e.g., cellular network 240B or WLAN 130). In particular, in embodiments, the MSP center server 150 is incorporated with the V2X sessions and service continuity technology of the present disclosure to be described in more detail infra with references to FIGS. 3-7. Additionally, the AECC systems 100 and 200A include mechanisms for guaranteeing data connectivity across servers in multi-RAT environments. In 5G systems, session and service continuity (SSC) is supported by SSC mode. With SSC mode, the network preserves a connectivity service provided to a UE 121, which is an access network PDU session continuity guarantee mechanism. According to various embodiments, similar mechanisms to support V2×SSC between cellular and non-cellular networks is included in AECC system 100/200A.

Embodiments herein provide vehicle system 121 mechanisms for selecting among different access networks and service continuity across different MSP servers (in both cellular and non-cellular networks). According to various embodiments, the MSP center server 150 monitors cellular network 140/240, and initiates background data transfer sessions including start, resume, and stop actions. The registration and SSC related signaling procedures are managed by the MSP center server 150. The MSP center server 150 manages the registration/SSC signaling because signaling latency requirements are relaxed for AECC systems 100/200A, and the MSP center server 150 may provide coordination for source and target MSP edge servers 136. Allowing the MSP center server 150 to manage the registration and SSC signaling may be useful because MSP center servers 150 typically have no dependency on the access network with which a vehicle system 121 chooses to attach. According to various embodiments, the MSP center server 150 manages three different registration and SSC signaling procedures including an initial procedure for background data transfer (procedure 300 of FIG. 3); a Session and Service Continuity Procedure for cellular networks (procedure 400 of FIG. 4); and a Session and Service Continuity Procedure when moving to WLAN 136 (also procedure 400 of FIG. 4).

Figure 2B:
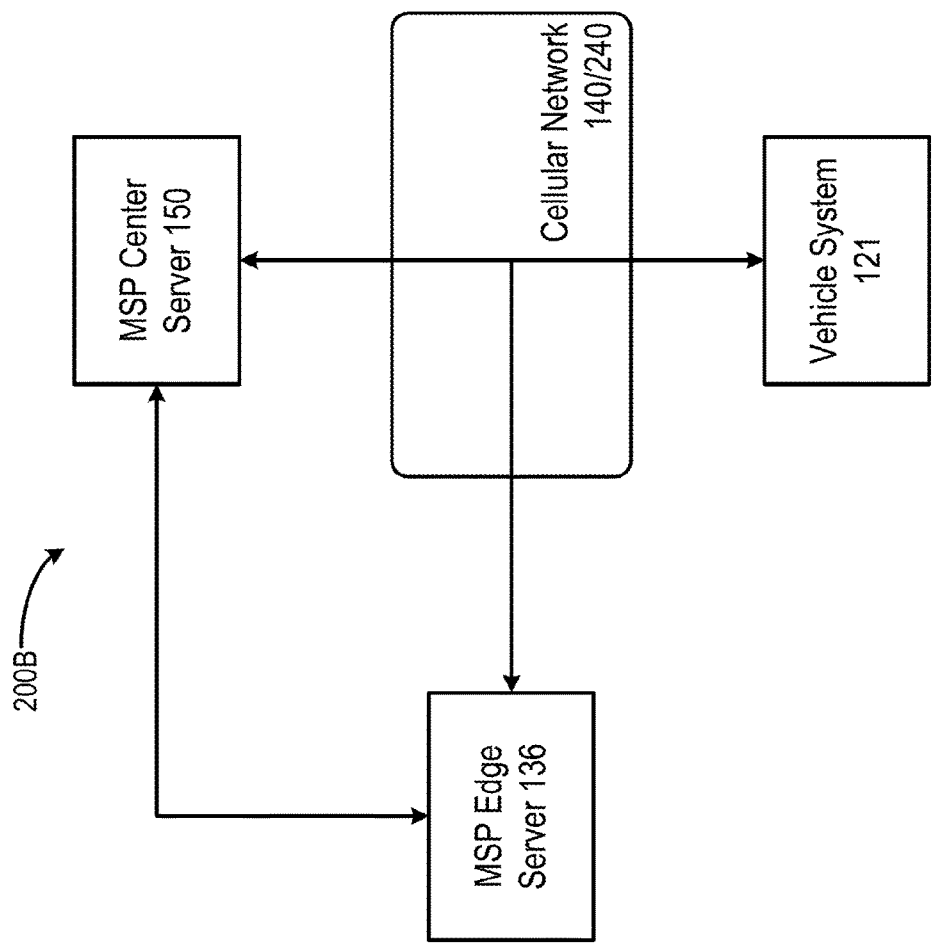
FIG. 2B illustrates another example of the AECC distributed cloud (or edge) computing architecture according to various embodiments.
Figure 3:
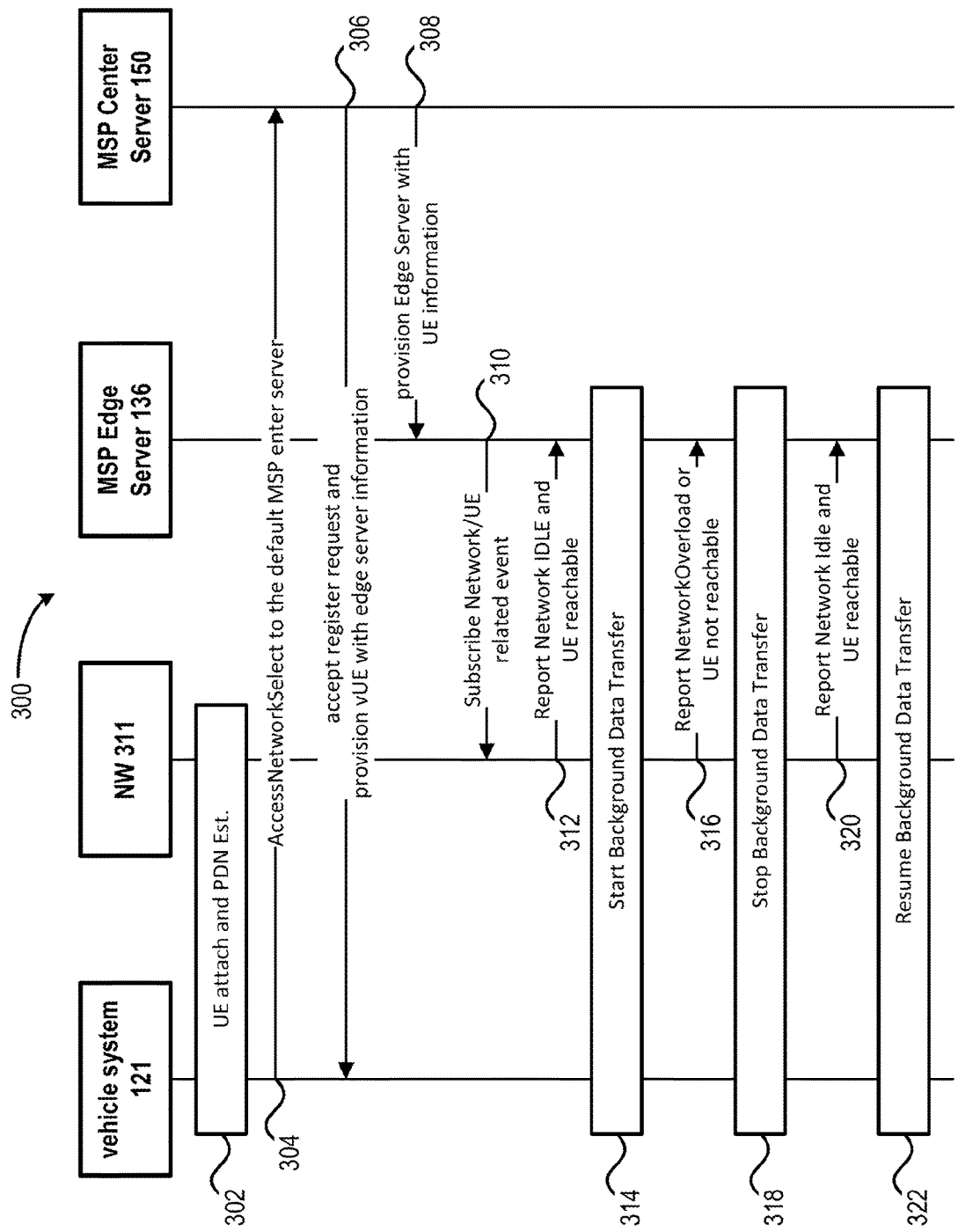
FIG. 3 depicts an example Initial Procedure for background data transfer according to various embodiments.

Referring now to FIG. 3, which illustrates an example Initial Procedure 300 for providing background data transfers between an MSP edge server 136 and a vehicle system 121 according to various embodiments. Procedure 300 begins at operation 302, where the vehicle system 121 (and/or the vUE 125) performs an attachment procedure and establishes a Packet Data Network (PDN) session with a network (NW) 311. The NW 311 may correspond to the CN 140/240 or the WLAN 136 of FIGS. 1 and 2. When the NW 311 is a CN 140/240, the vehicle system 121 (or vUE 125) sends an attach request message to the CN 140/240 for registration with the CN 140/240. In some embodiments, a default PDN connection is to be established during this procedure.

At operation 304, the vehicle system 121 (or the Mobile Comms Module operated by the vehicle system 121 or the vUE 125) sends an access network selection message (AccessNetworkSelectNotify) to the MSP center server 150 over an MCV-If reference point. According to default configured MSP center server information, The vehicle system 121 (or the Mobile Comms Module operated by the vehicle system 121 or the vUE 125) sends the AccessNetworkSelectNotify to the MSP center server 150 from an MSP application layer perspective. In response to receipt of the AccessNetworkSelectNotify, the MSP center server 150 (or the MSP ENAM 154) obtains vehicle system 121 identification (ID) information, access network registration information, and location information such as attached access network type or RAT type (e.g., EPS, 5G, or WLAN) and attached cellular network PLMNID, and/or other like information.

At operation 306, the MSP center server 150 (or the MSP ENAM 154) decides and selects the MSP edge server 136 for traffic load and computation distribution, and generates and sends a registration request acceptance/acknowledgement (ACK) message to provision the vehicle system 121 (or vUE 125) with MSP edge server information. This message may be sent over the MCV-If reference point. The MSP edge server information may include an IP address of the selected MSP edge server 136, compute capability of the selected MSP edge server 136 (e.g., High Definition Map (HDM) data processing, Intelligent Driving support, etc.), and/or other like information. At operation 308, the MSP center server 150 (or the MSP ENAM 154) sends UE information to the MSP edge server 136 over a corresponding MCE-If reference point, and/or provisions the MSP edge server 136 with the UE information. In some embodiments, a CP module 137 of the MSP edge server 136 may store the UE information for performing background data transfer operations (see e.g., operations 314-322).

At operation 310, the MSP edge server 136 (or CP module 137) subscribes to the NW 311 to monitor events. In embodiments, the MSP edge server 136 may send a subscribe message to the NW 311 over a corresponding MNW-If reference point. In one example, when the NW 311 is an EPS, the MSP edge server 136 (or CP module 137) subscribes to monitor events via the SCEF in the EPS CN. In another example, when the NW 311 is a 5GS, the MSP edge server 136 (or CP module 137) subscribes to monitor events via the NEF in the 5G CN. The events to be monitored include UE reachability, location of the vUE 125 and change in location of the vUE 125, loss of connectivity, Communication failure, roaming status and change in roaming status of the vUE 125, data plane communication failure (e.g., availability after DNN failure), number of vUEs 125 present in a geographical area, PDN connectivity status, network overload indication, change of SUPI-PEI association, downlink data delivery status, availability after Downlink Data Notification failure, CN type change, and/or other events. Details of the procedures related to subscribing to the cellular network 140/240 and monitoring events are discussed infra and at 3GPP technical specification (TS) 23.502 and 3GPP TS 23.682.

At operation 312, the NW 311 detects or otherwise determines that the NW 311 is idle and/or that the vehicle system 121/vUE 125 is reachable, and generates and sends a notification message to the MSP edge server 136 (or CP module 137) to indicate that the network is idle and the vehicle system 121/vUE 125 is reachable with DP communication working. At operation 313, the MSP edge server 136 (or DP module 138) starts background data transfers with the vehicle system 121/vUE 125. In embodiments, the DP module 138 may utilize the previously provisioned UE information for performing the background data transfer with the vehicle system 121/vUE 125 (see e.g., operation 308 discussed supra). Additionally, the vehicle system 121/vUE 125 may also operate a DP module that is the same or similar to the DP module 138 to perform the background data transfer procedures with the MSP edge server 136.

When the NW 311 detects a communication failure or network overload, at operation 316, the NW 311 generates and sends a notification message indicating the detected events to the MSP edge server 136 (or CP module 137). At operation 318, the MSP edge server 136 (or DP module 138) stops background data transfers with the vehicle system 121/vUE 125. The manner in which the MSP edge server 136 (or DP module 138) stops the background data transfer(s) may be based on the type of event reported by the NW 311 at operation 316 and may vary from embodiment to embodiment. When the NW 311 detects communication link recovery (i.e., that the vUE 125 is reachable again) and/or the NW 311 is otherwise idle again, at operation 320, the NW 311 generates and sends a notification message indicating the detected events to the MSP edge server 136 (or CP module 137). At operation 322, the MSP edge server 136 (or DP module 138) resumes the background data transfer(s) with the vehicle system 121/vUE 125. Additionally or alternatively, the DP module operated by the vehicle system 121/vUE 125 may perform one or more operations to resume the background data transfer procedure with the MSP edge server 136. In embodiments, the NW 311 may send the various notification messages (e.g., at operation 312, 316, and 320) to the MSP edge server 136 over the corresponding MNW-If reference point. After operation 322, procedure 300 may end or repeat as necessary.

Figure 4:
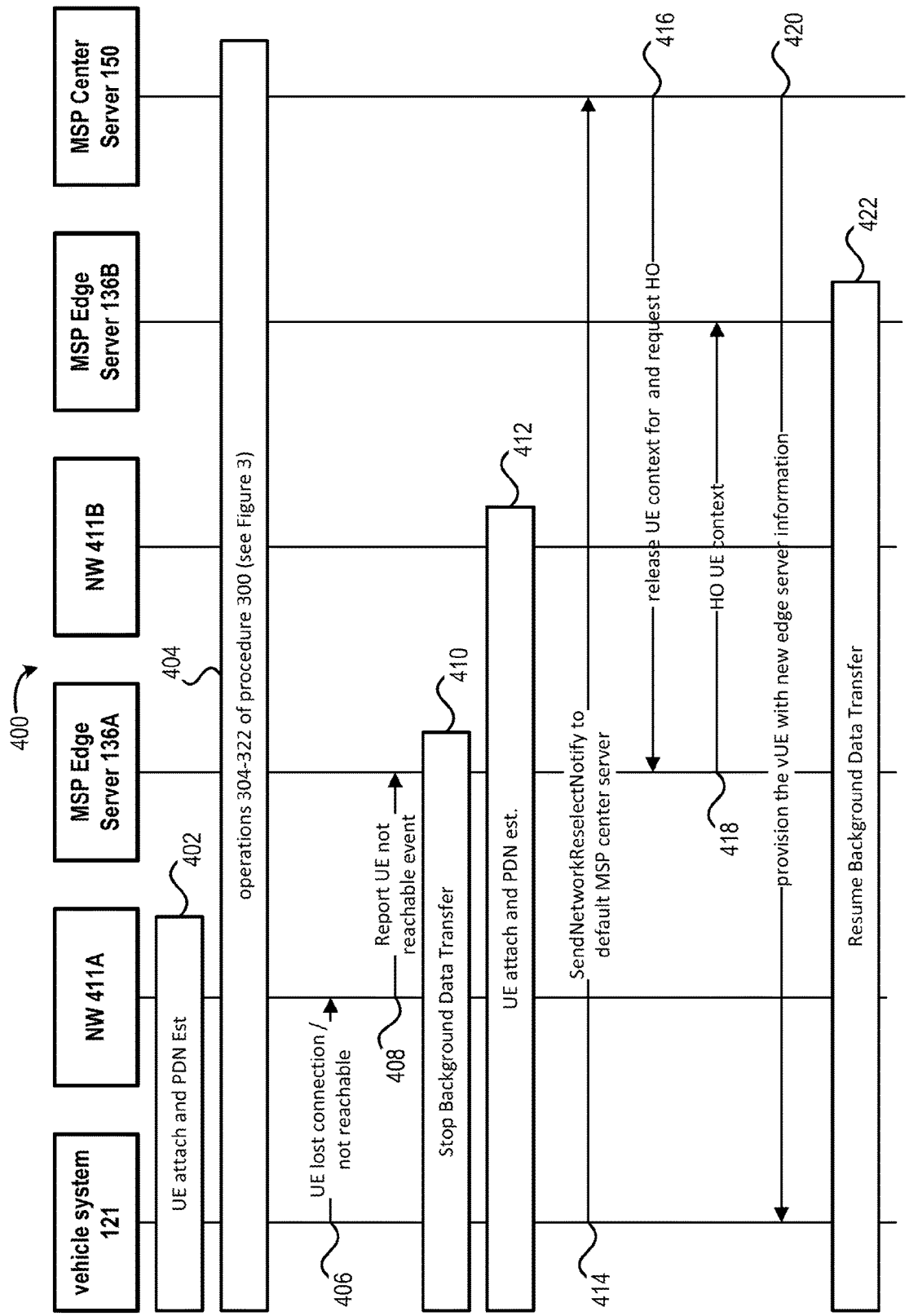
FIG. 4 depicts an example Session and Service Continuity Procedure according to various embodiments.

FIG. 4 depicts an example Session and Service Continuity Procedure 400 according to various embodiments. Procedure 400 begins at operation 402, where the vehicle system 121/vUE 125 performs an attachment procedure and establishes a PDN session with an NW 411A, The NW 411A may correspond to the CN 140/240 or the WLAN 136 of FIGS. 1 and 2. When the NW 411A is a cellular CN 140/240, the vehicle system 121 (or the vUE 125) sends an attach request message to the CN 140/240 for registration with the CN 140/240. In some embodiments, a default PDN connection is to be established during this procedure. Operation 404 involves performing the data transfer operations 304-322 of process 300 shown and described with regard to FIG. 3.

At operation 406, the vehicle system 121 (or vUE 125) loses the connection with NW 411A or is otherwise not reachable due to, for example, access network reselection, radio link failure, network overload, insufficient Quality of Service (QoS), and/or the like. When the NW 411A detects a communication failure, network overload, etc. (e.g., based on operation 406), the NW 411A generates and sends a notification message indicating the detected events to the MSP edge server 136A (or CP module 137A). The notification message may be sent to the MSB edge server 136A over a corresponding MNW-IF reference point. At operation 410, the MSP edge server 136A (or DP module 138A) stops background data transfers with the vehicle system 121/vUE 125. The manner in which the MSP edge server 136A (or DP module 138A) stops the background data transfer(s) may be based on the type of event reported by the NW 411A and may vary from embodiment to embodiment.

At operation 412, the vehicle system 121 (or vUE 125) attaches with NW 411B. The NW 411B may correspond to a different one of the CN 140/240 or the WLAN 136 of FIGS. 1 and 2 than the NW 411A. For example, the NW 411A may be a 5GS operated by MNO A and NW 411B may be a 5GS operated by MNO B. In another example, the NW 411A may be an EPS operated by MNO A and NW 411B may be a 5GS operated by MNO A or MNO B. In another example, the NW 411A may be an EPS/5GS operated by MNO A and NW 411B may be WLAN 136 (open or private). In another example, the NW 411A may be an enterprise WLAN 133 operated by an enterprise A and NW 411B may be an open or unrestricted WLAN 136.

At operation 414, the vehicle system 121 (or the Mobile Comms Module operated by the vehicle system 121 or the vUE 125) sends an access network reselection message (AccessNetworkReselectNotify) to the MSP center server 150 (or the MSP ENAM 154) over the MCV-If reference point. At operation 416, the MSP center server 150 (or MSP ENAM 154) selects the MSP edge server 136B as a target MSP edge server, and sends a request message to the MSP edge server 136A (or the CP module 137A) to release a UE context associated with the vehicle system 121 and handover (HO) to MSP edge server 136B. The handover request may be sent to the edge server 136B over a respective MCE-If reference point. The selection of the target MSP edge server may be based on current traffic load, computation distribution, and/or other like considerations. The UE context may be a data structure or database object that stores UE-related information of the vehicle system 121/vUE 125. For example, the UE context may store vehicle system 121/vUE 125 identifier(s), location or routing information for the vehicle system 121/vUE 125, and the associations between the vehicle system 121/vUE 125 and the connections used for communicating messages/data with the vehicle system 121/vUE 125. The UE context may also store background data transfer information/data, such as sequence numbers (SN) of one or more data packets transferred to, and/or received from, the vehicle system 121/vUE 125.

Other information may be included in the UE context in other embodiments.

At operation 418, the MSP edge server 136A (or the CP module 137A) hands over the UE context to MSP edge server 136B (or the CP module 137B) for session and service continuity. For example, the MSP edge server 136A may send its locally stored UE context associated with the vehicle system 121 (or vUE 125) to the MSP edge server 136B over an MEE-If reference point between the MSP edge server 136A and 136B. In embodiments, the MSP edge server 136B may perform the same or similar operations 310-322 of FIG. 3 in response to receipt of the UE context from the source MSP edge server 136A. At operation 420, the MSP center server 150 (or MSP ENAM 154) provisions the vehicle system 121/vUE 125 with MSP edge server information of the MSP edge server 136B via the MCV-If reference point, which may include the same or similar types of data/information as discussed previously with respect to FIG. 3. At operation 422, the MSP edge server 136B (or DP module 138B) resumes the background data transfer between the vehicle system 121 and the MSP edge server 136B via a corresponding MEV-If reference point between the vehicle system 121 (or vUE 125) and the MSP edge server 136B.

These embodiments enables the MSP center server 150 to manage the vehicle system 121 registration, session, and service continuity procedures, and has less dependence on the access network to which the vehicle system 121 chose to attach.

Figure 5:
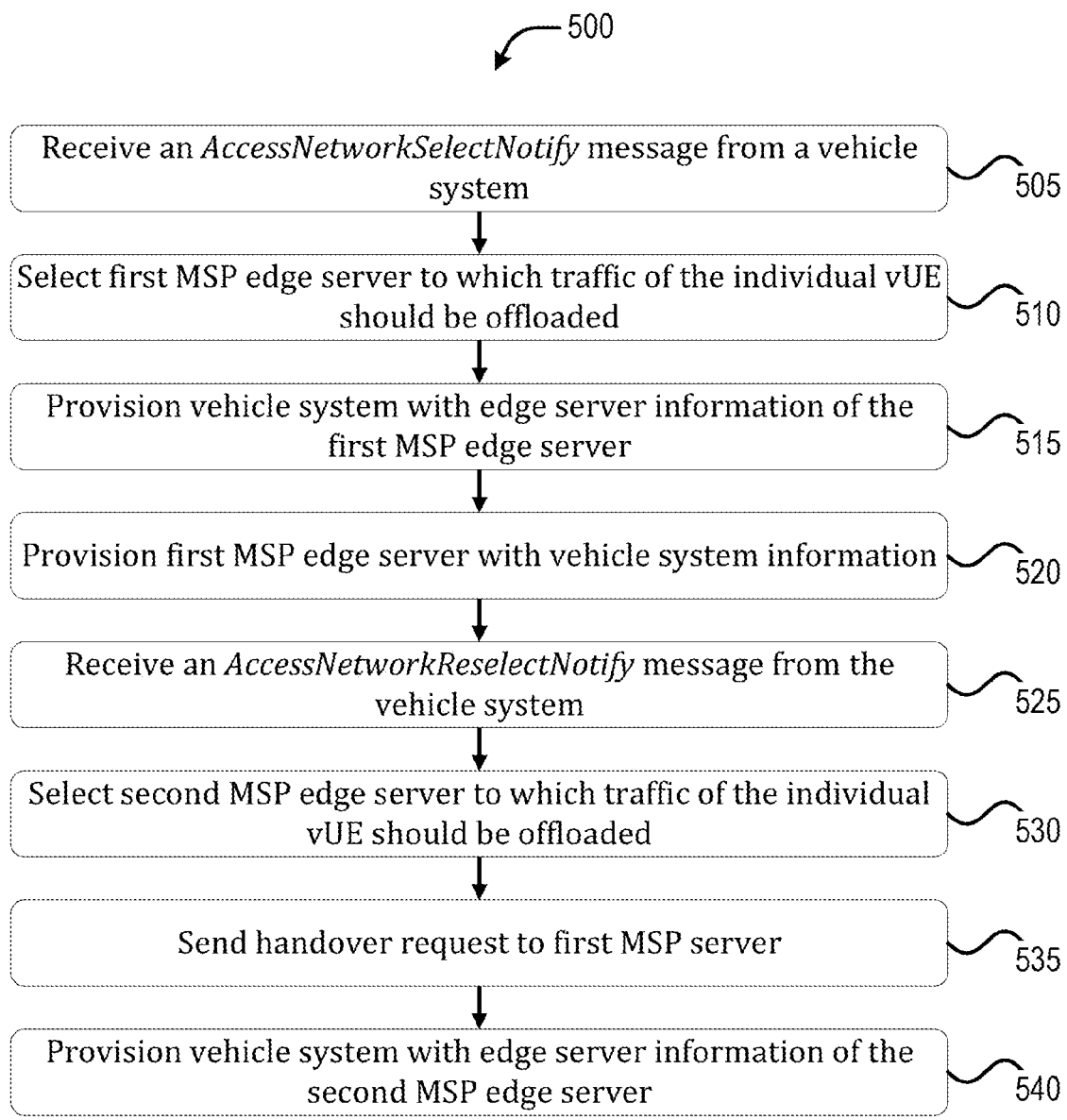
FIG. 5 shows an example procedure for practicing various embodiments herein.
Figure 6:
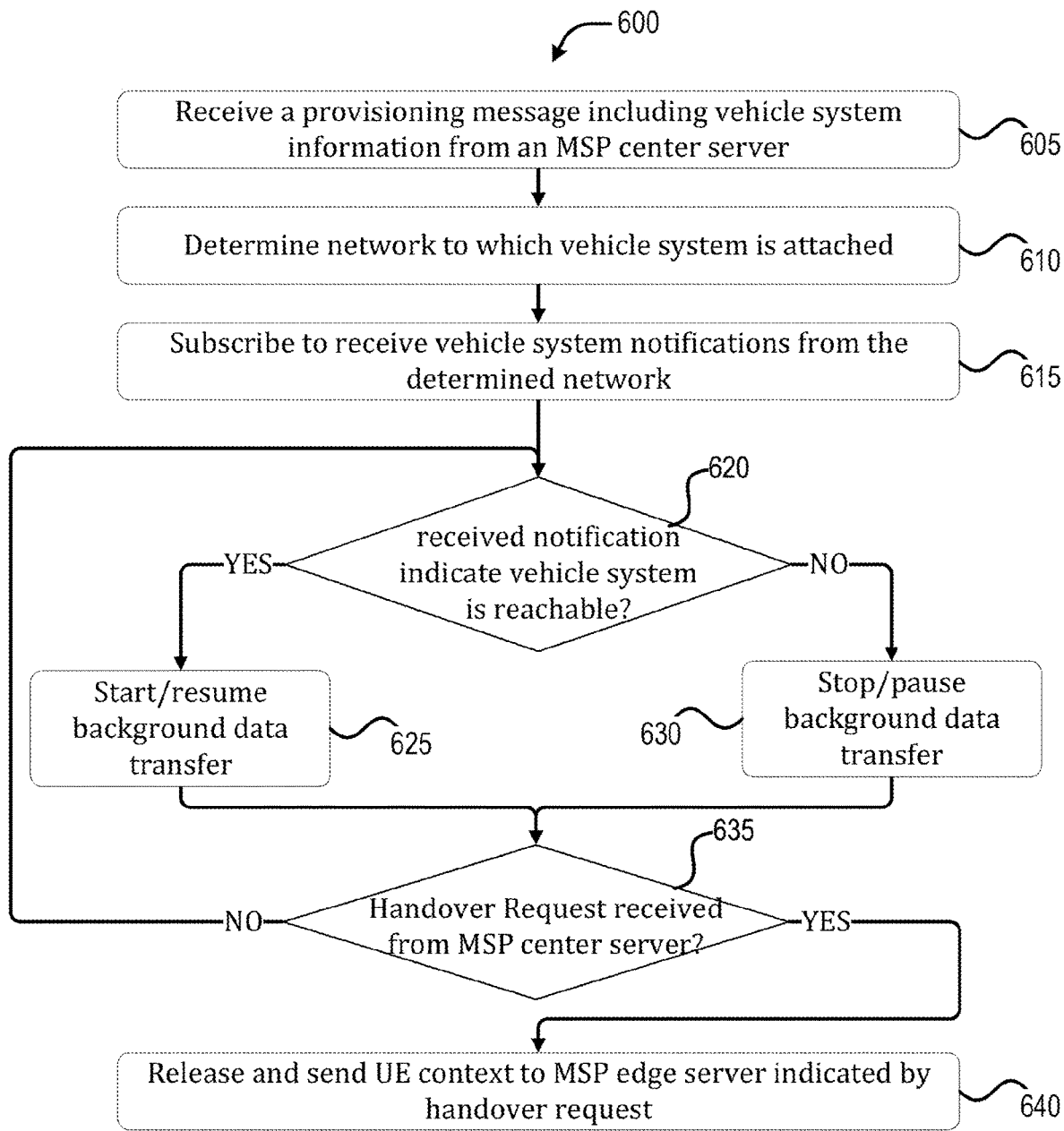
FIG. 6 shows another example procedure for practicing various embodiments herein.
Figure 7:
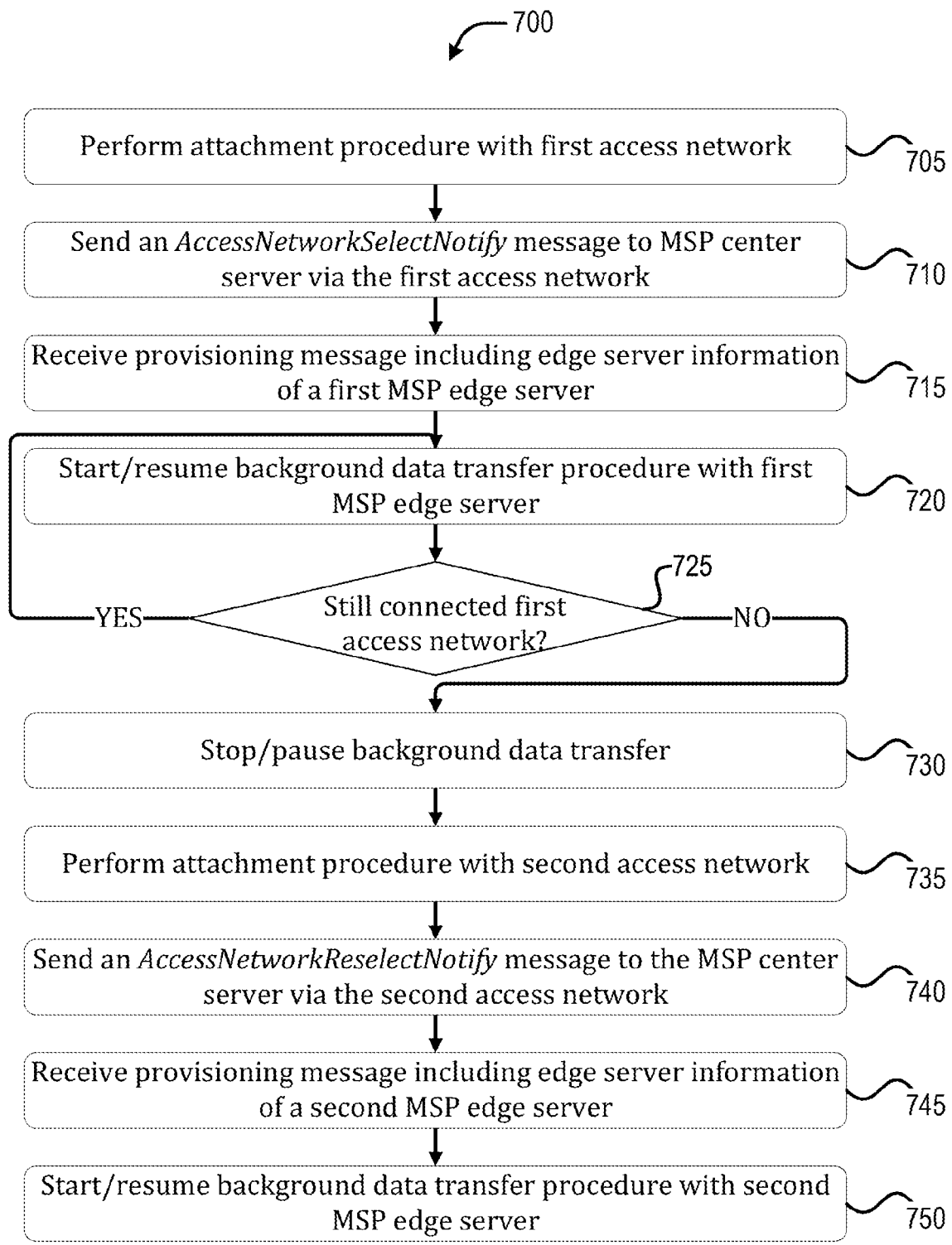
FIG. 7 shows yet another example procedure for practicing various embodiments herein.

FIGS. 5-7 show example procedures 500-700, respectively, in accordance with various embodiments. For illustrative purposes, the various operations of processes 500-700 is described as being performed by the various elements discussed with respect to FIGS. 1-4 or elements thereof. The various messages/signaling communicated between the these elements may be sent/received over the various interfaces discussed herein with respect to FIGS. 1-4, and using the various mechanisms discussed herein including those discussed herein with respect to FIGS. 8-15. While particular examples and orders of operations are illustrated FIGS. 5-7, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 5 shows a process 500 for managing registration, session, and service continuity according to various embodiments. Process 500 may be performed by the MSP center server 150 (or portions thereof) as discussed with respect to FIGS. 1-2 to, inter alia, manage provision of edge networking services to moving vehicles 121. Process 500 begins at operation 505 where the MSP edge server 150 (or MSP ENAM 154) receives an AccessNetworkSelectNotify message from a vehicle system 121 (or vUE 125) via a first access network to which the vehicle system 121 (or vUE 125) is attached. In embodiments, the AccessNetworkSelectNotify message may indicate the first access network to which the vehicle system (or vUE 125) is attached and/or other pertinent information such as location/positioning information, resource utilization, and/or other like information. At operation 510, the MSP edge server 150 (or MSP ENAM 154) selects a first MSP edge server 136 to which traffic, computational tasks, and/or workloads of the vehicle system 121 (or vUE 125) should be offloaded. The selection of the first MSP edge server 136 is based on receipt of the AccessNetworkSelectNotify message (and/or information contained therein).

At operation 515, the MSP edge server 150 (or MSP ENAM 154) provisions the vehicle system 121 (or vUE 125) with edge server information of the first MSP edge server 136. In embodiments, the MSP center server 150 (or MSP ENAM 154) may provision the vehicle system 121 (or vUE 125) using a registration request acceptance or ACK message. In embodiments, the edge server information of the first MSP edge server 136 includes, for example, an Internet Protocol (IP) address of the first MSP edge server 136 and compute capabilities of the first MSP edge server 136 (or services provided by the first MSP edge server 136). In embodiments, the compute capabilities of the first MSP edge server 136 (or services provided by the first MSP edge server 136) may include, for example, vehicle data analytics capabilities, traffic control services capabilities, content streaming services capabilities, High Definition Map (HDM) processing capabilities, autonomous or intelligent driving service capabilities, vehicle-to-cloud (V2C) capabilities, MaaS services/capabilities, and/or other like AECC services/capabilities.

At operation 520, the MSP edge server 150 (or MSP ENAM 154) provisions the first MSP edge server 136 with vehicle (or vUE) information of the vehicle system 121 (or vUE 125). In embodiments, the MSP center server 150 (or MSP ENAM 154) may provision the first MSP edge server 136 with the vehicle (or vUE) information using a suitable message. The vehicle (or vUE) information may include, for example, an identity or identifier of the vehicle system 121 (or vUE 125) (e.g., an IP address or other like identifier), location information of the vehicle system 121 (or vUE 125), access network registration information of the access network, and access network identity information of the access network, and/or other like information. The access network registration information may include, for example, an attached access network type or radio access technology (RAT) type of the access network, and the access network identity information may include, for example, a public land mobile network identity (PLMNID) or the like. In embodiments, the first MSP edge server 136 may use this information to subscribe to the access network to receive network/mobility event notifications relevant to the vehicle system 121 (or vUE 125) and communicatively couple with the vehicle system 121 (or vUE 125) for performing background data transfers.

After some time, the MSP edge server 150 (or MSP ENAM 154) receives an AccessNetworkReselectNotify message from the vehicle system 121 (or vUE 125) via a second access network to which the vehicle system 121 (or vUE 125) is attached. Receipt of the AccessNetworkReselectNotify message may be based on the vehicle system 121 (or vUE 125) moving into the coverage area of a new network, a radio link failure, or some other network error or failure. In embodiments, the AccessNetworkReselectNotify message may include the same or similar information as the AccessNetworkSelectNotify message, as well as other pertinent information, such as a reason for the access network reselection or the like. At operation 530, the MSP edge server 150 (or MSP ENAM 154) selects a second MSP edge server 136 to which traffic, computational tasks, and/or workloads of the vehicle system 121 (or vUE 125) should be offloaded. The selection of the second MSP edge server 136 may be based on receipt of the AccessNetworkReselectNotify message (and/or information contained therein).

At operation 535, the MSP edge server 150 (or MSP ENAM 154) sends a handover request message to the first MSP edge server 136, which may instruct or otherwise cause the first (source) MSP edge server 136 to release a vehicle system 121 (or vUE 125) context, and transfer the vehicle system 121 (or vUE 125) context to the second (target) MSP edge server 136. At operation 540, the MSP edge server 150 (or MSP ENAM 154) provisions the vehicle system 121 (or vUE 125) with edge server information of the second MSP edge server 136. In embodiments, the MSP center server 150 (or MSP ENAM 154) may provision the vehicle system 121 (or vUE 125) using another registration request acceptance, ACK, and/or handover complete message. This message may include the same or similar type of information as the provisioning message sent at operation 515. After performance of operation 540, process 500 may end or repeat as necessary.

FIG. 6 shows a process 600 for providing computational offloading services to vehicle systems according to various embodiments. Process 600 may be performed by the MSP edge server 136 (or portions thereof) as discussed with respect to FIGS. 1-2 to, inter alia, provide communication services to moving vehicles 121.

Process 600 begins at operation 605 where the MSP edge server 136 (or CP module 137) receives a provisioning message from the MSP center server 150, which may include the same or similar information discussed previously with respect to FIGS. 1-5 (e.g., vehicle system (or vUE) information). At operation 610, the MSP edge server 136 (or CP module 137) determines an access network to which the vehicle system 121 (or vUE 125) is attached based on the information contained in the provisioning message. At operation 615, the MSP edge server 136 (or CP module 137) subscribes to receive vehicle system 121 event notifications from the determined access network.

After some time, the MSP edge server 136 (or CP module 137) may receive an event notification from the subscribed access network. At operation 620, the MSP edge server 136 (or CP module 137) determines whether a received event notification indicates whether the vehicle system 121 (or vUE 125) is reachable or not. If the notification indicates that the vehicle system 121 (or vUE 125) is reachable, then the MSP edge server 136 (or CP module 137) proceeds to operation 625 to start or resume a background data transfer procedure which may be performed by a DP module 138 of the MSP edge server 136. If at operation 620 the notification indicates that the vehicle system 121 (or vUE 125) is not reachable, then the MSP edge server 136 (or CP module 137) proceeds to operation 630 to stop or pause the background data transfer procedure which may or may not be being performed by the DP module 138 of the MSP edge server 136.

After operation of operation 625 or 630, the MSP edge server 136 (or CP module 137) at operation 635 determines whether a handover request has been received from the MSP center server 150. If a handover request has not been received, the MSP edge server 136 (or CP module 137) loops back to operation 620 to continue to monitor for event notifications. If a handover request has been received, the MSP edge server 136 (or CP module 137) may release and send a vehicle (or UE) context to a target MSP edge server 136 indicated by the handover request. In some embodiments, after the vehicle (or UE) context is released and/or sent to the target MSP edge server 136, the MSP edge server 136 (or CP module 137) may send a handover ACK or handover complete message to the MSP center server 150 and/or to the vehicle system 121 (or vUE 125) to indicate that background data transfers may take place between the vehicle system 121 (vUE 125) and the target MSP edge server 136. After performance of operation 640, process 600 may end or repeat as necessary.

FIG. 7 shows a process 700 for obtaining communication services according to various embodiments. Process 700 may be performed by the vehicle system 121/vUE 125 (or portions thereof) as discussed with respect to FIGS. 1-2 to, inter alia, obtain communication services from MSP servers 136, 150.

Process 700 begins at operation 705 where the vehicle system 121 (or the vUE 125) performs an attachment procedure with a first access network, which may be the cellular network 140, cellular network 240A, cellular network 240B, or WLAN 130 discussed with respect to FIGS. 1-2. At operation 710, the vehicle system 121 (or Mobile Comms Module) generates and sends an AccessNetworkSelectNotify message to an MSP center server 150 via the first access network. The AccessNetworkSelectNotify message may include the same or similar information as discussed previously. At operation 715, the vehicle system 121 (or Mobile Comms Module) receives a provisioning message from the MSP center server 150, which may include the same or similar information as discussed previously (e.g., MSP edge server information of a first MSP edge server 136). At operation 720, the vehicle system 121 (or Mobile Comms Module or DP module) may start or resume a background data transfer procedure with a first MSP edge server 136 indicated by the provisioning message.

At operation 725, the vehicle system 121 (or the vUE 125) determines whether a link with the first access network is still active or available. If the link is available/active, the vehicle system 121 (or the vUE 125) proceeds back to operation 720 to continue or resume the background data transfer operation. If the link is not available/active, such as when the vehicle system 121 moves out of a coverage area of the first access network or the link otherwise fails, the vehicle system 121 (or the Mobile Comms Module or the DP module) proceeds to operation 730 to stop or pause the background data transfer operation.

At operation 735, the vehicle system 121 (or the vUE 125) performs an attachment procedure with a second access network, which may be a different one of the cellular network 140, cellular network 240A, cellular network 240B, or WLAN 130 than the first access network. In some embodiments, depending on the type of disconnection detected at operation 725, the vehicle system 121 (or the vUE 125) may attempt to reattach to, or reestablish a network connection with the first access network prior to attempting to attach to the second access network at operation 735. If the vehicle system 121 (or the vUE 125) is able to reattach/reconnect to the first access network, the vehicle system 121 may repeat operations 710-725.

After the vehicle system 121 (or the vUE 125) attaches to the second access network, the vehicle system 121 (or the vUE 125) generates and sends an AccessNetworkReselectNotify message to the MSP center server 150 via the second access network. The AccessNetworkReselectNotify message may include the same or similar information as discussed previously. At operation 745, the vehicle system 121 (or Mobile Comms Module) receives another provisioning message from the MSP center server 150, which may include the same or similar information as discussed previously (e.g., MSP edge server information for a second (target) MSP edge server 136). At operation 750, the vehicle system 121 (or Mobile Comms Module or DP module) may start or resume a background data transfer procedure with a second MSP edge server 136 indicated by the other provisioning message. After performance of operation 750, process 700 may end or repeat as necessary.

II. AECC Services and MSP Edge Server Compute Capabilities

As mentioned previously, the MSP edge servers 136 may provide computational offloading services and/or network services to connected vehicle systems 121. These services may be indicated to vehicle systems 121 as "compute capabilities" in provisioning messages provided by the MSP center server 150 as discussed previously. Examples of these services or compute capabilities may include consumer-oriented services (e.g., gaming, remote mobile/desktop applications, augmented reality/virtual reality, content streaming services, cognitive assistance services such as text-to-speech or speech-to-text processing, and the like), operator or third party services (e.g., active device location tracking, "big data" applications, security/safety aspects, enterprise services, and the like), and network performance or Quality of Experience (QoE) services (e.g., Domain Name System (DNS)/CDN/web caching, performance optimization, content streaming optimization, and the like). Some or all of these services may include vehicle-to-cloud (V2C) services such as intelligent driving services, high-definition map (HDM) services, V2C cruising assist service, Mobility as a Service (MaaS), among many other services.

Intelligent driving applications/services may include applications that support safe and efficient driving (e.g., traffic notifications) and may include autonomous driving. Cloud-based intelligent driving services may collect data such as cruising data, biometric sensor data, and control data. This data may be gathered from various sources including movement logs from in-vehicle sensors and on-board biometric sensors/cameras. The data volume for these applications may be very large, creating a heavy load on both networking and computing resources. In these cases, the above described edge servers instruct the vehicle system 121 the type of data to be collected and sent to the cloud via the MSP edge server 136, how the vehicle system 121 should process the collected data prior to transmission, and pre-process the collected data from the vehicle system 121 before sending the data to the cloud. The collected data is then sent to the cloud via one or more access networks for processing. Based on the data collected, the cloud computes the intelligent driving parameter-set using artificial intelligence (AI) and/or advanced machine learning techniques. The intelligent driving parameter-set may need to be sent to vUEs 121 in a timely manner. The intelligent driving service may benefit from the various embodiments discussed herein because the MSP Center Server may transfer the ongoing data session from one edge server to another to timely provide the intelligent driving parameter-set to the vUEs 121. In this way, the intelligent driving service may be provided in a manner that appears uninterrupted to subscribers (e.g., a user of the vehicle system 121).

HDM services consolidate static and dynamic information (e.g., vehicle position, pedestrians and obstacles, etc.), and creates and distributes maps based on such information. The HDM may require many data transactions with high capacity as well as efficient processing to keep the information up to date. The HDM must be able to accurately localize dynamic objects including vehicles, which is required for automated driving beyond traditional route guidance applications. A large number of data transfers may be required to consistently update the HDM. Data is collected from on-board cameras, radar sensors, laser scanners (LIDAR), and/or other like sensors of the vUE. The collected data is transferred and processed in the cloud by an HDM service. In some cases, the edge servers may pre-process the collected data and provide HDM deviations to the cloud-based HDM service (e.g., map says X, but camera says Y). These deviations are sent to the cloud to update the HDM. The completed map information is stored in the MSP center server or an edge server and needs to be distributed to relevant vehicles in a timely manner. The HDM service may benefit from the various embodiments discussed herein because the MSP Center Server may transfer ongoing data sessions from one edge server to another so that HDM information may be provided to relevant vUEs 121 in a timely manner. In this way, the HDM may be updated seamlessly or in a manner that appears uninterrupted to subscribers (e.g., a user of the vehicle system 121).

V2C cruise assist is an example use case of a more flexible service evolution model than the conventional dedicated short-range communications (DSRC). V2C Cruise Assist involves network mediated V2V communications by integrating information obtained from neighboring cars. This mechanism is called the vehicle-to-cloud-to-vehicle service (V2C2V). This service scenario is especially effective when used to broadcast information to vehicles that need the same information, by utilizing the combination of neighboring vehicles, roadside units, and other entities/devices.

To realize this service scenario, vehicles and roadside units transmit their cruising data to the cloud to be analyzed, to provide information for driving assistance (such as collision avoidance, cruising control for platooning and signal control). The generated information is then distributed to relevant vUEs 121 and roadside facilities in the neighboring area. This transport system among different vehicles in the neighboring area through the network requires low-latency communication and ultra-fast computing processing to fulfill service timing criteria. The V2C cruise assist service may benefit from the various embodiments discussed herein because the MSP Center Server may transfer ongoing data sessions from one edge server to another so that driving assistance information may be provided to relevant vUEs, RSUs, and other entities/devices in a timely manner.

Mobility as a Service (MaaS) refers to a shift away from personally-owned modes of transportation and towards mobility solutions that are consumed as a service. Many services (e.g., route navigation services) rely on mobility data from vUEs 121 to provide their services (e.g., real-time navigation). The gathered mobility data can be used by third parties to offer new services, such as traffic flow control by road authorities. These kinds of services are the building blocks of MaaS, which will bring improvement to mobility experiences. MaaS is enabled by combining public and/or private transportation services through a unified gateway that creates and manages the transportation. Users can pay per trip or a subscription fee for MaaS. The key concept behind MaaS is to offer travelers mobility solutions based on their travel needs. MaaS may include ride-sharing, e-haling, vehicle-sharing (including car-, bike-, and scooter-sharing services), online/mobile delivery, and/or pop-up or on-demand bus services. These sharing services typically utilize a trip or route planner (e.g., using a mobile application in a UE or vUE 125) that shows a user a route from one destination to another and the mode of transportation (or combination or transportation modes) that the user can use. The user can then choose their preferred trip based on cost, time, and convenience, and then books or reserve their transport (e.g. haling a taxi, reserving a seat on a train, etc.). As these services evolve, there will soon be new emerging services beyond the current ones, such as mobility sharing and multimodal navigation. Mobility sharing is a service that includes ride sharing, car sharing, and even parking lot/space sharing, while multimodal navigation services are end-to-end route guidance that uses various modes of transportation and also provides mobility sharing services information. Mobility sharing services will involve various types of information being shared in a timely manner between asset owners, service providers and end users; accordingly, these types of services should be built on top of intelligent driving, high-definition maps and cruise assist. These emerging services may benefit from or rely on the various session transfer mechanisms of the various embodiments discussed herein.

III. MSP Server Selection Aspects

As mentioned previously, in various embodiments, the MSP center server 150 performs selection and reselection of MSP edge servers 136 to which traffic, workloads, and/or computational tasks of a vehicle system 121 and/or vUE 125 should be offloaded, and provides and/or provisions the vehicle system 121 and/or vUE 125 and the selected MSP edge servers 136 with the information that those devices may use for computational offloading.

FIG. 8A shows an example edge server process 800A that may take place when (re)selecting an MSP edge server 136 for computational offloading. In general, the AECC system 100/200A/200B proceeds with the steps beginning at operation 801 where primary network access is obtained through an access network 830. The access network 830 may be the WLAN 130, the cellular network 140/240A/240B, or some other suitable network. Then at step 802, the vehicle system 121 (or vUE 125) selects an MSP center sever 150 to get connected to the AECC system 100/200A/200B. At step 803, the MSP center server 150 selects an MSP edge server 136-1 to serve the vehicle system 121 (or vUE 125) based on one or more selection criteria, such as those discussed herein. As the vehicle system 121 (or vUE 125) moves, the MSP center server 150 (re)selects an MSP edge servers 136-2 at operation 804a or an MSP edge servers 136-3 at operation 804b. The MSP edge servers 136-1, 136-2, and 136-3 may be the same or similar to the previously discussed MSP edge servers 136. Availability of an MSP edge server 136 may change, and the MSP center server 150 may support a switch between MSP edge servers 136 based on prediction and status of the AECC system and access networks, or other like criteria or parameters.

Existing AECC solutions do not evaluate the impacts of different forms of access (e.g., WLAN 130 and cellular network 140). With different access networks, the solutions to enable AECC applications can be very different. Besides, the MSP edge server 136 selection is not addressed in existing solutions and documents.

There are three issues identified and prioritized by the AECC working group 2 (WG2) in AECC WG2 FAD v0.4.0, including: data offloading, a vehicle's reachability and MSP server selection including center server selection and edge server selection. AECC document T1800046, AECC document T1800040, and AECC document T1800047 provide solutions to address these three issues as contributions to AECC. In T100046, initial solutions are given for MSP server selection. However, some solutions may not apply to WLAN 130 for MSP center server 150 selection, and the solutions to MSP center server 150 selection in these documents are not complete considering different access networks. Furthermore, the MPS edge server 150 selection is not addressed in some or all of these documents.

Figure 8:
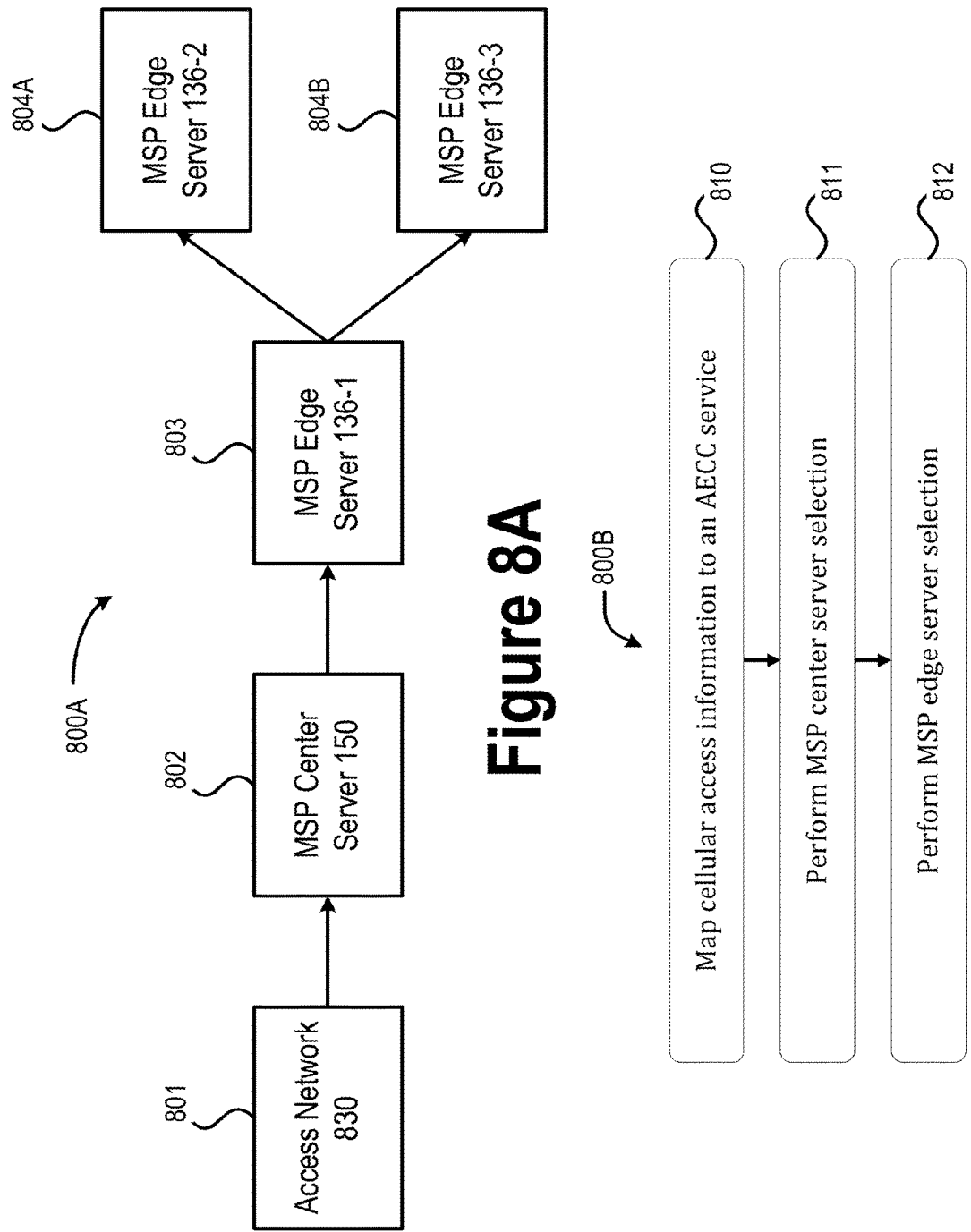
FIG. 8A shows an example edge server process that may take place when (re)selecting an MSP edge server for computational offloading.
FIG. 8B shows an example process for practicing some aspects of the embodiments discussed herein.

Embodiments herein include MSP center server 150 and MSP edge server selection processes. One such process is depicted by FIG. 8B, which includes process 800B. Process 800B begins at operation 810, the process maps cellular access information to an AECC service. At operation 811, the process performs MSP center server 150 selection. At operation 812, the process performs MSP edge server 136 selection. In embodiments, the electronic device(s), network(s), system(s), chip(s) or component(s), or portions or implementations thereof, of FIGS. 1-11, or some other figure(s) herein, may be configured to perform process 800B.

Some embodiments provide a procedure to enable AECC applications with different access networks (e.g., WLAN and cellular). Systems and methods to enable MSP center server selection are also described. In some embodiments, a cellular network maps cellular access info such as an Access Point Name (APN) or Data Network Name (DNN) mapping to AECC service(s). If there is service agreement between AECC and MNO, the cellular network 140 can authorize vehicle access to AECC system 100/200A/200B and perform MSP center server 150 selection.

In some embodiments, MSP edge server 150 selection procedures include: (a) an MSP center server 150 centric procedure, as an AECC (application) level method (this procedure may apply to systems with either WLAN access or cellular access networks); (b) a cellular assisted procedure, as the cellular network can provide information and assist the procedure of MSP edge server 136 selection (this procedure may only apply to systems with cellular access networks); and (c) a vehicle system 121 centric procedure, as the vehicle can collect information for AECC edge servers to perform MSP edge server selection (this procedure may only apply to system with cellular access network). These embodiments provide three options for MSP edge server 136 selection with WLAN 130 and cellular network 140 access in consideration. It also provides system level procedure to fulfill the requirements for AECC use cases, which also applies to general V2X applications.

When going through the overall operations of the procedure 800 of FIG. 8, one operation could affect the available options for another operation. Therefore, the overall system level procedure is proposed with different access networks.

III.1.1 System Procedure with WLAN Access

Figure 9:
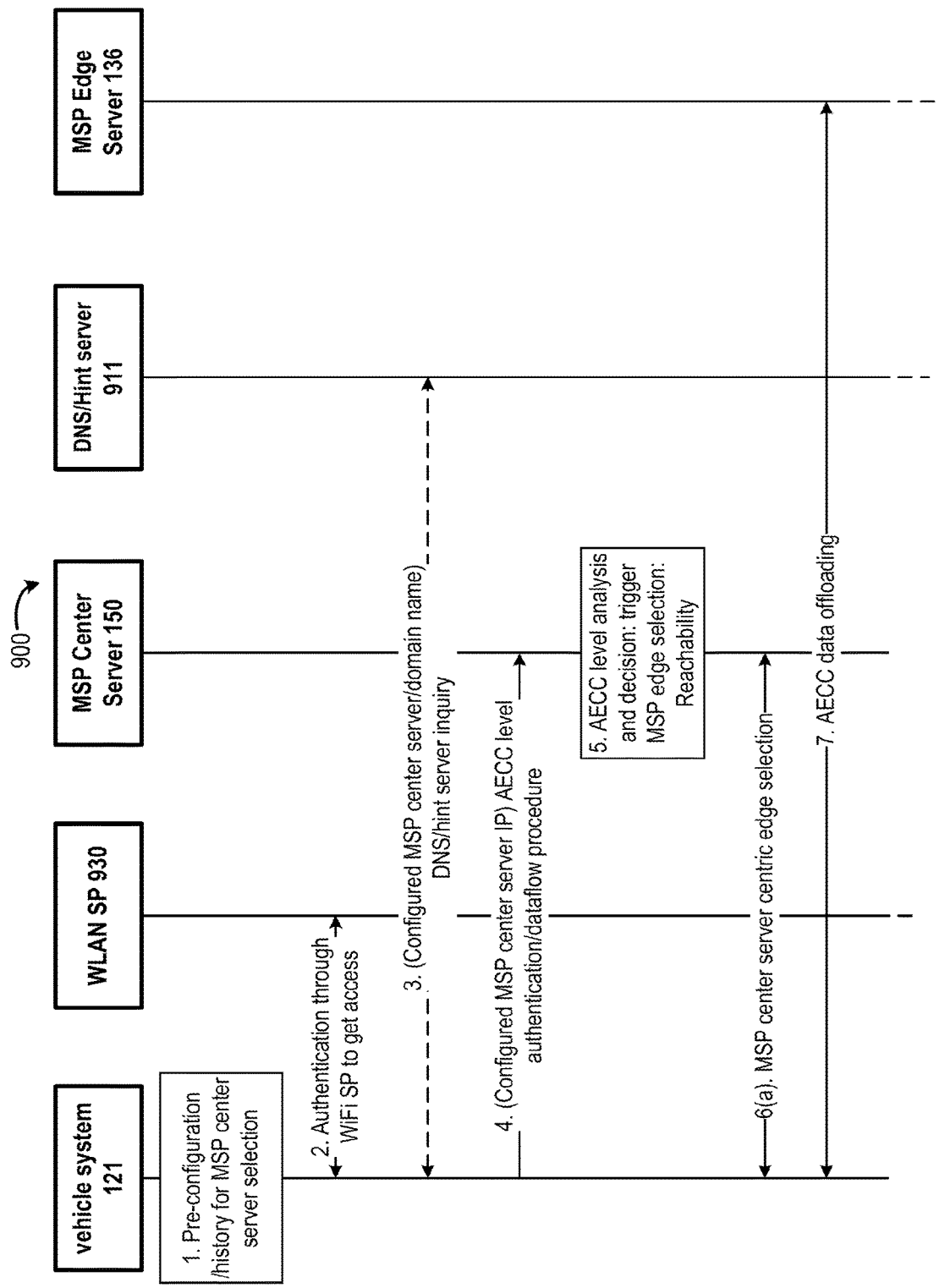
FIG. 9 shows an example selection procedure for a vehicle system with WLAN access to perform the MSP center server selection, reachability procedure, and MSP edge sever selection and data offloading.

FIG. 9 shows an example selection procedure 900 for a vehicle system 121 with WLAN 130 access to perform the MSP center server 150 selection, reachability procedure, and MSP edge sever 136 selection and data offloading. It is assumed that the vehicle has a valid credential to get access to internet through WLAN. Procedure 900 may operate as follows:

1) Vehicle system 121 needs to be configured with MSP center server's 150 info (e.g., IP address, domain name, etc.) or can retrieve this information from history, which may be locally stored, for example.
2) Vehicle system 121 gets access to the internet through the WLAN 130 (e.g., WLAN 930 of FIG. 9)
3) If the IP address of the MSP center server 150 is not available, a DNS/hint server 911 lookup may be needed following the solutions in T1800046 for MSP center server 150 selection. Note that not all solutions in T1800046 can be applied. For example, the MSP servers 150, 136 cannot broadcast to the vehicle system 121 without the vehicle system 121 initiating the connection through WLAN 130. In some implementations, step 3 may be omitted.
4) With the MSP center server's 150 IP address, vehicle system 121 performs AECC level authentication and data exchange.
5) MSP center server 250 collects data from vehicle system 121 based on different applications and also the status of the vehicle system 121 such as reachability info following T1800047. For example, the MSP center server 150 could request for the vehicle system 121 to respond to a Short Message Service (SMS) push via the cellular network 140 to verify its reachability over a cellular network 140.
6) The MSP edge server 136 selection could include, for example:
   a. MSP center server 150 centric: This requires the MSP center server 150 to collect the information for MSP edge server 136 selection such as vehicle system 121 location, MSP edge server 136 location and capabilities, vehicle system 121 access network(s) and their status such as congestion, and/or other like information. Based on this information, the MSP center server 150 selects the appropriate MSP edge server 136 for the vehicle system 121. This may be considered to be an AECC (application) level solution.
7) Cellular network 140 (or vehicle system 121) offloads data to MSP edge server 136.

III.1.2 System Procedure with Cellular Access

Figure 10:
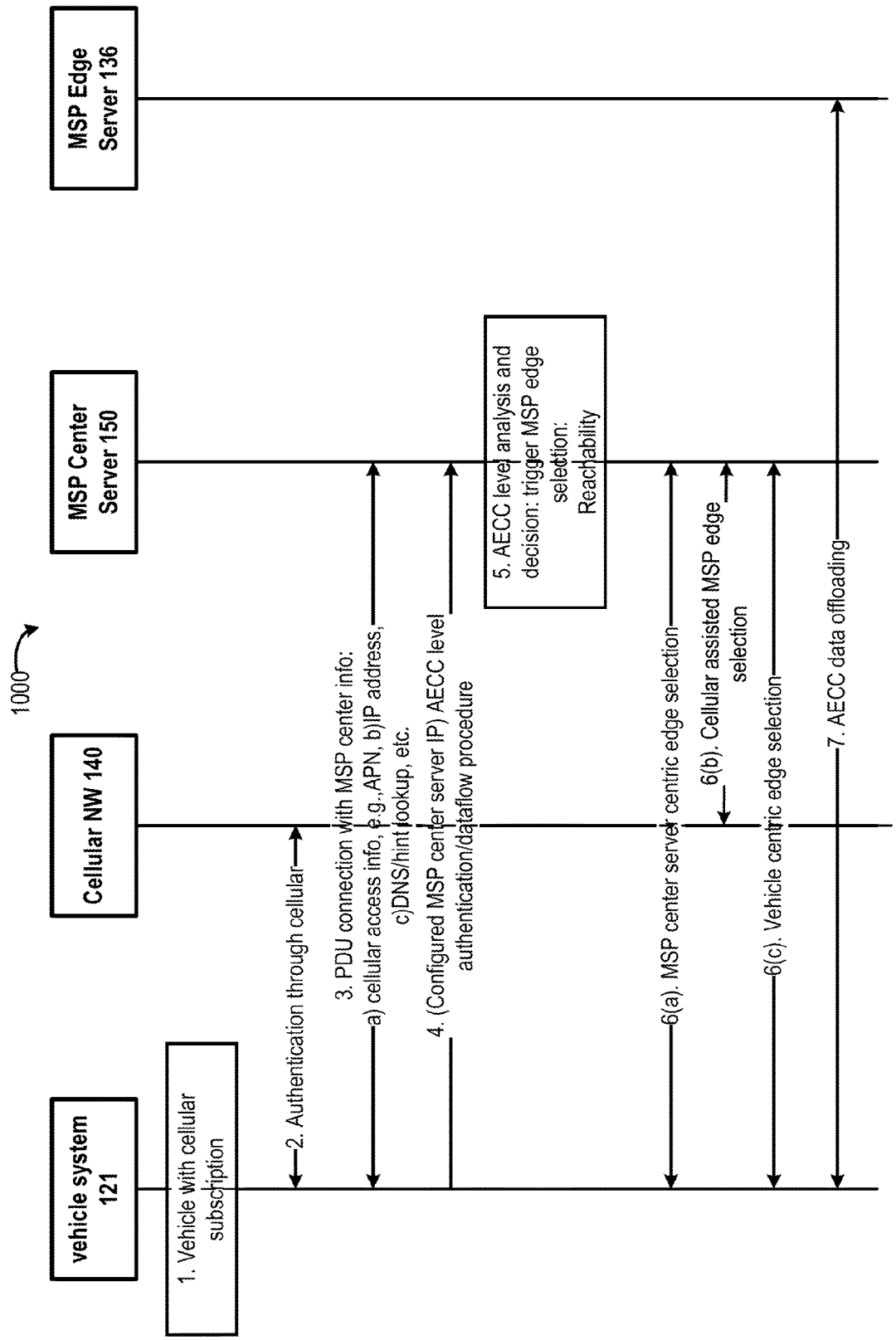
FIG. 10 shows an example selection procedure for a vehicle system with a cellular subscription.
Figure 11:
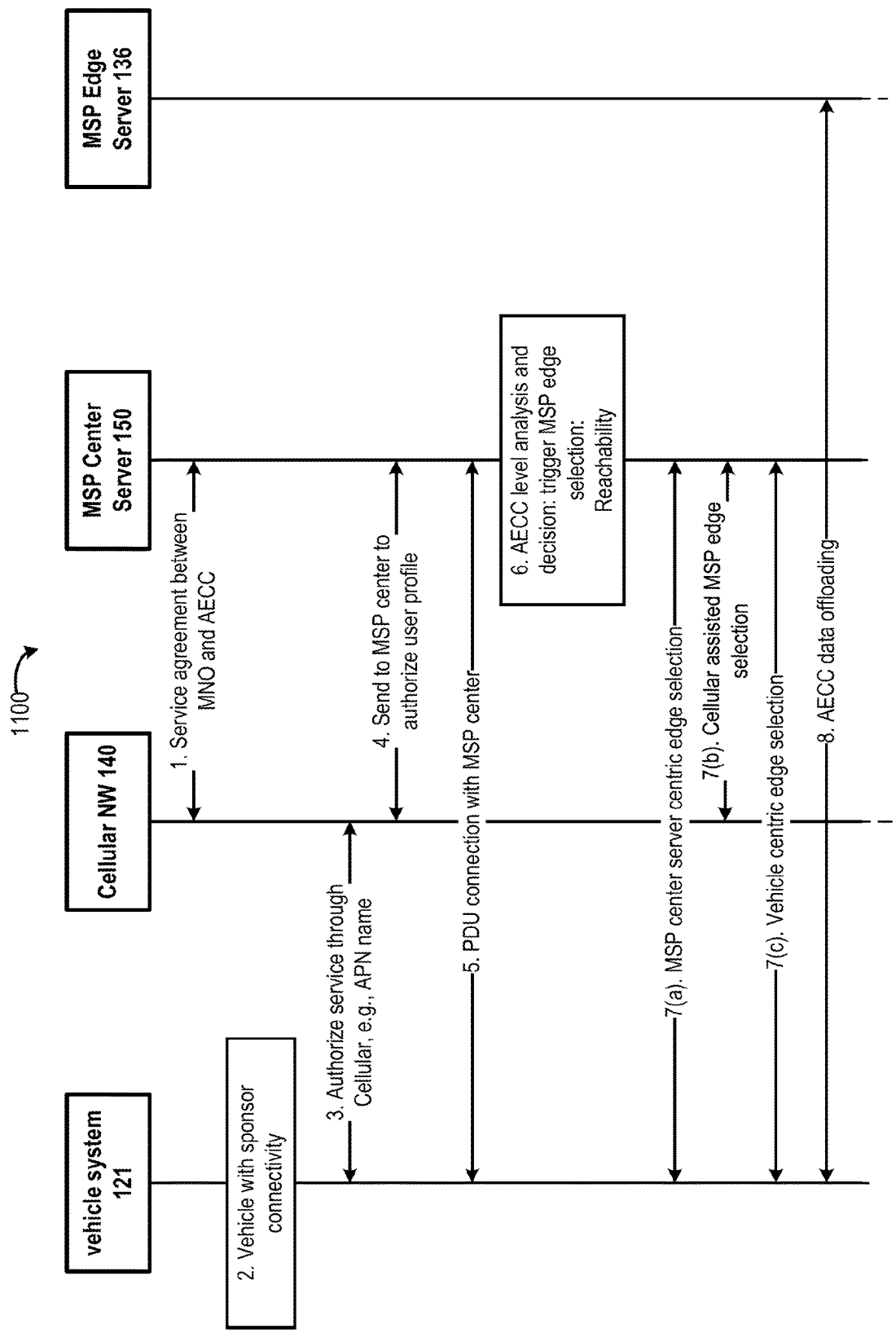
FIG. 11 shows an example selection procedure for vehicle system with cellular access and sponsor connectivity.

If the vehicle system's 121 access network is the cellular network 140, the vehicle system 121 can either have a subscription with the MNO or have a sponsored connection by the service provider (AECC). The overall procedures for these two cases are shown by FIGS. 10 and 11. FIG. 10 shows an example selection procedure 1000 for a vehicle system 121 with a cellular subscription. Procedure 1000 may operate as follows:

1) Vehicle system 121 has a valid subscription with the MNO of, for example, cellular network 140.
2) Cellular network 140 authorizes the vehicle system 121 to access data network.
3) The vehicle system 121 gets connected with the MSP center server 150 through one of the following mechanisms:
   a. Cellular NW 140 access info such as an APN (or DNN) mapping to one or more AECC services.
   b. The IP address of a MSP center server 150.
   c. The AECC domain name that can be resolved by DNS or hint server (e.g., DNS/hint server 911 of FIG. 9).
4) The vehicle system 121 exchanges data on AECC level with the MSP center server 150.
5) MSP center server 150 collects data from vehicle system 121 based on different applications and also the status of the vehicle system 121 such as reachability info following T1800047.
6) MSP edge sever 136 selection can include one or more of the following mechanisms:
   a. The same as step/operation 6(*a*) in procedure 900 of FIG. 9.
   b. Cellular-assisted: The cellular network 140 could provide information such as location and edge server 136 list to assist the edge server 136 selection. For example, the MSP center server 150 could instruct the cellular networks 140 to verify the vehicle system's 121 reachability and then select an edge server 136 based on tariff (or traffic). The cellular network 140 could also know that there is a WLAN 130 hotspot connected to the cellular CN 142 based on the vehicle system's 121 location and speed information. Then, an edge server 136 could be selected in advance to store the data (e.g., HD map, etc.) requested by the vehicle system 121.

c. Vehicle-centric: The vehicle system 121 can get measurements through primary and alternative cellular networks 140 to understand the status of the networks 140, such as congestion, etc. Each option could suggest an edge server 136 to build an edge server list. The vehicle system 121 can choose an MSP edge server 136 based on some selection criteria and report the decision to the serving MSP center server 150.

7) Cellular network 140 (or vehicle system 121) offloads data to MSP edge server 136.

FIG. 11 shows an example selection procedure 1100 for vehicle system 121 with cellular access and sponsor connectivity. Procedure 1100 may operate as follows:

1) There should be a service agreement between AECC and MNO of cellular NW 140.
2) Cellular network 140 identifies the vehicle system 121 as an AECC vehicle system 121 whose connection to the AECC server 150, 136 is sponsored through AECC by agreement.
3) Cellular network 140 authorizes the connection request from vehicle system 121 by service such as an APN/DNN name.
4) Cellular network 140 forwards the vehicle system's 121 AECC credentials to a designated MSP center server 150 based on the service agreement between AECC and MNO.
5) Vehicle system 121 gets connected with the MSP center server 150 following the service agreement between AECC and MNO, and exchanges data on AECC level with the MSP center server.
6) MSP center server 150 collects data from vehicle system 121 based on different applications and also the status of the vehicle system 121 such as reachability info following T1800047.
7) The same as Step 6 in procedure 1000 of FIG. 10.
8) Cellular network 140 (or vehicle system 121) offloads data to the MSP edge server 136.

IV. Edge Computing Aspects

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at network access nodes, base stations, access points, gateways, routers, network appliances, and/or other devices that are closer to endpoint devices (e.g., UEs, IoT devices, etc.) producing and consuming data.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, content and/or data delivery services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include Multi-access Edge Computing (MEC); Content Delivery Networks (CDNs) (also referred to as "Content Distribution Networks" or the like); Mobility as a Service (MaaS) provider systems; Nebula edge-cloud systems; fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (CO-MAC) systems; and/or the like. The Mobility Service Provider (MSP) edge compute servers discussed herein may be implemented using any of the aforementioned edge computing technologies and/or any other suitable edge computing technology. Further, the edge computing technologies and techniques disclosed herein may relate to other IoT and/or edge network systems and configurations, and other intermediate processing entities and architectures may also be used for purposes of the present disclosure.

Figure 12:
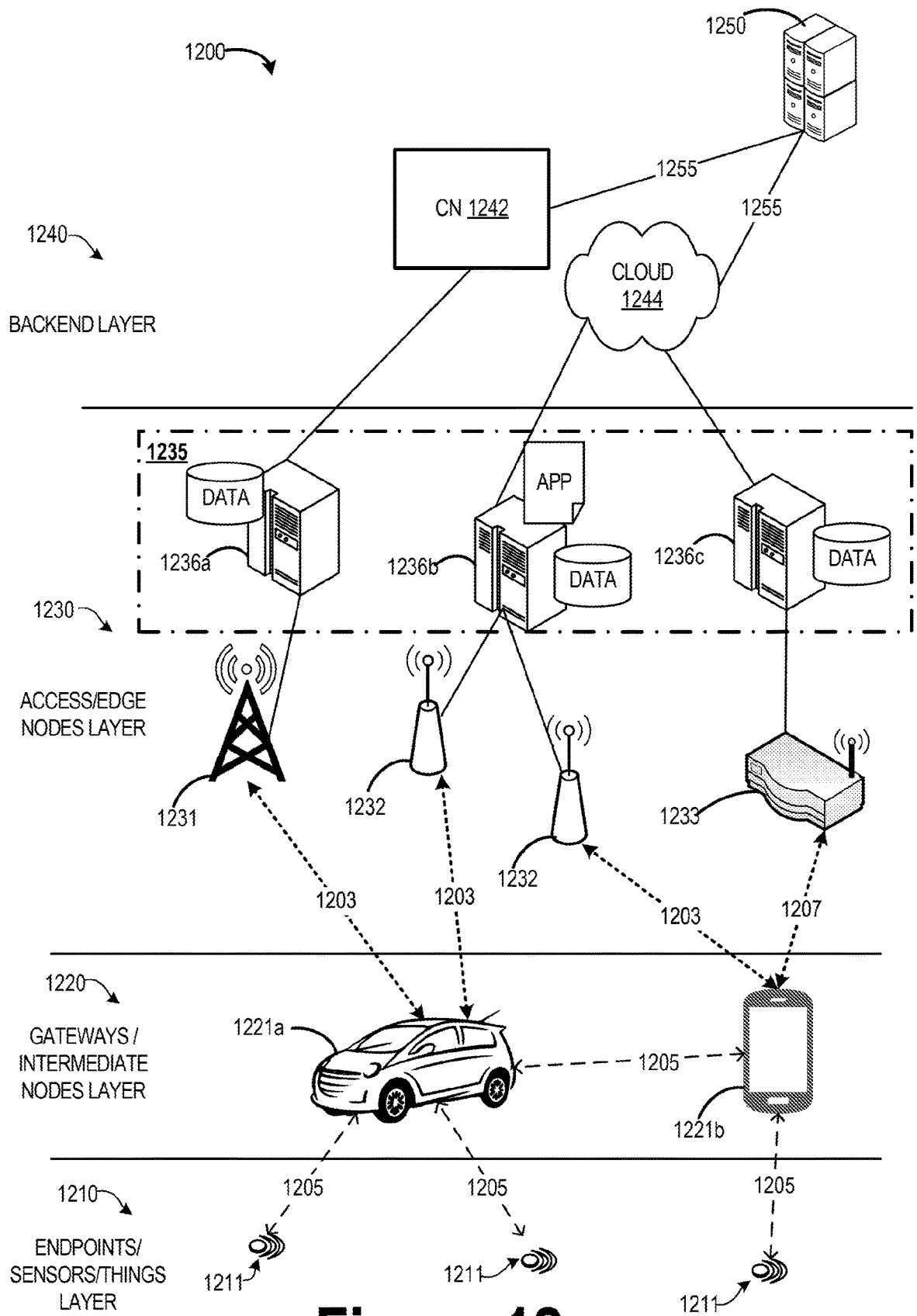
FIG. 12 depicts a multi-access computing (MEC) environment according to various embodiments.

FIG. 12 depicts an example multi-access computing (MEC) environment 1200 in accordance with various embodiments. FIG. 12 specifically illustrates the different layers of communication occurring within the environment

1200, starting from endpoint sensors or things layer 1210 (e.g., operating in an Internet of Things (IoT) network topology) comprising one or more IoT devices 1211 (also referred to as edge endpoints 1210 or the like); increasing in sophistication to gateways or intermediate node layer 1220 comprising one or more user equipment (UEs) 1221a and 1221b (also referred to as intermediate nodes 1220 or the like), which facilitate the collection and processing of data from endpoints 1210; increasing in processing and connectivity sophistication to access or edge node layer 1230 comprising a plurality of access nodes (ANs) 1231, 1232, and 1233 (also referred to as edge compute nodes 1230 or the like); and increasing in connectivity and processing sophistication to a backend layer 1240 comprising core network (CN) 1242 and cloud 1244. The processing at the backend layer 1240 may be enhanced by network services as performed by a remote application server 1250 and/or other cloud services.

An end-user device, such as an intermediate node 1220 or endpoint 1210 has access to multiple communication networks based on different technologies, for example, LTE or NR/5G cellular technology (e.g., as provided by AN 1231 and/or ANs 1232), WiFi (e.g., as provided by AN 1233 and/or ANs 1232), DSL, MuLTEfire, etc., for accessing application services. Different technologies exhibit benefits and limitations in different scenarios, and application performance in different scenarios becomes dependent on the choice of the access networks (e.g., WiFi, LTE, etc.) and the used network and transport protocols (e.g., VPN, MPTCP, GRE etc.). For example, WiFi may provide high throughput for intermediate nodes 1220 and endpoints 1210 when under relatively good coverage, but the throughput degrades significantly as the user moves closer to the edge of WiFi coverage area or when an 1233 serves a relatively large user population (e.g., due to contention based WiFi access scheme). In LTE or NR networks, the capacity is often constrained by the limited availability of licensed spectrum, but the quality of the service is predictable even in multiuser scenarios due to the exclusivity of the licensed spectrum and the controlled scheduling provided by a serving base station.

Unlike LTE and NR networks that use licensed spectrum, WiFi is a shared medium that operates in the unlicensed radiofrequency (RF) of 2.4 GHz and 5 GHz ranges. The 3GPP variant of unlicensed access is called LAA. LAA, aims to design LTE and/or NR specifications for global harmonization that allow for fair coexistence with WiFi and other networks in a shared medium. LAA employs a medium access scheme similar to WiFi's EDCA. The coexistence impact on fairness and throughput with respect to LTE and/or NR is also a current challenge for both standards. One issue that may arise when utilizing network technologies that operated in a shared medium is that packets may be lost during transmission due to, for example, temporary interference, packet collisions, congestion, and buffer overflow. In current WiFi-based protocols, MAC protocols support limited retransmissions to recover lost packets. In particular, a WiFi transmitter will give up and drop a packet when a maximum retransmission limit is reached. Additionally, the WiFi-based retransmission method is not applicable when a packet is dropped due to temporary congestion and/or buffer overflow. Similarly, LAA uses a contention window size (CWS) for retransmitting lost packets, where the CWS increases in an exponential manner based on the HARQ-ACK in the MAC layer.

Referring back to FIG. 12, the environment 1200 is shown to include a UE 1221a and UE 1221b (collectively referred to as "UE 1221" or "UEs 1221"). In this example, the UE 1221a is illustrated as a vehicle UE, and UE 1221b is illustrated as a smartphone (e.g., handheld touchscreen mobile computing device connectable to one or more cellular networks). However, these UEs 1221 may comprise any mobile or non-mobile computing device, such as tablet computers, wearable devices, PDAs, pagers, desktop computers, laptop computers, wireless handsets, unmanned vehicles or drones, IVIs, ICEs, an Instrument Clusters, HUDs, OBDs, DMEs, MDTs, OBUs, EMS, EEMS, ECUs, ECMs, embedded systems, microcontrollers, control modules, networked or "smart" appliances, MTC devices, M2M, IoT devices, and/or any type of computing device including a wireless communications interface.

Environment 1200 also includes IoT devices 1211, which are uniquely identifiable embedded computing devices (e.g., within the Internet infrastructure) that comprise a network access layer designed for low-power IoT applications utilizing short-lived UE connections. The IoT devices 1211 may be any objects, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. For instance, in various embodiments, IoT devices 1211 may be abiotic devices such as autonomous sensors, gauges, meters, image capture devices, microphones, light emitting devices, audio emitting devices, audio and/or video playback devices, electro-mechanical devices (e.g., switch, actuator, etc.), and the like. The IoT devices 1211 can utilize technologies such as M2M or MTC for exchanging data with an MTC server (e.g., a server 1250), a MEC server 1236 and/or MEC system, or device via a PLMN, ProSe or D2D communication, sensor networks, or IoT networks. The M2M or MTC exchange of data may be a machine-initiated exchange of data.

The IoT devices 1211 may execute background applications (e.g., keep-alive messages, status updates, etc.) to facilitate the connections of the IoT network. Where the IoT devices 1211 are, or are embedded in, sensor devices, the IoT network may be a WSN. An IoT network describes an interconnecting IoT UEs, such as the IoT devices 1211 being connected to one another over respective direct links 1205. The IoT devices may include any number of different types of devices, grouped in various combinations (referred to as an "IoT group") that may include IoT devices that provide one or more services for a particular user, customer, organizations, etc. A service provider (e.g., an owner/operator of server 1250, CN 1242, and/or cloud 1244) may deploy the IoT devices in the IoT group to a particular area (e.g., a geolocation, building, etc.) in order to provide the one or more services. In some implementations, the IoT network may be a mesh network of IoT devices 1211, which may be termed a fog device, fog system, or fog, operating at the edge of the cloud 1244. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1244 to Things (e.g., IoT devices 1211). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 1230) and/or a central cloud computing service (e.g., cloud 1244) for performing heavy computations or computationally burdensome tasks. On the other hand, edge cloud computing consolidates human-operated, voluntary resources, as a cloud. These voluntary resource may include, inter-alia, intermediate nodes 1220 and/or endpoints 1210, desktop PCs, tablets, smartphones, nano data centers, and the like. In various implementations, resources in the edge cloud may be in one to two-hop proximity to the IoT devices 1211, which may result in reducing overhead related to processing data and may reduce network delay.

In some embodiments, the fog may be a consolidation of IoT devices 1211 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks offloaded by edge resources.

In embodiments, the fog may operate at the edge of the cloud 1244. The fog operating at the edge of the cloud 1244 may overlap or be subsumed into an edge network 1230 of the cloud 1244. The edge network of the cloud 1244 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes or edge devices). The Fog layer resides on top of the edge layer and is a consolidation of networking devices such as the intermediate nodes 1220 and/or endpoints 1210 of FIG. 12.

Data may be captured, stored/recorded, and communicated among the IoT devices (or, for example, among the intermediate nodes 1220 and/or endpoints 1210 that have direct links 1205 with one another as shown by FIG. 12). Analysis of the traffic flow and control schemes may be implemented by aggregators that are in communication with the IoT devices 1211 and each other through a mesh network. The aggregators may be a type of IoT device 1211 and/or network appliance. In the example of FIG. 12, the aggregators may be edge nodes 1230, or one or more designated intermediate nodes 1220 and/or endpoints 1210. Data may be uploaded to the cloud 1244 via the aggregator, and commands can be received from the cloud 1244 through gateway devices that are in communication with the IoT devices 1211 and the aggregators through the mesh network. Unlike the traditional cloud computing model, in some implementations, the cloud 1244 may have little or no computational capabilities and only serves as a repository for archiving data recorded and processed by the fog. In these implementations, the cloud 1244 centralized data storage system and provides reliability and access to data by the computing resources in the fog and/or edge devices. Being at the core of the architecture, the Data Store of the cloud 1244 is accessible by both Edge and Fog layers of the aforementioned edge-fog network.

The UEs 1221 and IoT devices 1211 may be configured to connect, for example, communicatively couple, with Radio Access Network (RAN) including one or more of the ANs 1231, 1232, and/or 1233. In embodiments, the RAN may be an NG RAN or a 5G RAN, an E-UTRAN, or a legacy RAN, such as a UTRAN or GERAN. As used herein, the term "NG RAN" may refer to a RAN that operates in an NR or 5G system, and the term "E-UTRAN" or the like may refer to a RAN that operates in an LTE or 4G system. The UEs 1221 and IoT devices 1211 may utilize respective connections (or channels) 1203, respectively, each of which comprises a physical communications interface or layer. In this example, the connections 1203 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein.

In embodiments, the UEs 1221 and IoT devices 1211 may further directly exchange communication data via respective direct interfaces (or links) 1205. In some implementations the interfaces 1205 may be a WiFi based link or a personal area network (PAN) based link (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols). In other implementations, the interface 1205 may be an LTE/NR Proximity Services (ProSe) link or PC5 interface.

According to various embodiments, the UEs 1221 and IoT devices 1211 and the RAN nodes 1231/1232 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. To operate in the unlicensed spectrum, the UEs 1221 and IoT devices 1211 and the RAN nodes 1231/1232 may operate using LAA, enhanced LAA (eLAA), and/or further eLAA (feLAA) mechanisms. In these implementations, the UEs 1221 and IoT devices 1211 and the RAN nodes 1231/1232 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol. LBT is a mechanism whereby equipment (e.g., UEs 1221 and IoT devices 1211, RAN nodes 1231/1232, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

The UE 1221*b* is shown to be configured to access an access point (AP) 1233 via a connection 1207. The connection 1207 can comprise a local wireless connection, such as a connection consistent with any IEEE 802.11 protocol, wherein the AP 1233 would comprise a wireless fidelity (WiFi®) router. In this example, the AP 1233 is shown to be connected to the Internet without connecting to the CN 1242 of the wireless system. In various embodiments, the UE 1221*b*, RAN nodes 1231/1232, and AP 1233 may be configured to utilize LWA operation and/or LWIP operation. The LWA operation may involve the UE 1221*b* being configured by a RAN node 1221/1232 to utilize radio resources of LTE/NR and WLAN. LWIP operation may involve the UE 1221*b* using WLAN radio resources (e.g., connection 1207) via IPsec protocol tunneling to authenticate and encrypt packets (e.g., IP packets) sent over the connection 1207. IPsec tunneling includes encapsulating the entirety of original IP packets and adding a new packet header, thereby protecting the original header of the IP packets.

The RAN can include one or more AN nodes or RAN nodes 1231 and 1232 (collectively referred to as "RAN nodes" or "RAN node") that enable the connections 1203. As used herein, the terms "access node," "access point," or the like may describe equipment that provides the radio baseband functions for data and/or voice connectivity between a network and one or more users.

In this example, the RAN node 1231 is embodied as a NodeB, evolved NodeB (eNB), or a next generation NodeB (gNB), and the RAN nodes 1232 are embodied as Road Side Unites (RSUs). Any other type of ANs can be used, and the ANs may comprise ground stations (e.g., terrestrial access points) or satellite stations providing coverage within a geographic area (e.g., a cell). As used herein, the term "NG RAN node" or the like may refer to a RAN node 1211 that operates in an NR or 5G system (for example, a gNB), and the term "E-UTRAN node" or the like may refer to a RAN node 1231 that operates in an LTE or 4G system (e.g., an eNB). According to various embodiments, the RAN nodes 1231 may be implemented as one or more of a dedicated physical device such as a macrocell base station, and/or a low power base station for providing femtocells, picocells or other like cells having smaller coverage areas, smaller user capacity, or higher bandwidth compared to macrocells.

In some embodiments, all or parts of the RAN nodes 1231/1232 may be implemented as one or more software entities running on server computers as part of a virtual network, which may be referred to as a cloud RAN (CRAN) and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1231/1232; a MAC/PHY split wherein RRC, PDCP, RLC, and MAC layers are operated by the CRAN/vBBUP and the PHY layer is operated by individual RAN nodes 1231/1232; or a "lower PHY" split wherein RRC, PDCP, RLC, MAC layers and upper portions of the PHY layer are operated by the CRAN/vBBUP and lower portions of the PHY layer are operated by individual RAN nodes 1231/1232. This virtualized framework allows the freed-up processor cores of the RAN nodes 1231/1232 to perform other virtualized applications. In some implementations, an individual RAN node 1221/1232 may represent individual gNB-DUs that are connected to a gNB-CU via individual interfaces (not shown by FIG. 12). In these implementations, the gNB-DUs include one or more remote radio heads or RFEMs (see, e.g., FIGS. 13-14 infra), and the gNB-CU may be operated by a server that is located in the RAN (not shown) or by a server pool in a similar manner as the CRAN/vBBUP. Additionally or alternatively, one or more of the RAN nodes 1231/1232 may be next generation eNBs (ng-eNBs), which are RAN nodes 1231/1232 that provide E-UTRA user plane and control plane protocol terminations toward the UEs 1221, and are connected to a 5GC via an NG interface.

Any of the RAN nodes 1231/1232 can terminate the air interface protocol and can be the first point of contact for the UEs 1221 and IoT devices 1211. In some embodiments, any of the RAN nodes 1231/1232 can fulfill various logical functions for the RAN including, but not limited to, radio network controller (RNC) functions such as radio bearer management, uplink and downlink dynamic radio resource management and data packet scheduling, and mobility management. In embodiments, the UEs 1221 and IoT devices 1211 can be configured to communicate using OFDM communication signals with each other or with any of the RAN nodes 1231/1232 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

The RAN nodes 1231/1232 may be configured to communicate with one another via respective interfaces or links (not shown), such as an X2 interface for LTE implementations (e.g., when CN 1242 is an Evolved Packet Core (EPC)), an Xn interface for 5G or NR implementations (e.g., when CN 1242 is an Fifth Generation Core (5GC)), or the like. The ANs 1231 and 1232 are communicatively coupled to CN 1242. In embodiments, the CN 1242 may be an evolved packet core (EPC) network, a NextGen Packet Core (NPC) network, a 5G core (5GC), or some other type of CN. The CN 1242 may comprise a plurality of network elements, which are configured to offer various data and telecommunications services to customers/subscribers (e.g., users of UEs 1221 and IoT devices 1211) who are connected to the CN 1242 via a RAN. The components of the CN 1242 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 1242 may be referred to as a network slice, and a logical instantiation of a portion of the CN 1242 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1242 components/functions.

The CN 1242 is shown to be communicatively coupled to an application server 1250 and a network 1250 via an IP communications interface 1255. the one or more server(s) 1250 comprise one or more physical and/or virtualized systems for providing functionality (or services) to one or more clients (e.g., UEs 1221 and IoT devices 1211) over a network (e.g., cloud 1244). The server(s) 1250 may include various computer devices with rack computing architecture component(s), tower computing architecture component(s), blade computing architecture component(s), and/or the like. The server(s) 1250 may represent a cluster of servers, a server farm, a cloud computing service, or other grouping or pool of servers, which may be located in one or more datacenters. The server(s) 1230 may also be connected to, or otherwise associated with one or more data storage devices (not shown). Moreover, the server(s) 1250 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1250 offer applications or services that use IP/network resources. As examples, the server(s) 1250 may provide traffic management services, cloud analytics, content streaming services, immersive gaming experiences, social networking and/or microblogging services, and/or other like services. In addition, the various services provided by the server(s) 1250 may include initiating and controlling software and/or firmware updates for applications or individual components implemented by the UEs 1221 and IoT devices 1211. The server(s) 1250 can also be configured to support one or more communication services (e.g., Voice-over-Internet Protocol (VoIP) sessions, PTT sessions, group communication sessions, social networking services, etc.) for the UEs 1221 and IoT devices 1211 via the CN 1242.

The cloud 1244 may represent a cloud computing service, the Internet, a local area network (LAN) or a wide area network (WAN) including proprietary and/or enterprise networks for a company or organization, or combinations thereof. The cloud 1244 may be a network that comprises computers, network connections among the computers, and software routines to enable communication between the computers over network connections. In this regard, the cloud 1244 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1244 may be via a wired or a wireless connection using the various communication protocols discussed infra. More than one network may be involved in a communication session between the illustrated devices. Connection to the cloud 1244 may require that the computers execute software routines which enable, for example, the seven layers of the OSI model of computer networking or equivalent in a wireless (cellular) phone network. Cloud 1244 may be used to enable relatively long-range communication such as, for example, between the one or more server(s) 1250 and one or more UEs 1221 and IoT devices 1211. In some embodiments, the cloud 1244 may represent the Internet, one or more cellular networks, local area networks, or wide area networks including proprietary and/or enterprise networks, Transfer Control Protocol (TCP)/Internet Protocol (IP)-based network, or combinations thereof. In such embodiments, the cloud 1244 may be associated with network operator who owns or controls equipment and other elements necessary to provide network-related services, such as one or more base stations or access points, one or more servers for routing digital data or telephone calls (e.g., a core network or backbone network), etc. The backbone links 1255 may include any number of wired or wireless technologies, and may be part of a local area network (LAN), a wide area network (WAN), or the Internet. In one example, the backbone links 1255 are fiber backbone links that couple lower levels of service providers to the Internet, such as the CN 1242 and cloud 1244.

In some embodiments, at least some of the edge nodes 1220 may include or be part of a MEC system 1235. The term "MEC system" refers to a collection of MEC hosts (or MEC servers) and MEC management necessary to run MEC applications. The MEC system 1235 includes a collection of MEC servers 1236 (including MEC server 1236a and MEC server 1236b in FIG. 12) and MEC management systems (not shown by FIG. 12) necessary to run MEC applications (e.g., MEAs 1336 of FIG. 13) within an operator network or a subset of an operator network. The MEC servers 1236a, 1236b, 1236c (collectively referred to as "MEC servers 1236" or "MEC server 1236") are physical computer systems (e.g., server compute nodes) that include a MEC platform (e.g., MEP 1337 of FIG. 13) and a virtualization infrastructure (e.g., VI 1338 of FIG. 13), and provide compute, storage, and network resources to MEC applications. The MEC servers 1236 may also be referred to as "MEC hosts 1236" or "edge servers." In various embodiments, the MEC servers 1236 correspond to the MSP servers 136 of FIG. 1. The VI of the MEC servers 1236 provide virtualized environments and virtualized resources (e.g., "virtualized infrastructure") for the MEC hosts 1236, and the MEC applications may run as virtual machines (VMs) and/or application containers on top of the VI. The components and/or entities of the MEC system 1235 are discussed in more detail infra with respect to FIGS. 13-15.

As shown by FIG. 12, each of the (R)AN nodes 1221/1232 and AP 1233 are co-located with MEC servers 1236a, 1236b, and 1236c, respectively. These implementations may be small-cell clouds (SCCs) where a MEC server 1236 is co-located with a small cell (e.g., pico-cell, femto-cell, etc.), or may be mobile micro clouds (MCCs) where a MEC server 1236 is co-located with a macro-cell (e.g., an eNB, gNB, etc.). The MEC servers 1236 may be deployed in a multitude of arrangements other than as shown by FIG. 12. In a first example, the MEC servers 1236 may be co-located or operated by RNCs, which may be the case for legacy network deployments, such as 3G networks. In a second example, the MEC servers 1236 may be deployed at cell aggregation sites or at multi-RAT aggregation points that can be located either within an enterprise or used in public coverage areas. In a third example, the MEC servers 1236 may be deployed at the edge of CN 1242. These implementations may be used in follow-me clouds (FMC), where cloud services running at distributed data centers follow the UEs 1221 as they roam throughout the network.

According to various embodiments, task offloading may be "opportunistic", wherein the MEC system 1235 (or a particular MEC server 1236 selected as a master node in the example of FIG. 12) may offload application tasks to one or more UEs 1221 taking into account the computational complexity of the tasks and/or the amount of computational and network/signaling resources available at the UEs 1221 (or MEC servers 1236). For example, a MEC server 1236 may offload a certain number and/or type of tasks based on the quality or strength of links 1203, 1205, and/or 1207, the strength or quality of the computational resources available at the UEs 1221, an amount of available memory or a current memory utilization of the UEs 1221, and/or based on other operational parameters of (or experienced by) the UEs 1221. In some embodiments, the MEC system 1235 (or a particular MEC server 1236 selected as a master node) may select one or more MEC servers 1236 to which a UE 1221 may offload application tasks or workloads. In some embodiments, a device application or client application operating in a UE 1221 may offload application tasks to one or more MEC servers 1236. For some identified tasks, the MEC system 1235 (or device/client application at the UE 1221) may evaluate the offloading opportunity (e.g., the "tradeoff") with respect to available UEs 1221 (or MEC server(s) 1236), in which case the MEC system 1235 may offload tasks to certain UEs 1221 (or MEC server(s) 1236) that are capable of providing output data from performing their respective tasks back to the MEC server 1236 (or UE 1221) in a desired period of time. Based on the operational parameters discussed previously, offloading tradeoffs may be evaluated and optimal or best offloading opportunities may be determined based on the tradeoffs.

Figure 13:
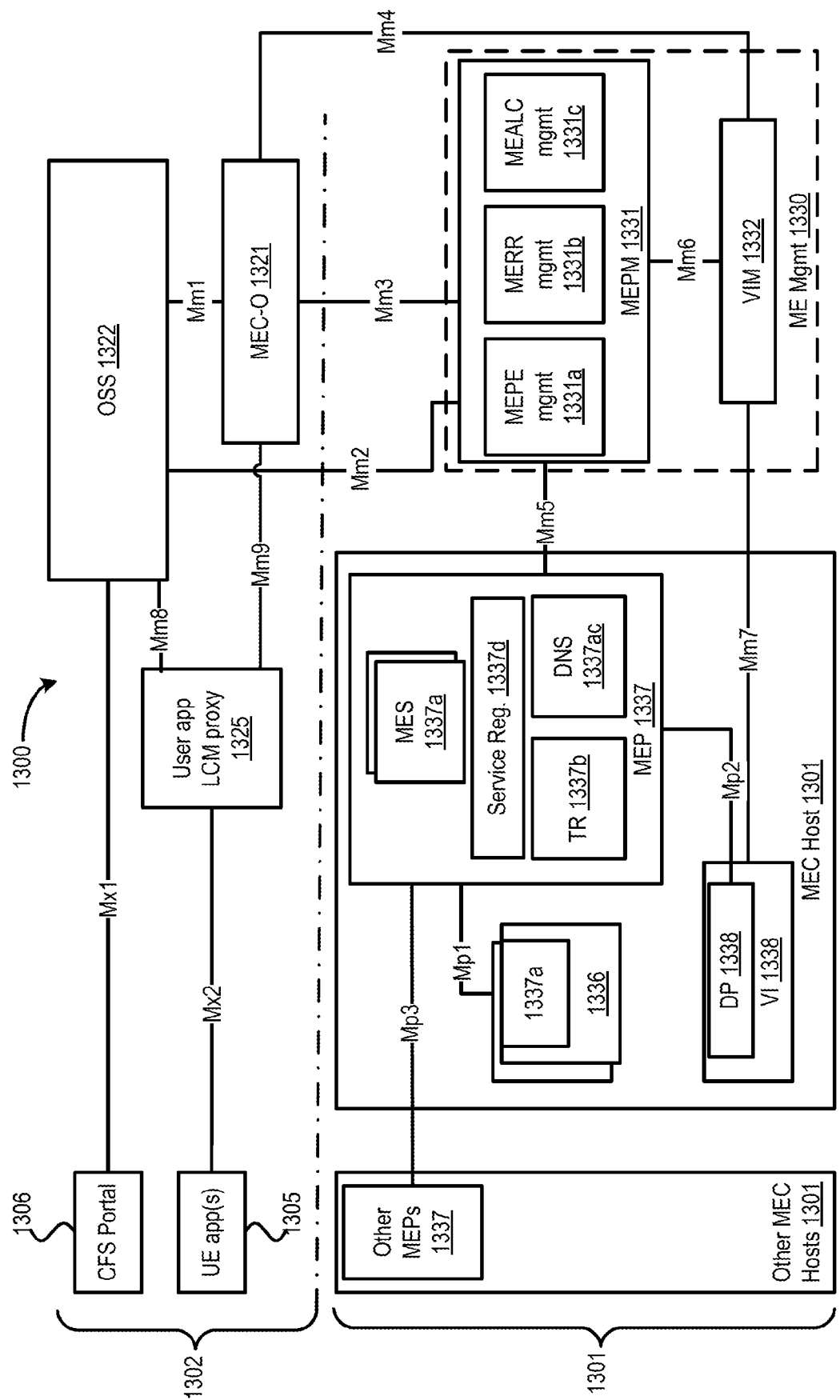
FIG. 13 illustrates an example MEC system architecture according to various embodiments.

FIG. 13 illustrates an example MEC system architecture 1300 in accordance with various embodiments. The MEC system 1300 of FIG. 13 is a first embodiment of a system architecture of the MEC system 1235 discussed previously. The illustrated logical connections between various entities of the MEC architecture 1300 may be access-agnostic and not dependent on a particular deployment. MEC enables implementation of MEC applications ("MEC apps" or "MEAs") 1336 as software-only entities that run on top of a Virtualization Infrastructure (VI) 1338, which is located in or close to the network edge. A MEC app 1336 is an application that can be instantiated on a MEC host 1301/1236 within the MEC system 1300 and can potentially provide or consume MEC services 1337a. The term "user application" in the context of MEC refers to an MEA 1336 that is instantiated in the MEC system 1300 in response to a request from a user (e.g., vUE 125) via a device application. FIG. 13 shows the general entities involved, and these entities can be grouped into multi-access edge system level 1302, multi-access edge host level 1301, and network level entities (not shown). The multi-access edge host level 1301 includes MEC servers 1236/1301 and multi-access edge (ME) management (mgmt) 1330, which provide functionality to run MEAs 1336 within an operator network or a subset of an operator network. The multi-access edge system level 1302 includes multi-access edge system level management 1302, UE (which may be the same or similar to the intermediate nodes 1220 and/or endpoints 1210 discussed herein), and third party entities. The network level (not shown) includes various external network level entities, such as a 3GPP network (e.g., CN 1242 of FIG. 12), a local area network (e.g., a LAN, WLAN, PAN, etc.), and an external network (e.g., CN 1242 and/or cloud 1244 of FIG. 12). The multi-access edge host level 1301 includes multi-access edge host level management and MEC server 1236/1301. The multi-access edge host level management may include various components that handle the management of the multi-access edge specific functionality of a particular MEP 1337, MEC server 1236/1301, and the MEAs 1336 to be run. The MEC server 1236/1301 includes the MEP 1337, MEAs 1336, and VI 1338.

The MEC system 1300 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 1300 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 1236/1301 is an entity that contains an MEP 1337 and VI 1338 which provides compute, storage, and network resources for the purpose of running MEAs 1336. The VI 1338 includes a data plane (DP) 1338 that executes the traffic rules (TR) 1337b received by the MEP 1337, and routes the traffic among applications (e.g., MEAs 1336), ME services (MESs) 1337a, DNS server/proxy (see e.g., via DNS handling entity 1337c), 3GPP network, local networks, and external networks. The MEC DP 1338a may be connected with the (R)AN nodes 1211 and CN 1242 of FIG. 12 over interfaces 1214/815, and/or may be connected with the AP 1233 of FIG. 12 via a wider network 1250, such as the internet, an enterprise network, or the like. The other entities depicted and/or discussed herein may be the same or similar as those discussed with regard to FIG. 13.

The MEP 1337 within the MEC server 1236/1301 may be a collection of essential functionality required to run MEAs 1336 on a particular VI 1338 and enable them to provide and consume MESs 1337a, and that can provide itself a number of MEC services. The MEP 1337 can also provide various services and/or functions, such as offering an environment where the MEAs 1336 can discover, advertise, consume and offer MESs 1337a (discussed infra), including MESs 1337a available via other platforms when supported. The MEP 1337 may be able to allow authorized MEAs 1336 to communicate with third party servers located in external networks. The MEP 1337 may receive traffic rules from the multi-access edge platform manager (MEPM) 1331, applications, or services, and instruct the data plane accordingly (see e.g., Traffic Rules Control 1337b also referred to as filtering roles control module 1337b). The MEP 1337 may send instructions to the DP 1338 within the VI 1338 via the Mp2 reference point. The Mp2 reference point between the MEP 1337 and the DP 1338 of the VI 1338 may be used to instruct the DP 1338 on how to route traffic among applications, networks, services, etc. In some implementations, the MEP 1337 may translate tokens representing UEs XP01 in the traffic rules into specific IP addresses. The MEP 1337 also receives DNS records from the MEPM 1331 and configures a DNS proxy/server accordingly. The MEP 1337 hosts MESs 1337a including the multi-access edge services discussed infra, and provide access to persistent storage and time of day information. Furthermore, the MEP 1337 may communicate with other MEPs 1337 of other MEC servers 1236/1301 via the Mp3 reference point.

The VI 1338 may represent the totality of all hardware and software components which build up the environment in which MEAs 1336 and/or MEP 1337 are deployed, managed and executed. The VI 1338 may span across several locations, and the network providing connectivity between these locations is regarded to be part of the VI 1338. The physical hardware resources of the VI 1338 includes computing, storage and network resources that provide processing, storage and connectivity to MEAs 1336 and/or MEP 1337 through a virtualization layer (e.g., a hypervisor, VM monitor (VMM), or the like). The virtualization layer may abstract and/or logically partition the physical hardware resources of the MEC server 1236/1301 as a hardware abstraction layer. The virtualization layer may also enable the software that implements the MEAs 1336 and/or MEP 1337 to use the underlying VI 1338, and may provide virtualized resources to the MEAs 1336 and/or MEP 1337, so that the MEAs 1336 and/or MEP 1337 can be executed.

The MEAs 1336 are applications that can be instantiated on a MEC host/server 1236/1301 within the MEC system 1300 and can potentially provide or consume MESs 1337a. The term "MEC service" or "MES" refers to a service provided via the MEC platform 1337 either by the MEC platform 1337 itself or by a MEC application 1336. MEAs 1336 may run as VM on top of the VI 1338 provided by the MEC server 1236/1301, and can interact with the MEP 1337 to consume and provide the MESs 1337a. The MEAs 1336 are instantiated on the VI 1338 of the MEC server 1236/1301 based on configuration or requests validated by the ME management 1330. In some embodiments, the MEAs 1336 can also interact with the MEP 1337 to perform certain support procedures related to the lifecycle of the MEAs 1336, such as indicating availability, preparing relocation of user state, etc. The MEAs 1336 may have a certain number of rules and requirements associated to them, such as required resources, maximum latency, required or useful services, etc. These requirements may be validated by the multi-access edge system level management 1330, and can be assigned to default values if missing. MESs 1337a may be services provided and consumed either by the MEP 1337 or MEAs 1336. When provided by an application, an MES 1337a can be registered in a list of services 1337d to the MEP 1337 over the Mp1 reference point. Additionally, the MEAs 1336 can subscribe to one or more services 1337a for which it is authorized over the Mp1 reference point.

The MEC system 1300 may support a feature called UserApps. When the MEC system 1300 supports the feature UserApps, the multi-access edge management may support the instantiation of MEAs 1336 (or user applications) on multiple MEC servers 1236/1301 following a single instantiation request, and when required by the operator in response to a request by the user. The application instance may need to fulfil a number of potential constraints predefined for the application. Once instantiated, connectivity may be established between the UE 125 and the application instance. Potential constraints may include latency, location, compute resources, storage resources, network capability, security conditions, and the like. As part of the user application (or MEC app 1336) instantiation, the MEC system 1300 will create an associated application context that the MEC system 1300 maintains for the lifetime of the user application (or MEC app 1336). The application context is a set of reference data about an application instance that is used to identify it, enable lifecycle management operations and associate it with its device application, The term "user context" in the context of MEC refers to application-specific runtime data maintained by a MEC app 1336, which is associated with a user of that application. The application context contains information specific to the application instance such as its unique identifier within the MEC system 1300 and the address (e.g., URI or the like) provided for clients (e.g., vUE 125) that are external to the MEC system 1300 to interact with the user application.

When the MEC system 1300 supports the feature User-Apps, the system 1300 may, in response to a request by a user, support the establishment of connectivity between a UE and an instance of a specific MEA 1336 fulfilling the requirements of the MEA 1336 regarding the UE (e.g., vUE 125). If no instance of the MEA 1336 fulfilling these requirements is currently running, the multi-access edge system management may create a new instance of the application on a MEC host 1301 that fulfils the requirements of the application. Once instantiated, connectivity shall be established between the UE and the new MEA 1336 instance. Requirements of the application can include latency, location, compute resources, storage resources, network capability, security conditions, and the like. When the MEC system 1300 supports the feature UserApps, the system 1300 may support the on-boarding of MEAs 1336 during the execution of an instantiation request, may allow the establishment of connectivity between a UE and a specific instance of an MEA 1336, may support the capability to terminate the MEA 1336 instance when no UE is connected to it anymore, and may support the termination of the MEA 1336 running on multiple MEC servers 1236/1301 following a single termination request.

As shown by FIG. 13, the Mp1 reference point is between the MEP 1337 and the MEAs 1336. The Mp1 reference point may provide service registration 1337d, service discovery, and communication support for various services, such as the MESs 1337a. In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MESs 1337a include Radio Network Information Service (RNIS), location services, and bandwidth management services. The RNIS, when available, provides authorized MEAs 1336 with radio network related information, and expose appropriate up-to-date radio network information to the MEAs 1336. The radio network information (RNI) may include, inter alia, radio network conditions, measurement and statistics information related to the user plane, information related to UEs served by the radio node(s) associated with the multi-access edge host (e.g., UE context and radio access bearers), changes on information related to UEs served by the radio node(s) associated with the multi-access edge host, and/or the like. The RNI may be provided at the relevant granularity (e.g., per UE, per cell, per period of time).

The service consumers (e.g., MEAs 1336 and MEP 1337) may communicate with the RNIS over an RNI Application Programming Interface (API) to obtain contextual information from a corresponding RAN. RNI may be provided to the service consumers via an access node (e.g., (R)AN nodes 131,132 or AP 133 of FIG. 12). The RNI API may support both query and subscription (e.g., a pub/sub) based mechanisms that are used over a Representational State Transfer (RESTful) API or over a message broker of the MEP 1337 (not shown by FIG. 13). A MEA 1336 may query information on a message broker via a transport information query procedure, wherein the transport information may be pre-provisioned to the MEA 1336 via a suitable configuration mechanism. The various messages communicated via the RNI API may be in XML, JSON, Protobuf, or some other suitable format.

The RNI may be used by MEAs 1336 and MEP 1337 to optimize the existing services and to provide new types of services that are based on up to date information on radio conditions. As an example, a MEA 1336 may use RNI to optimize current services such as video throughput guidance. In throughput guidance, a radio analytics MEA 1336 may use MEC services to provide a backend video server (e.g., server(s) 130) with a near real-time indication on the throughput estimated to be available at the radio downlink interface in a next time instant. The throughput guidance radio analytics application 1336 computes throughput guidance based on the required radio network information it obtains from a multi-access edge service running on the MEC server 1236. RNI may be also used by the MEP 1337 to optimize the mobility procedures required to support service continuity, such as when a certain MEA 1336 requests a single piece of information using a simple request-response model (e.g., using RESTful mechanisms) while other MEAs 1336 subscribe to multiple different notifications regarding information changes (e.g., using a pub/sub mechanism and/or message broker mechanisms).

In various embodiments, a MEC server 1236/1301 acting as a master node for distributed ML (e.g., the MEC server 1236 in the example of FIG. 12) may access RNI of individual UEs via a MEA 1336 and/or the MEP 1337 using the RNI API for the purposes of evaluating the channel conditions and/or link quality for partitioning training datasets and/or for assigning computational tasks to the individual UEs. In an example, an application implemented by a MEC entity (e.g., the MEC-O 1321) may access RNI via a MEA 1336 or the MEP 1337 using the RNI API, which may be used to select a MEC server 1236 to act as the master node for distributed ML.

The location services (LS), when available, may provide authorized MEAs 1336 with location-related information, and expose such information to the MEAs 1336. With location related information, the MEP 1337 or one or more MEAs 1336 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs currently served by the radio node(s) associated with the MEC server 1236, information about the location of all UEs currently served by the radio node(s) associated with the MEC server 1236, information about the location of a certain category of UEs currently served by the radio node(s) associated with the MEC server 1236/1301, a list of UEs in a particular location, information about the location of all radio nodes currently associated with the MEC server 1236, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 1236, or a subset thereof, according to a desired deployment. In this regard, the OMA Zonal Presence API provides means for MEAs 1336 to retrieve information about a zone, the access points associated to the zones and the users that are connected to the access points. In addition, the OMA Zonal Presence API, allows authorized application to subscribe to a notification mechanism, reporting about user activities within a zone. In various embodiments, a MEC server 1236/1301 may access location information or zonal presence information of individual UEs using the OMA Zonal Presence API to identify the relative location or positions of the UEs.

The bandwidth management services (BWMS) provides for the allocation of bandwidth to certain traffic routed to and from MEAs 1336, and specify static/dynamic up/down bandwidth resources, including bandwidth size and bandwidth priority. MEAs 1336 may use the BWMS to update/receive bandwidth information to/from the MEP 1337. In some embodiments, different MEAs 1336 running in parallel on the same MEC server 1236 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism.

Referring back to FIG. 13, multi-access edge management comprises multi-access edge system level management and the multi-access edge host level management 1330. The multi-access edge host level management 1330 comprises the MEPM 1331 and the VI manager (VIM) 1332, and handles the management of the multi-access edge specific functionality of a particular MEC server 1236 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure.

The MEPM 1331 is responsible for managing the life cycle of applications including informing the multi-access edge orchestrator (MEC-0) 1321 of relevant application related events. The MEPM 1331 may also provide MEP element management functions (MEPE mgmt 1331*a*) to the MEP 1337, manage MEA rules and requirements (MERR mgmt 1331*b*) including service authorizations, traffic rules, DNS configuration and resolving conflicts, and manage MEA 1336 lifecycles (MEALC mgmt 1331*c*). The MEPM 1331 may also receive virtualized resources fault reports and performance measurements from the VIM 1332 for further processing. The Mm5 reference point between the MEPM 1331 and the MEP 1337 is used to perform platform configuration, configuration of the MEPE mgmt 1331*a*, the MERR mgmt 1331*b*, the MEALC mgmt 1331*c*, management of application relocation, etc.

The VIM 1332 may be an entity that allocates, manages and releases virtualized (compute, storage and networking) resources of the VI 1338, and prepares the VI 1338 to run a software image. To do so, the VIM 1332 may communicate with the VI 1338 over the Mm7 reference point between the VIM 1332 and the VI 1338. Preparing the VI 1338 may include configuring the VI 1338, and receiving/storing the software image. When supported, the VIM 1332 may provide rapid provisioning of applications, such as described in "Openstack++ for Cloudlet Deployments", available at http://reports-archive.adm.cs.cmu.edu/anon/2015/CMU-CS-15-123.pdf. The VIM 1332 may also collect and report performance and fault information about the virtualized resources, and perform application relocation when supported. For application relocation from/to external cloud environments, the VIM 1332 may interact with an external cloud manager to perform the application relocation, for example using the mechanism described in "Adaptive VM Handoff Across Cloudlets", and/or possibly through a proxy. Furthermore, the VIM 1332 may communicate with the MEPM 1331 via the Mm6 reference point, which may be used to manage virtualized resources, for example, to realize the application lifecycle management. Moreover, the VIM 1332 may communicate with the MEC-O 1321 via the Mm4 reference point, which may be used to manage virtualized resources of the MEC server 1236, and to manage application images. Managing the virtualized resources may include tracking available resource capacity, etc.

The multi-access edge system level management includes the MEC-O 1321 as a core component, which has an overview of the complete MEC system 1300. The MEC-O 1321 may maintain an overall view of the MEC system 1300 based on deployed multi-access edge hosts 1301, available resources, available MESs 1337a, and topology. The Mm3 reference point between the MEC-O 1321 and the multi-access edge platform manager 1330 may be used for the management of the application lifecycle, application rules and requirements and keeping track of available MESs 1337a. The MEC-O 1321 may communicate with the user application lifecycle management proxy (UALMP) 1325 via the Mm9 reference point in order to manage MEAs 1336 requested by UE application 1305.

The MEC-O 1321 may also be responsible for on-boarding of application packages, including checking the integrity and authenticity of the packages, validating application rules and requirements and if necessary adjusting them to comply with operator policies, keeping a record of on-boarded packages, and preparing the VIM(s) 1302 to handle the applications. The MEC-O 1321 may select appropriate MEC host(s) 1301 for application instantiation based on constraints, such as latency, available resources, and available services. The MEC-O 1321 may also trigger application instantiation and termination, as well as trigger application relocation as needed and when supported.

The Operations Support System (OSS) 1322 refers to the OSS of an operator that receives requests via the Customer Facing Service (CFS) portal 1306 (and over the Mx1 reference point) and from UE applications 1305 for instantiation or termination of MEAs 1336, and decides on the granting of these requests. The CFS portal 1306 (and the Mx1 interface) may be used by third-parties to request the MEC system 1300 to run applications 1306 in the MEC system 1300. Granted requests may be forwarded to the MEC-O 1321 for further processing. When supported, the OSS 1322 also receives requests from UE applications 1305 for relocating applications between external clouds and the MEC system 1300. The Mm2 reference point between the OSS 1322 and the multi-access edge platform manager 1330 is used for the multi-access edge platform 1330 configuration, fault and performance management. The Mm1 reference point between the MEC-O 1321 and the OSS 1322 is used for triggering the instantiation and the termination of multi-access edge applications 1336 in the MEC system 1300.

The UE app(s) 1305 (also referred to as "device applications" or the like) is one or more applications running in a device, computing system, etc. (e.g., vUE 125), that has the capability to interact with the MEC system 1300 via the user application lifecycle management proxy 1325. The UE app(s) 1305 may be, include, or interact with one or more client applications, which in the context of MEC, is application software running on a device, computing system, etc. that utilizes functionality provided by one or more specific MEC application(s) 1336. The user application lifecycle management proxy ("user app LCM proxy") 1325 may authorize requests from UE applications 1305 in the UE (e.g., vUE 125) and interacts with the OSS 1322 and the MEC-O 1321 for further processing of these requests. The term "lifecycle management" in the context of MEC refers to a set of functions required to manage the instantiation, maintenance and termination of a MEC application 1336 instance. The user app LCM proxy 1325 may interact with the OSS 1322 via the Mm8 reference point, and is used to handle UE applications 1305 requests for running applications in the MEC system 1300. A user application 1305 may be an MEC app 1336 that is instantiated in the MEC system 1300 in response to a request of a user via an application running in the intermediate nodes 1220 and/or endpoints 1210 (e.g., UE application 1305). The user app LCM proxy 1325 allows UE applications 1305 to request on-boarding, instantiation, termination of user applications and when supported, relocation of user applications in and out of the MEC system 1300. It also allows informing the UE applications 1305 about the state of the user applications 1305. The user app LCM proxy 1325 is only accessible from within the mobile network, and may only be available when supported by the MEC system 1300. A UE application 1305 may use the Mx2 reference point between the user app LCM proxy 1325 and the UE application 1305 to request the MEC system 1300 to run an application in the MEC system 1300, or to move an application in or out of the MEC system 1300. The Mx2 reference point may only be accessible within the mobile network and may only be available when supported by the multi-access edge system.

In order to run an MEA 1336 in the MEC system 1300, the MEC-O 1321 receives requests triggered by the OSS 1322, a third-party, or a UE application 1305. In response to receipt of such requests, the MEC-O 1321 selects a MEC server 1236 to host the MEA 1336 for computational offloading. These requests may include information about the application to be run, and possibly other information, such as the location where the application needs to be active, other application rules and requirements, as well as the location of the application image if it is not yet on-boarded in the MEC system 1300.

In various embodiments, the MEC-O 1321 selects one or more MEC servers 1236 for computational intensive tasks. The selected one or more MEC servers 1236 may offload computational tasks of a UE application 1305 based on various operational parameters, such as network capabilities and conditions, computational capabilities and conditions, application requirements, and/or other like operational parameters. The application requirements may be rules and requirements associated to/with one or more MEAs 1336, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEAs 1336 to be able to run; multi-access edge services that the MEAs 1336 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's multi-access edge system deployment or mobile network deployment (e.g., topology, cost); requirements on access to user traffic; requirements on persistent storage; traffic rules; DNS rules, etc.

The MEC-O 1321 considers the requirements and information listed above and information on the resources currently available in the MEC system 1300 to select one or several MEC servers 1236 within the MEC system 1301 to host MEAs 1336 and/or for computational offloading. After one or more MEC servers 1236 are selected, the MEC-O 1321 requests the selected MEC host(s) 1301 to instantiate the application(s) or application tasks. The actual algorithm used to select the MEC servers 1236 depends on the implementation, configuration, and/or operator deployment. In various embodiments, the selection algorithm may be based on the task offloading embodiments discussed herein, for example, by taking into account network, computational, and energy consumption requirements for performing tasks of application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 1321 may decide to select one or more new MEC servers 1236 to act as a master node, and initiates the transfer of an application instance or application-related state information from the one or more source MEC servers 1236 to the one or more target MEC servers 1236.

Figure 14:
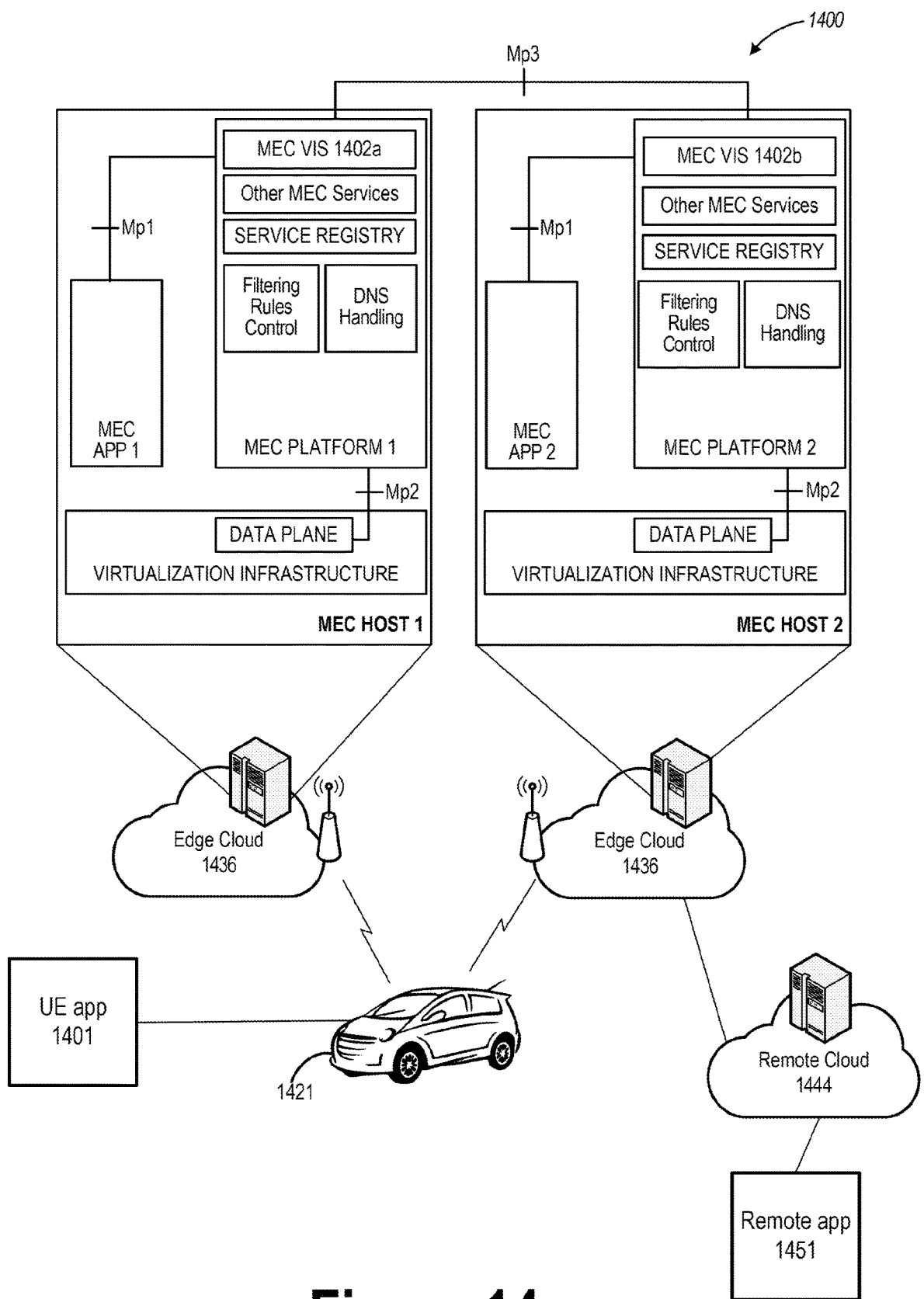
FIG. 14 illustrates a V2X system involving multiple MEC hosts according to various embodiments.

FIG. 14 illustrates a V2X system involving multiple MEC hosts (corresponding to MEC host 1301) and the use of V2X Information Services (VIS) 1402a-b (collectively referred to as "MEC VIS 1402"). FIG. 14 is an example of application instances in a V2X service with MEC V2X API. In the framework of V2X services, a vehicle 1421 (which may be the same or similar as vehicle system 121 of FIG. 1) is hosting a client application, and is connected to a certain MEC host (and a related MEC application). In presence of multiple MEC hosts, the VIS 1402 permits to expose information between MEC applications running on different MEC hosts. In addition, other remote application server instances can be located somewhere else (e.g., private clouds owned by the operator or by the OEM). The VIS 1402 may be produced by the MEC platform or by the MEC application (e.g., MEAs 1336).

In particular, the VIS 1402 permits information exposure, pertinent to the support of automotive use cases, to MEC application instances. VIS 1402 also permits a single ITS operator to offer a V2X service over a region that may span different countries and involve multiple network operators, MEC systems and MEC application providers. For that purpose, the MEC VIS 1402 includes the following functionalities:

In some aspects, the MEC platform (corresponding to MEP 1337) can include a MEC V2X API and provide MEC VIS, which can include the following functionalities: (a) gathering of PC5 V2X relevant information from the 3GPP network for purposes of performing UE authorization for V2X communications (e.g., obtaining a list of V2X authorized UEs, obtaining relevant information about the authorization based on the UE subscription, and obtaining V2X configuration parameters such as a common set of V2X configuration parameters which can include PC5 configuration parameters); (b) exposure of the information obtained in (a) to MEC apps in the same host or MEC apps in other MEC hosts; (c) enablement of MEC apps to communicate securely with the V2X-related 3GPP core network logical functions (e.g., enabling communication between the MEC host and a V2X control function in the core network); (d) enablement of MEC apps in different MEC systems to communicate securely with each other; and (e) gathering and processing information available in other MEC APIs (e.g., gathering and processing information obtained from a RNI API, Location API, WLAN API, and other APIs that may be implemented within the MEC platform) in order to predict radio network congestion, and provide suitable notifications to the UE.

From that perspective, the VIS 1402 is relevant to Mp1 and Mp3 reference points in the MEC architecture (se e.g., FIG. 13). In particular, the relevant information is exposed to MEC apps via the Mp1 reference point, and the Mp3 reference point may enable the possibility to transfer this information between different MEC platforms. The MEC V2X API provides information to MEC applications in a standardized way, which provides interoperability in multi-vendor scenarios. Nevertheless, MEC applications may communicate in a direct way (e.g., without the use of MEC platform). Inter-system communication may be realized between MEOs. As an alternative, or, in addition to that, possible Mp3 enhancements (or new reference points between MEC systems) may be defined.

In some aspects, the second MEC host (MEC Host 2 in FIG. 14) can also implement a MEC V2X API, which can provide an interface to one or more of the apps instantiated within MEC Host 2, such as MEC app 2. In this regard, MEC Host 2 and MEC Host 1 can communicate with each other via the Mp3 interface as well as the MEC V2X APIs. Additionally, one or more of the apps instantiated within MEC Host 1 can communicate with one or more of the apps instantiated within MEC Host 2 via the MEC V2X APIs as well as the interface between the MEC Host 1 and MEC Host 2.

In some aspects, each of the MEC hosts can be owned/managed by a different mobile services operator (while it can be operated directly by a MEC vendor or a third party). In some aspects, MEC applications instantiated on MEC Host 1 and MEC Host 2 can be used to provide V2X-related services, and can be operated by the mobile services operator, by a MEC vendor, or by a third party (e.g., OEM, or OEM supplier, or system integrator).

In some aspects, the MEC V2X APIs can be provided as a general middleware service, providing information gathered from vehicles and other V2X elements, and exposed as a service within the hosts (e.g., as a RESTful API) for the higher layers (e.g., the MEC apps instantiated within the hosts). In some aspects, the MEC V2X APIs can be configured to gather information and data from sensors. In this regard, the deployment of the MEC V2X APIs is ensuring continuity of the service across different mobile networks, for the same OEM (e.g., automobile manufacturer). If a standard implementation of a V2X API is introduced (e.g., by ETSI MEC), this functionality can ensure the same basic V2X service characteristics for all OEMs in a 5G communication system with MEC functionalities.

In some aspects, MEC app 1 and MEC app 2 can use the corresponding MEC V2X APIs to retrieve information from the 3GPP network. In some aspects, MEC app 1 and MEC app 2 can be configured to host V2X configuration parameters such as PC5 configuration parameters (or a common set of V2X configuration parameters that can be available within a multi—PLMN communication environment). The availability of these V2X configuration parameters also in absence of network coverage is ensured by the usage of an Mp3 interface (or another type of interface) between the hosts. In some aspects, MEC app 1 can be configured to connect to MEC Host 2 (through V2X MEC API in MEC Host 2), and MEC app 2 can be configured to connect to MEC Host 1 (through V2X MEC API in MEC Host 1). In case of a multi-operator architecture, multiple MEC hosts can be configured to communicate with each other via the MEC V2X APIs and synchronize in order to transfer the relevant V2X configuration parameters, so that they can be available across the multi-operator architecture in absence of cellular coverage (e.g., outside of the 3GPP domain). In this way, a UE (e.g., vUE 125/821*a*) can have access to V2X configuration parameters even when the UE is not under coverage of its 3GPP network.

In some aspects, one or more ME apps within a MEC host can be instantiated to perform functionalities of a V2X application function, which may include providing VIS 1402; an example of which is shown by Figure XP4. Additionally, MEC hosts can use MEC V2X APIs to perform various V2X or VIS 1402 functions. In particular, one or more ME apps can be instantiated within a MEC host to perform functionalities associated with a V2X application function. In some aspects, these ME apps can be configured to perform the following V2X application functions: obtaining V2X subscription information for a vUE 1221*a*, determining whether the vUE 1221*a* is authorized to perform V2X communications in response to a request for V2X services, communicating V2X configuration parameters such as a common set of V2X configuration parameters, and so forth.

Figure 15:
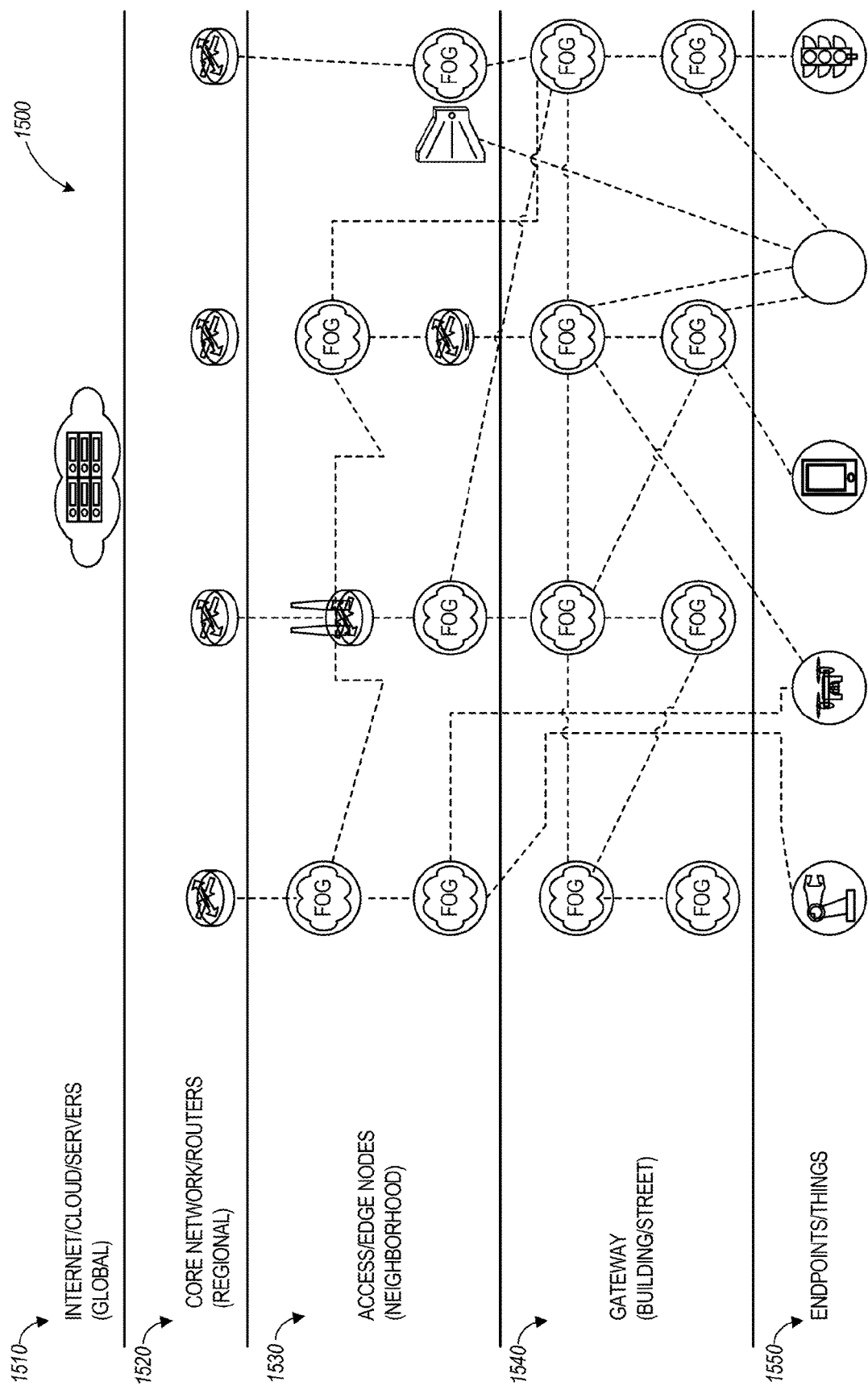
FIG. 15 illustrates a MEC and FOG network topology according to an example embodiment.

FIG. 15 illustrates a MEC and FOG network topology 1500 according to an example embodiment. Referring to FIG. 15, the network topology 1500 can include a number of conventional networking layers, may be extended through use of the various embodiments discussed herein. Specifically, the relationships between endpoints (at endpoints/things network layer 1550), gateways (at gateway layer 1540), access or edge computing nodes (e.g., at neighborhood nodes layer 1530), core network or routers (e.g., at regional or central office layer 1520), may be represented through the use of data communicated via MEC systems/hosts located at various nodes within the topology 1500.

A FOG network (e.g., established at gateway layer 1540) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 15 illustrates a general architecture that integrates a number of MEC and FOG nodes—categorized in different layers (based on their position, connectivity and processing capabilities, etc.), with each node implementing the various embodiments discussed herein that can enable a MEC app or other entity of a MEC enabled node to communicate with other nodes. It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC host, or a simple entity hosting a MEC app and a light-weighted MEC platform.

In an example, a MEC or FOG node may be defined as an application instance, connected to or running on a device (MEC host) that is hosting a MEC platform. Here, the application consumes MEC services and is associated to a MEC host in the system. The nodes may be migrated, associated to different MEC hosts, or consume MEC services from other (e.g., local or remote) MEC platforms.

Figure 16:
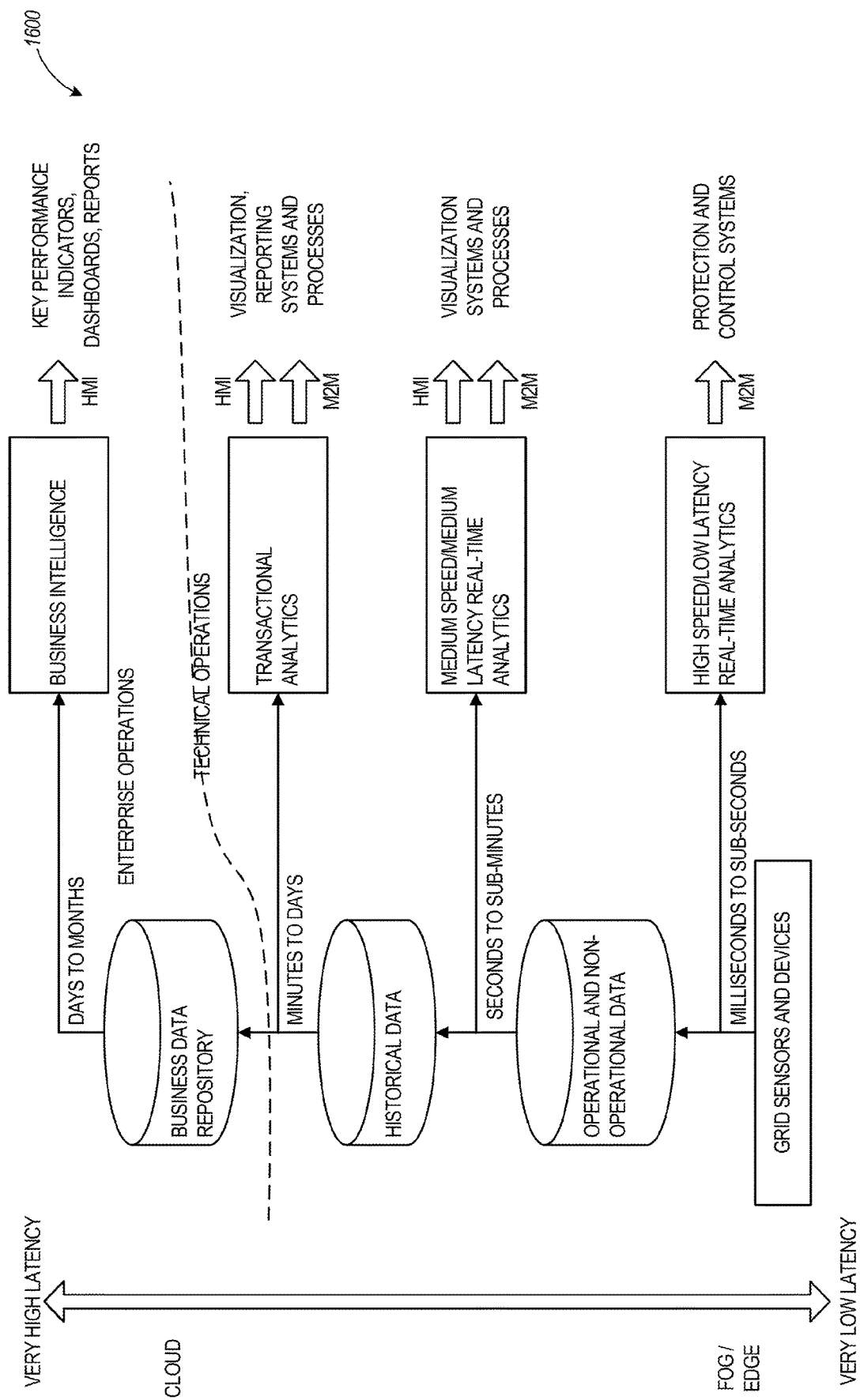
FIG. 16 illustrates an example MEC and FOG network topology according to another example embodiment.

FIG. 16 illustrates an example MEC and FOG network topology according to another example embodiment. This network topology 1600 in FIG. 16, which includes a number of conventional networking layers, may be extended through use of the tags and objects discussed herein. Specifically, the relationships between endpoints (at endpoints/things network layer 1550 of FIG. 15), gateways (at gateway layer 1540 of FIG. 15), access or edge computing nodes (e.g., at neighborhood nodes layer 1530 of FIG. 15), core network or routers (e.g., at regional or central office layer 1520 of FIG. 15), may be represented through the use of linked objects and tag properties.

A FOG network (e.g., established at gateway layer 1524 of FIG. 15) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 16 illustrates a general architecture that integrates a number of MEC and FOG nodes—categorized in different layers (based on their position, connectivity and processing capabilities, etc.). It should be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC Host 1301, or a simple entity hosting a MEC app 1336 and a light-weighted MEC Platform 1337. In an example, a MEC or FOG node may be defined as an application instance, connected to or running on a device (ME Host) that is hosting a ME Platform. Here, the application consumes MEC services and is associated to a MEC Host in the system. The nodes may be migrated, associated to different MEC Hosts, or consume MEC services from other (e.g., local or remote) MEC platforms 1337.

In contrast to this approach, traditional V2V/V2X applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in a vehicular communications context, a hierarchical structure of data processing and storage nodes are defined. For example, including local ultra-low-latency processing, regional storage and processing as well as remote cloud data-center based storage and processing. Service level agreements (SLAs) and key performance indicators (KPIs) may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud datacenter.

As alluded to previously, embodiments herein introduce an approach to use MEC and Edge Computing entities applied to AECC MSP Enterprise Network interfacing with operator cellular network. The AECC edge offloading within cellular network and interfacing with MSP enterprise network is shown by FIGS. 1, 2A, and 2B.

Referring to FIG. 2B, which illustrates another example AECC system 200B, the MSP Edge Servers 136 are connected to the MSP Center Server 150 via an Enterprise Network as defined in the AECC distributed computing architecture reference model. According to the deployment of MSP Edge Server 136 instances, the data offloading points may be selected at appropriate places in the Cellular Network 140/240 to meet the service requirements on latency and capacity. In FIG. 2B, like numbered elements are the same as discussed previously with respect to FIGS. 1 and 2A.

The existing AECC Reference Architecture does not give solutions as to how edge offloading happens within the cellular network 140/240 and how the MSP enterprise network interfaces with the cellular network 140/240. Various embodiments cover edge offloading taking place within cellular network and MSP enterprise network interfacing with cellular network. Embodiments herein provide such solutions to build a more complete guidance for the industry.

European Telecommunications Standards Institute (ETSI) Multi-access Edge Computing (MEC) is a system that provides an Information Technology (IT) service environment and cloud-computing capabilities at the edge of an access network (e.g., a cellular network, a WLAN, etc.), which contains one or more type of access technology, and in close proximity to its users. For AECC systems, such as those shown and described with respect to FIGS. 1 and 2A-2B, it is important to support interfacing between MSP edge servers 136 and the MSP central server 150 within the MSP enterprise network beyond the ETSI MEC architecture.

Figure 17:
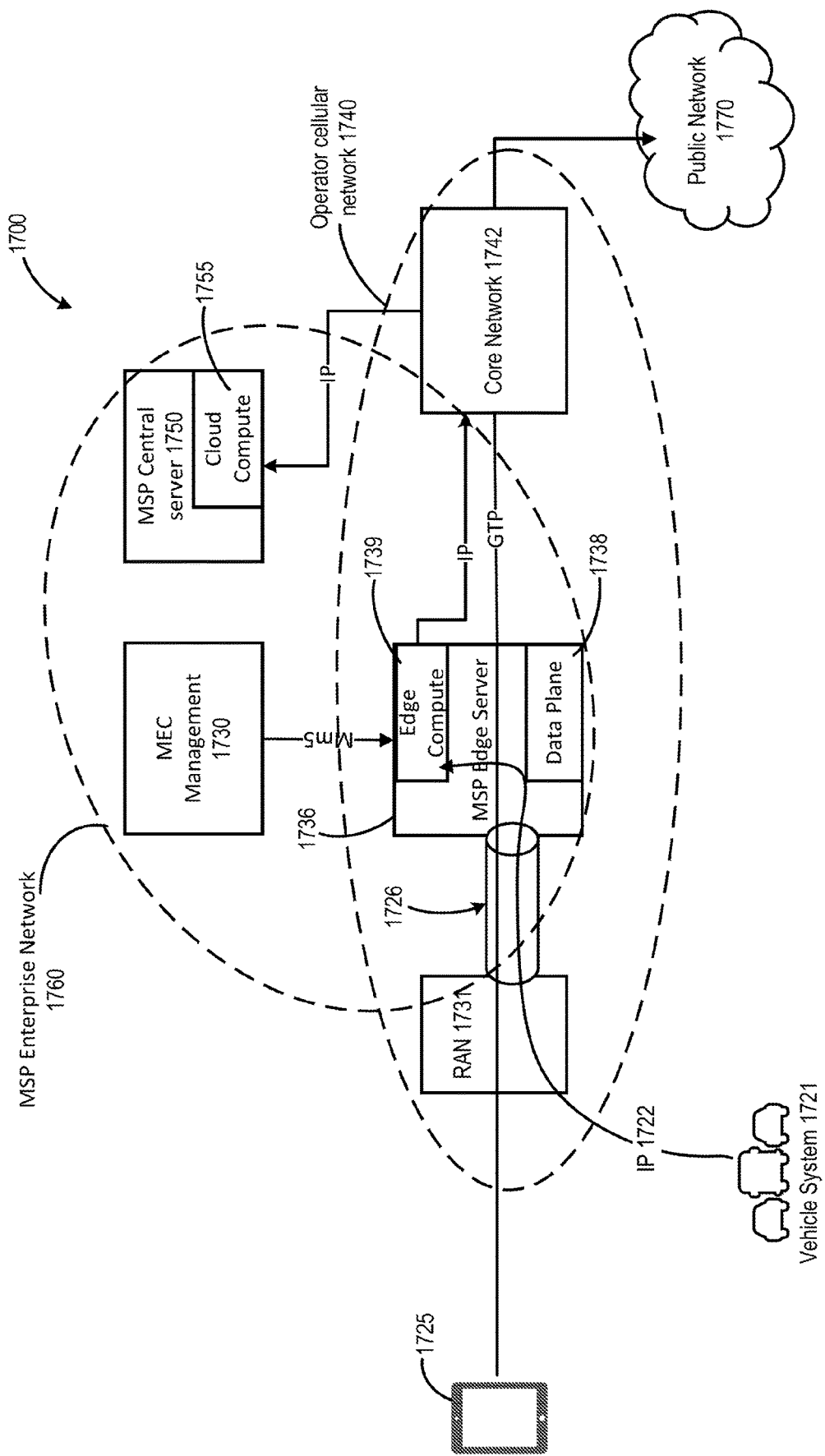
FIG. 17 illustrates an example system that integrates AECC and MEC system architectures.

Embodiments herein include the following solutions: apply ETSI MEC data plane for AECC edge server to do traffic handling including re-route to application, duplicated and pass-through; use ETSI MEC management to conduct traffic rule configuration via Mm5 interface; AECC MSP Enterprise network for connecting from Edge server to center server will leverage cellular network IP transport resource, but occupy any GTP tunnel resource of core network to download GTP resource and computing pressure for cellular network. The solutions herein enable ETSI MEC architecture applied into AECC system, and accordingly provide a solution for AECC MSP enterprise network interfacing with cellular network. The solution will strengthen MSP edge server data plane value Referring now to FIG. 17, which illustrates an example system 1300 that integrates an AECC system (see e.g., FIGS. 1 and 2A-2B) and a MEC system (see e.g., FIGS. 12-16). ETSI MEC is regarded as a technology to bring computing capabilities into the edge of a mobile network operator's (MNO) network 1740, which may be the same or similar as the cellular networks 140, 240 (including 240A and 240B) of FIGS. 1 and 2A-2B. It enables the implementation of mobile or multi-access edge applications (e.g., MEC Apps 1336 of FIG. 13) as software-only entities that run on top of a virtualization infrastructure, which is located in or close to the network edge. The system 1700 focuses on what is unique about the mobile edge (or MEC), build upon, and are consistent with, NFV principles, provide flexibility in deployment with 4G and 5G cellular networks 1740, and provides MEC data plane traffic handling. The system 1700 can support re-routing of data to application(s), duplicated and pass-through for vehicle systems 1721 and non-vehicular UEs 1725. The vehicle systems 1721 may be the same or similar to the vehicle system 121 discussed previously with respect to FIGS. 1-11.

The vehicle system 1721 generates AECC Defined Traffic 1722 (e.g., IP traffic 1722), such as HD Map, Intelligent Driving Data, and/or other like traffic such as data related to the AECC services and the MSP edge server compute capabilities discussed previously. This IP traffic 1722 is transmitted to the RAN 1731, which sends/transmits/forwards the traffic 1722 to the edge compute module 1739 in the MSP edge server 1736 via the tunnel 1726. Similarly, the UEs 1725 also generate and transmit IP data to the MSP edge server 1736 via the tunnel 1726 and RAN 1731. The UEs 1725 represents any UE other than AECC vehicle systems 1721. the non-vehicular UEs 1725 may be the same or similar to the UE 125 of FIGS. 1-7, intermediate nodes 1221a-b, and endpoints 1211 of FIG. 12.

The tunnel 1726 may be a GTP tunnel (or a GTP user plane tunnel) with IP data inside. The GTP tunnel 1726 may be used for carrying user data (e.g., IP packets/PDUs) within the core network 1742 to the Public Network 1770 (see e.g., server(s) 1250 of FIG. 12) and between the RAN 1731 and the CN 1742. The user data transported can be packets in any of IPv4, IPv6, or PPP formats, for example.

The system 1700 includes an MSP Enterprise Network 1760, which includes an MSP edge sever 1736. The MSP edge sever 1736 interfaces with cellular CN 1742 in the operator cellular network 1740 via an IP connection rather than a GTP Tunnel (e.g., tunnel 1726 in FIG. 17) to save GTP resources. Additionally, the cellular CN 1742 conducts IP routing to the MSP center server 1750, and in particular, to a cloud compute node 1755 in the MSP center server 1750. It will avoid AECC system to setup a separated network for MSP enterprise network 1760. The MSP edge server 1736, the MSP center server 1750 may be the same or similar as the MSP edge servers 136 and the MSP center server 150 of FIGS. 1 and 2A-2B, respectively.

In system 1700, the MSP edge server 1736 resides at a site close to the RAN 1731 and is in compliance with the ETSI MEC Reference Architecture. The MSP edge server 1736 may be the same or similar as the MSP edge servers 136 of FIGS. 1-11, and the RAN 1731 may be the same or similar as the RAN and/or RAN nodes 1231 of FIG. 12. The data plane 1738 within the MSP edge server 1736 conducts traffic routing action(s) according to traffic rule configuration (e.g., TR 1337B of FIG. 13) via the Mm5 interface/reference point from MEC Management 1730 (see e.g., FIG. 13). The data plane 1738 may be the same or similar as the DP modules 138 discussed previously with respect to FIGS. 1-7, and the MEC management 1730 may be the same or similar as the ME Mgmt 1330 of FIG. 13.

In embodiments, the routing edge computing node 1739 conducts specific traffic flow handling locally, and can forward after-processed traffic data to MSP central server via data plane. In such embodiments, the edge computing node 1739 employs a traffic filter (e.g., TR 1337B of FIG. 13) to perform the traffic flow handling. The traffic filter supports IP address, Port, ProtoType, IPDSRC, etc. In some embodiments, the traffic filter policy of the traffic filter may use different AECC traffic flow(s) and/or use different port(s). In embodiments, the routing action supports forward, drop, pass-through, duplicate, etc. In embodiments, the routing destination support application, local network, and external networks.

Figure 18:
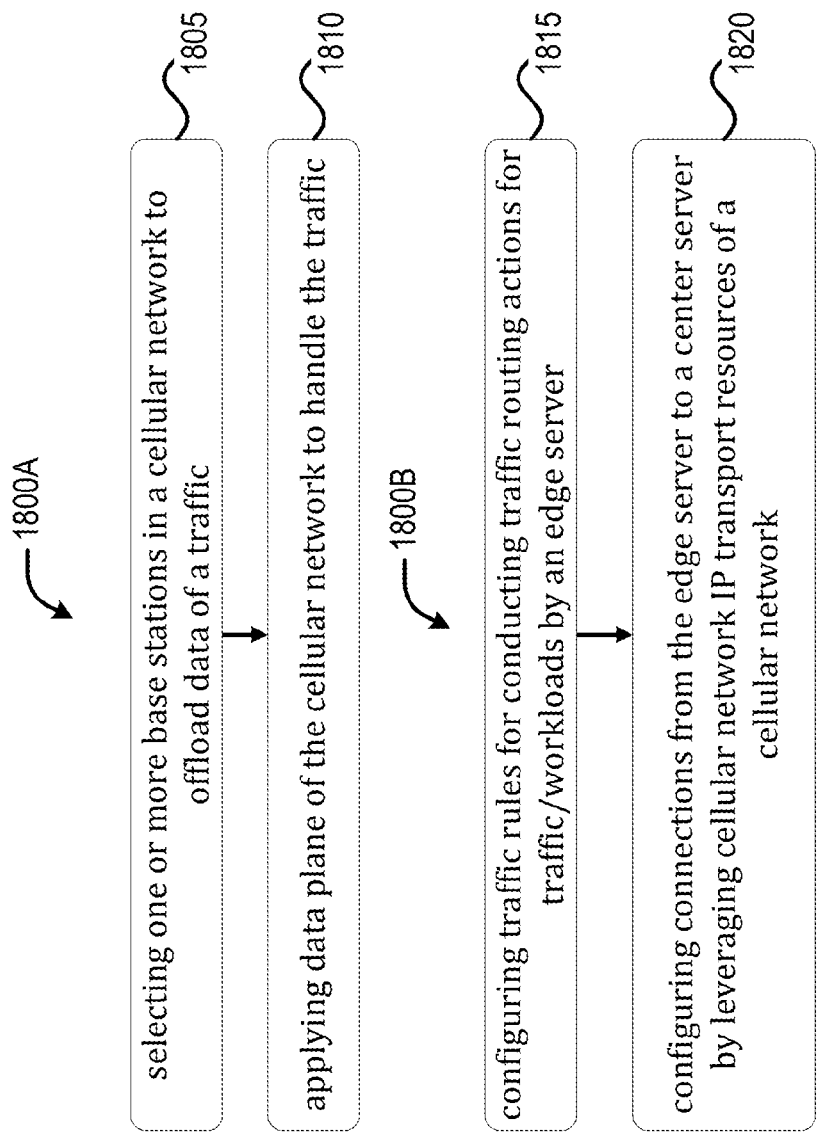
FIG. 18 shows example processes for practicing some aspects of the embodiments discussed herein.

FIG. 18 shows processes 1800A and 1800B for practicing some embodiments discussed herein. Process 1800A begins at operation 1805 where the process selects one or more base stations in a cellular network to offload data of a traffic, and then at operation 1810, the process applies data plane of the cellular network to handle the traffic. Process 1800B begins at operation 1815 where the process configures traffic rules for conducting traffic routing actions for traffic/workloads by an edge server, and then at operation 1820, the process configures connections from the edge server to a center server by leveraging cellular network IP transport resources of a cellular network. In embodiments, the electronic device (s), network(s), system(s), chip(s) or component(s), or portions or implementations thereof, of FIGS. 1-17, and/or some other figure herein, may be configured to perform processes 1800A and/or 1800B. For example, process 1800A may be performed by the MSP edge server 1736 (or portions/components thereof) in the MSP Enterprise Network 1760 of FIG. 17, and process 1800B may be performed by the MSP center server 1750 (or portions/components thereof) in the MSP Enterprise Network 1760 of FIG. 17.

V. Systems and Implementations

Figure 19:
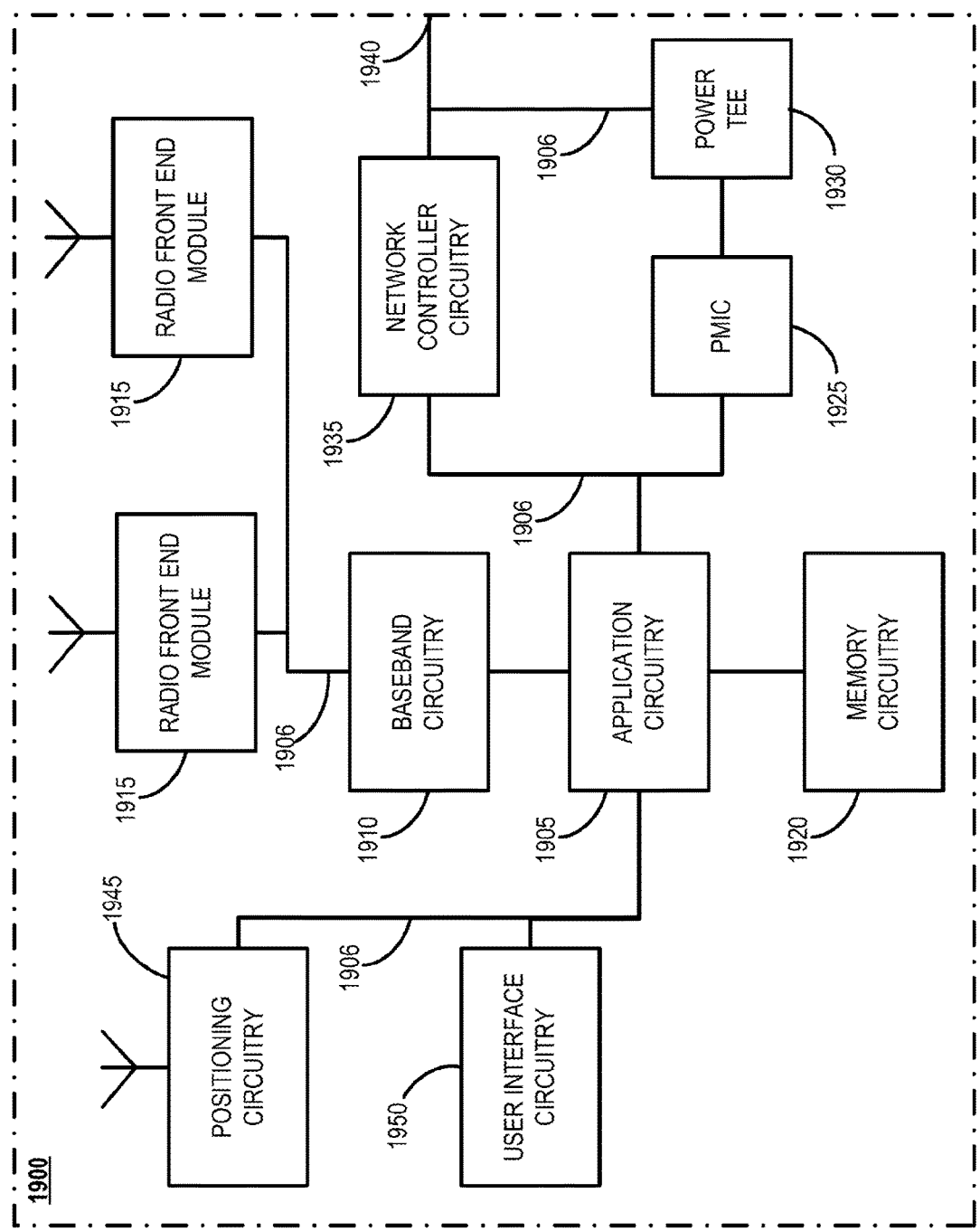
FIG. 19 depicts an example of infrastructure equipment in accordance with various embodiments.

FIG. 19 illustrates an example of infrastructure equipment 1900 in accordance with various embodiments. The infrastructure equipment 1900 (or "system 1900") may be implemented as a base station, radio head, access network node (e.g., the edge nodes 1230 shown and described previously), MSP edge servers 136, MSP center servers 150, MEC servers 1236, server(s) 1250, and/or any other element/device discussed herein. In other examples, the system 1900 could be implemented in or by an intermediate node 1220 or endpoint 1210.

The system 1900 includes application circuitry 1905, baseband circuitry 1910, one or more radio front end modules (RFEMs) 1915, memory circuitry 1920, power management integrated circuitry (PMIC) 1925, power tee circuitry 1930, network controller circuitry 1935, network interface connector 1940, positioning circuitry 1945, and user interface 1950. In some embodiments, the device 1900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1905 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1905 may be coupled with or may include memory/storage elements and may be configured to execute instructions stored in the memory/storage to enable various applications or operating systems to run on the system 1900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1905 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 1905 may comprise, or may be, a special-purpose processor/controller to operate according to the various embodiments herein. As examples, the processor(s) of application circuitry 1905 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1900 may not utilize application circuitry 1905, and instead may include a special-purpose processor/controller to process IP data received from an EPC or 5GC, for example.

In some implementations, the application circuitry 1905 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 1905 may comprise logic blocks or logic fabric, and other interconnected resources that may be programmed to perform various functions, such as the procedures, methods, functions, etc. of the various embodiments discussed herein. In such embodiments, the circuitry of application circuitry 1905 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 1230, intermediate nodes 1220, and/or endpoints 1210 of FIG. 12 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1905 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 1910 may be implemented, for example, as a solder-down substrate including one or more integrated circuits, a single packaged integrated circuit soldered to a main circuit board or a multi-chip module containing two or more integrated circuits. The baseband circuitry 1910 includes one or more processing devices (e.g., baseband processors) to carry out various protocol and radio control functions. Baseband circuitry 1910 may interface with application circuitry of system 1900 for generation and processing of baseband signals and for controlling operations of the RFEMs 1915. The baseband circuitry 1910 may handle various radio control functions that enable communication with one or more radio networks via the RFEMs 1915. The baseband circuitry 1910 may include circuitry such as, but not limited to, one or more single-core or multi-core processors (e.g., one or more baseband processors) or control logic to process baseband signals received from a receive signal path of the RFEMs 1915, and to generate baseband signals to be provided to the RFEMs 1915 via a transmit signal path. In various embodiments, the baseband circuitry 1910 may implement a real-time OS (RTOS) to manage resources of the baseband circuitry 1910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 19, in one embodiment, the baseband circuitry 1910 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 1915 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1915 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1910 and/or RFEMs 1915. The baseband circuitry 1910 may also support radio communications for more than one wireless protocol.

Continuing with the aforementioned embodiment, the baseband circuitry 1910 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 1950 may include one or more user interfaces designed to enable user interaction with the system 1900 or peripheral component interfaces designed to enable peripheral component interaction with the system 1900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1915 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1915, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1910 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1920 may be implemented as one or more of solder down packaged integrated circuits, socketed memory modules and plug-in memory cards. The memory circuitry 1920 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1900, an operating system of infrastructure equipment 1900, one or more applications, and/or for carrying out the embodiments discussed herein. The computational logic may be stored or loaded into memory circuitry 1920 as instructions for execution by the processors of the application circuitry 1905 to provide or perform the functions described herein. The various elements may be implemented by assembler instructions supported by processors of the application circuitry 1905 or high-level languages that may be compiled into such instructions. The permanent copy of the programming instructions may be placed into persistent storage devices of memory circuitry 1920 in the factory during manufacture, or in the field through, for example, a distribution medium (not shown), through a communication interface (e.g., from a distribution server), and/or over-the-air (OTA).

The PMIC 1925 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1930 may provide for electrical power drawn from a network cable to provide both power supply and data connectivity to the infrastructure equipment 1900 using a single cable.

The network controller circuitry 1935 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 1900 via network interface connector 1940 using a physical connection, which may be electrical (commonly referred to as a "copper interconnect"), optical, or wireless. The network controller circuitry 1935 may include one or more dedicated processors and/or FPGAs to communicate using one or more of the aforementioned protocols. In some implementations, the network controller circuitry 1935 may include multiple controllers to provide connectivity to other networks using the same or different protocols. In various embodiments, the network controller circuitry 1935 enables communication with associated equipment and/or with a backend system (e.g., server(s) 1230 of FIG. 12), which may take place via a suitable gateway device.

The positioning circuitry 1945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1945 may include a Micro-Technology for Positioning, Navigation, and Timing (Micro-PNT) IC that uses a master timing clock to perform position tracking/estimation without GNSS assistance. The positioning circuitry 1945 may also be part of, or interact with, the baseband circuitry 1910 and/or RFEMs 1915 to communicate with the nodes and components of the positioning network. The positioning circuitry 1945 may also provide position data and/or time data to the application circuitry 1905, which may use the data to synchronize operations with various other infrastructure equipment, or the like.

The components shown by FIG. 19 may communicate with one another using interface circuitry 1906 or interconnect (IX) 1906, which may include any number of bus and/or interconnect (IX) technologies such as industry standard architecture (ISA), extended ISA (EISA), inter-integrated circuit ($I^2C$), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

Figure 20:
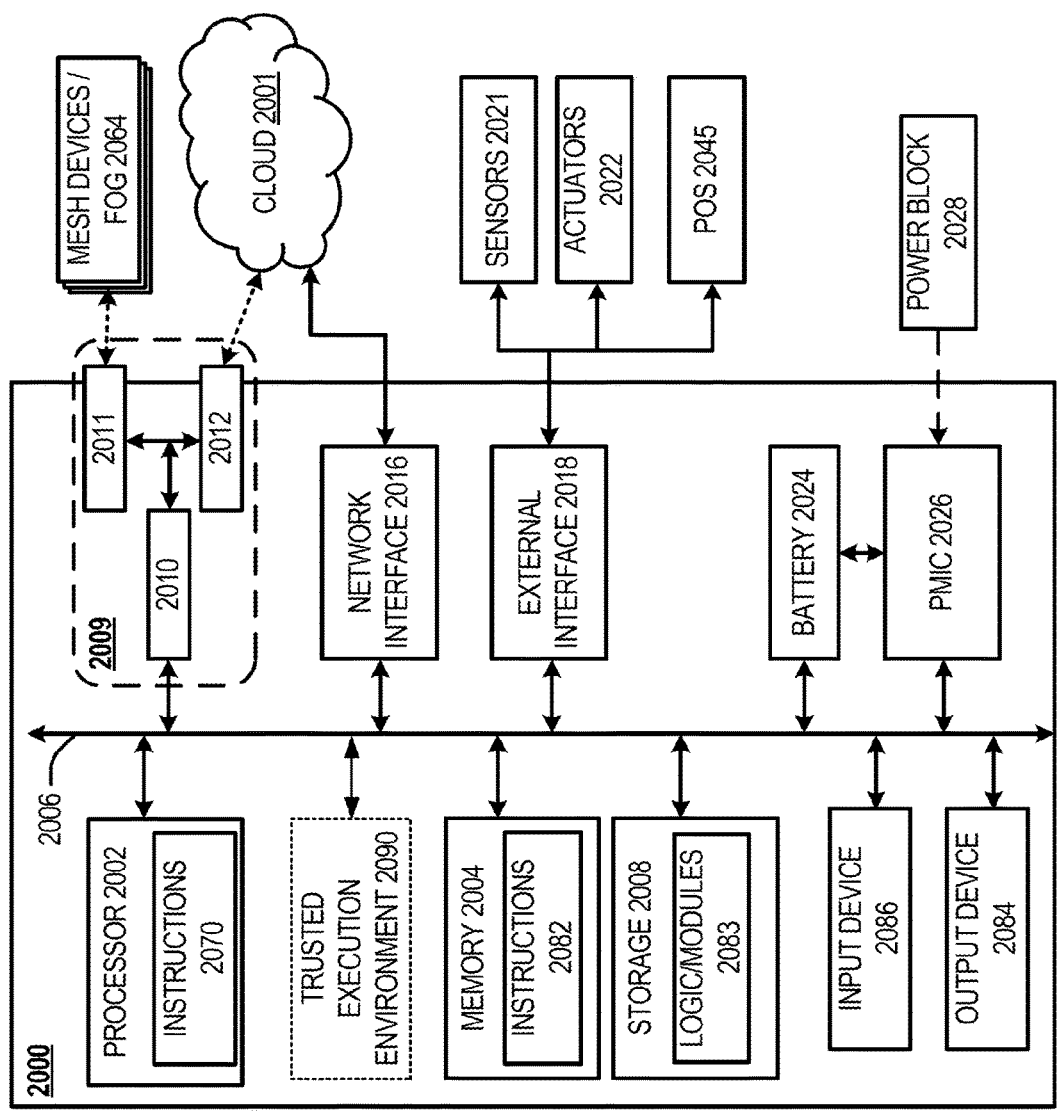
FIG. 20 depicts example components of a computer platform in accordance with various embodiments.

FIG. 20 illustrates an example of an platform 2000 (also referred to as "system 2000," "device 2000," "appliance 2000," or the like) in accordance with various embodiments. In embodiments, the platform 2000 may be suitable for use as intermediate nodes 1220 and/or endpoints 1210 of FIG. 12, and/or any other element/device discussed herein with regard any other figure shown and described herein. Platform 2000 may also be implemented in or as a server computer system or some other element, device, or system discussed herein. The platform 2000 may include any combinations of the components shown in the example. The components of platform 2000 may be implemented as integrated circuits (ICs), portions thereof, discrete electronic devices, or other modules, logic, hardware, software, firmware, or a combination thereof adapted in the computer platform 2000, or as components otherwise incorporated within a chassis of a larger system. The example of FIG. 20 is intended to show a high level view of components of the computer platform 2000. However, some of the components shown may be omitted, additional components may be present, and different arrangement of the components shown may occur in other implementations.

The platform 2000 includes processor circuitry 2002. The processor circuitry 2002 includes circuitry such as, but not limited to one or more processor cores and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (I/O), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 2002 may include one or more hardware accelerators, which may be microprocessors, programmable processing devices (e.g., FPGA, ASIC, etc.), or the like. The one or more hardware accelerators may include, for example, computer vision (CV) and/or deep learning (DL) accelerators. In some implementations, the processor circuitry 2002 may include on-chip memory circuitry, which may include any suitable volatile and/or nonvolatile memory, such as DRAM, SRAM, EPROM, EEPROM, Flash memory, solid-state memory, and/or any other type of memory device technology, such as those discussed herein.

The processor(s) of processor circuitry 2002 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 2002 may be coupled with or may include memory/storage and may be configured to execute instructions stored in the memory/storage to enable various applications or operating systems to run on the platform 2000. In these embodiments, the processors (or cores) of the processor circuitry 2002 is configured to operate application software to provide a specific service to a user of the platform 2000. In some embodiments, the processor circuitry 2002 may be a special-purpose processor/controller to operate according to the various embodiments herein.

As examples, the processor circuitry 2002 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, Calif. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 2002 may be a part of a system on a chip (SoC), System-in-Package (SiP), a multi-chip package (MCP), and/or the like, in which the processor circuitry 2002 and other components are formed into a single integrated circuit, or a single package, such as the Edison™ or Galileo™ SoC boards from Intel® Corporation. Other examples of the processor circuitry 2002 are mentioned elsewhere in the present disclosure.

Additionally or alternatively, processor circuitry 2002 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 2002 may comprise logic blocks or logic fabric including and other interconnected resources that may be programmed to perform various functions, such as the procedures, methods, functions, etc. of the various embodiments discussed herein. In such embodiments, the circuitry of processor circuitry 2002 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 2002 may communicate with system memory circuitry 2004 over an interconnect 2006 (e.g., a bus). Any number of memory devices may be used to provide for a given amount of system memory. As examples, the memory circuitry 2004 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 2004 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 2004 may also comprise persistent storage devices, which may be temporal and/or persistent storage of any type, including, but not limited to, non-volatile memory, optical, magnetic, and/or solid state mass storage, and so forth.

The individual memory devices of memory circuitry 2004 may be implemented as one or more of solder down packaged integrated circuits, socketed memory modules, and plug-in memory cards. The memory circuitry 2004 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 2004. In embodiments, the memory circuitry 2004 may be disposed in or on a same die or package as the processor circuitry 2002 (e.g., a same SoC, a same SiP, or soldered on a same MCP as the processor circuitry 2002).

To provide for persistent storage of information such as data, applications, operating systems (OS), and so forth, a storage circuitry 2008 may also couple to the processor circuitry 2002 via the interconnect 2006. In an example, the storage circuitry 2008 may be implemented via a solid-state disk drive (SSDD). Other devices that may be used for the storage circuitry 2008 include flash memory cards, such as SD cards, microSD cards, xD picture cards, and the like, and USB flash drives. In low power implementations, the storage circuitry 2008 may be on-die memory or registers associated with the processor circuitry 2002. However, in some examples, the storage circuitry 2008 may be implemented using a micro hard disk drive (HDD). Further, any number of new technologies may be used for the storage circuitry 2008 in addition to, or instead of, the technologies described, such resistance change memories, phase change memories, holographic memories, or chemical memories, among others.

The storage circuitry 2008 store computational logic 2083 (or "modules 2083") in the form of software, firmware, or hardware commands to implement the techniques described herein. The computational logic 2083 may be employed to store working copies and/or permanent copies of computer programs, or data to create the computer programs, for the operation of various components of platform 2000 (e.g., drivers, etc.), an operating system of platform 2000, one or more applications, and/or for carrying out the embodiments discussed herein. The computational logic 2083 may be stored or loaded into memory circuitry 2004 as instructions 2082, or data to create the instructions 2082, for execution by the processor circuitry 2002 to provide the functions described herein. The various elements may be implemented by assembler instructions supported by processor circuitry 2002 or high-level languages that may be compiled into such instructions (e.g., instructions 2070, or data to create the instructions 2070). The permanent copy of the programming instructions may be placed into persistent storage devices of storage circuitry 2008 in the factory or in the field through, for example, a distribution medium (not shown), through a communication interface (e.g., from a distribution server (not shown)), or over-the-air (OTA).

In an example, the instructions 2082 provided via the memory circuitry 2004 and/or the storage circuitry 2008 of FIG. 20 are embodied as one or more non-transitory computer readable storage media (see e.g., NTCRSM 1502 of FIG. 15) including program code, a computer program product or data to create the computer program, with the computer program or data, to direct the processor circuitry 2002 of platform 2000 to perform electronic operations in the platform 2000, and/or to perform a specific sequence or flow of actions, for example, as described with respect to the flowchart(s) and block diagram(s) of operations and functionality depicted previously. The processor circuitry 2002 accesses the one or more non-transitory computer readable storage media over the interconnect 2006. In an example, the instructions 2070 on the processor circuitry 2002 (separately, or in combination with the instructions 2082 and/or logic/modules 2083 stored in computer-readable storage media) may configure execution or operation of a trusted execution environment (TEE) 2090. The TEE 2090 operates as a protected area accessible to the processor circuitry 2002 to enable secure access to data and secure execution of instructions. In some embodiments, the TEE 2090 may be a physical hardware device that is separate from other components of the system 2000 such as a secure-embedded controller, a dedicated SoC, or a tamper-resistant chipset or microcontroller with embedded processing devices and memory devices. In other embodiments, the TEE 2090 may be implemented as secure enclaves, which are isolated regions of code and/or data within the memory of the system 2000. Only code executed within a secure enclave may access data within the same secure enclave, and the secure enclave may only be accessible using the secure application (which may be implemented by an application processor or a tamper-resistant microcontroller). Various implementations of the TEE 2090, and an accompanying secure area in the processor circuitry 2002 or the memory circuitry 2004 and/or storage circuitry 2008 may be provided, for instance, through use of Intel® Software Guard Extensions (SGX) or ARM® TrustZone® hardware security extensions; a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, the IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. Other aspects of security hardening, hardware roots-of-trust, and trusted or protected operations may be implemented in the device 2000 through the TEE 2090 and the processor circuitry 2002.

Although the instructions 2082 are shown as code blocks included in the memory circuitry 2004 and the computational logic 2083 is shown as code blocks in the storage circuitry 2008, it should be understood that any of the code blocks may be replaced with hardwired circuits, for example, built into an FPGA, ASIC, or some other suitable circuitry.

For example, where processor circuitry 2002 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 2004 and/or storage circuitry 2008 may store program code of an operating system (OS), which may be a general purpose OS or an OS specifically written for and tailored to the computing platform 2000. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AGO, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 2000, attached to the platform 2000, or otherwise communicatively coupled with the platform 2000. The drivers may include individual drivers allowing other components of the platform 2000 to interact or control various input/output (I/O) devices that may be present within, or connected to, the platform 2000. For example, the drivers may include a display driver to control and allow access to a display device, a touchscreen driver to control and allow access to a touchscreen interface of the platform 2000, sensor drivers to obtain sensor readings of sensor circuitry 2021 and control and allow access to sensor circuitry 2021, actuator drivers to obtain actuator positions of the actuators 2022 and/or control and allow access to the actuators 2022, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from trusted execution environment (TEE) 2090.

The components may communicate over the interconnect 2006. The interconnect 2006 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2006 may be a proprietary bus, for example, used in a SoC based system. Other bus systems may be included, such as an I²C interface, an SPI interface, point-to-point interfaces, and a power bus, among others.

The interconnect 2006 couples the processor circuitry 2002 to the communication circuitry 2009 for communications with other devices. The communication circuitry 2009 is a hardware element, or collection of hardware elements, used to communicate over one or more networks (e.g., cloud 2001) and/or with other devices (e.g., mesh devices/fog 2064). The communication circuitry 2009 includes baseband circuitry 2010 (or "modem 2010") and radiofrequency (RF) circuitry 2011 and 2012.

The baseband circuitry 2010 includes one or more processing devices (e.g., baseband processors) to carry out various protocol and radio control functions. Baseband circuitry 2010 may interface with application circuitry of platform 2000 (e.g., a combination of processor circuitry 2002, memory circuitry 2004, and/or storage circuitry 2008) for generation and processing of baseband signals and for controlling operations of the RF circuitry 2011 or 2012. The baseband circuitry 2010 may handle various radio control functions that enable communication with one or more radio networks via the RF circuitry 2011 or 2012. The baseband circuitry 2010 may include circuitry such as, but not limited to, one or more single-core or multi-core processors (e.g., one or more baseband processors) or control logic to process baseband signals received from a receive signal path of the RF circuitry 2011 and/or 2012, and to generate baseband signals to be provided to the RF circuitry 2011 or 2012 via a transmit signal path. In various embodiments, the baseband circuitry 2010 may implement a real-time OS (RTOS) to manage resources of the baseband circuitry 2010, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 20, in one embodiment, the baseband circuitry 2010 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G)/NR protocol entities when the communication circuitry 2009 is a cellular radiofrequency communication system, such as millimeter wave (mmWave) communication circuitry or some other suitable cellular communication circuitry. In the first example, the protocol processing circuitry 2002 would operate MAC, RLC, PDCP, SDAP, RRC, and NAS functions. In a second example, the protocol processing circuitry may operate one or more IEEE-based protocols when the communication circuitry 2009 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 2010 and/or RF circuitry 2011 and 2012. The baseband circuitry 2010 may also support radio communications for more than one wireless protocol.

Continuing with the aforementioned embodiment, the baseband circuitry 2010 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 2009 also includes RF circuitry 2011 and 2012 to enable communication with wireless networks using modulated electromagnetic radiation through a non-solid medium. Each of the RF circuitry 2011 and 2012 include a receive signal path, which may include circuitry to convert analog RF signals (e.g., an existing or received modulated waveform) into digital baseband signals to be provided to the baseband circuitry 2010. Each of the RF circuitry 2011 and 2012 also include a transmit signal path, which may include circuitry configured to convert digital baseband signals provided by the baseband circuitry 2010 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 2011 or 2012 using metal transmission lines or the like.

The RF circuitry 2011 (also referred to as a "mesh transceiver") is used for communications with other mesh or fog devices 2064. The mesh transceiver 2011 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 2011, configured for a particular wireless communication protocol, may be used for the connections to the mesh devices 2064. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 2011 may communicate using multiple standards or radios for communications at different ranges. For example, the platform 2000 may communicate with close/proximate devices, e.g., within about 10 meters, using a local transceiver based on BLE, or another low power radio, to save power. More distant mesh devices 2064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 2012 (also referred to as a "wireless network transceiver," a "cloud transceiver," or the like) may be included to communicate with devices or services in the cloud 2001 via local or wide area network protocols. The wireless network transceiver 2012 includes one or more radios to communicate with devices in the cloud 2001. The cloud 2001 may be the same or similar to cloud 204 discussed previously. The wireless network transceiver 2012 may be a LPWA transceiver that follows the IEEE 802.15.4, or IEEE 802.15.4g standards, among others, such as those discussed herein. The platform 2000 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2011 and wireless network transceiver 2012, as described herein. For example, the radio transceivers 2011 and 2012 may include an LTE or other cellular transceiver that uses spread spectrum (SPA/SAS) communications for implementing high-speed communications. Further, any number of other protocols may be used, such as WiFi® networks for medium speed communications and provision of network communications.

The transceivers 2011 and 2012 may include radios that are compatible with, and/or may operate according to any one or more of the following radio communication technologies and/or standards including but not limited to those discussed herein.

Network interface circuitry/controller (NIC) 2016 may be included to provide wired communication to the cloud 2001 or to other devices, such as the mesh devices 2064 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 2000 via NIC 2016 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 2016 may include one or more dedicated processors and/or FPGAs to communicate using one or more of the aforementioned network interface protocols. In some implementations, the NIC 2016 may include multiple controllers to provide connectivity to other networks using the same or different protocols. For example, the platform 2000 may include a first NIC 2016 providing communications to the cloud over Ethernet and a second NIC 2016 providing communications to other devices over another type of network.

The interconnect 2006 may couple the processor circuitry 2002 to an external interface 2018 (also referred to as "I/O interface circuitry" or the like) that is used to connect external devices or subsystems. The external devices include, inter alia, sensor circuitry 2021, actuators 2022, and positioning circuitry 2045. The sensor circuitry 2021 may include devices, modules, or subsystems whose purpose is to detect events or changes in its environment and send the information (sensor data) about the detected events to some other a device, module, subsystem, etc. Examples of such sensors 2021 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 2018 connects the platform 2000 to actuators 2022, allow platform 2000 to change its state, position, and/or orientation, or move or control a mechanism or system. The actuators 2022 comprise electrical and/or mechanical devices for moving or controlling a mechanism or system, and converts energy (e.g., electric current or moving air and/or liquid) into some kind of motion. The actuators 2022 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2022 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 2000 may be configured to operate one or more actuators 2022 based on one or more captured events and/or instructions or control signals received from a service provider and/or various client systems.

The positioning circuitry 2045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2045 may include a Micro-Technology for Positioning, Navigation, and Timing (Micro-PNT) IC that uses a master timing clock to perform position tracking/estimation without GNSS assistance. The positioning circuitry 2045 may also be part of, or interact with, the communication circuitry 2009 to communicate with the nodes and components of the positioning network. The positioning circuitry 2045 may also provide position data and/or time data to the application circuitry, which may use the data to synchronize operations with various infrastructure (e.g., radio base stations), for turn-by-turn navigation, or the like. In some examples, various input/output (I/O) devices may be present within, or connected to, the platform 2000, which are referred to as input device circuitry 2086 and output device circuitry 2084 in FIG. 20. The input device circuitry 2086 and output device circuitry 2084 include one or more user interfaces designed to enable user interaction with the platform 2000 and/or peripheral component interfaces designed to enable peripheral component interaction with the platform 2000. Input device circuitry 2086 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 2084 may be included to show information or otherwise convey information, such as sensor readings, actuator position(s), or other like information. Data and/or graphics may be displayed on one or more user interface components of the output device circuitry 2084. Output device circuitry 2084 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2000. The output device circuitry 2084 may also include speakers or other audio emitting devices, printer(s), and/or the like. In some embodiments, the sensor circuitry 2021 may be used as the input device circuitry 2086 (e.g., an image capture device, motion capture device, or the like) and one or more actuators 2022 may be used as the output device circuitry 2084 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc. A battery 2024 may be coupled to the platform 2000 to power the platform 2000, which may be used in embodiments where the platform 2000 is not in a fixed location. The battery 2024 may be a lithium ion battery, a lead-acid automotive battery, or a metal-air battery, such as a zinc-air battery, an aluminum-air battery, a lithium-air battery, a lithium polymer battery, and/or the like. In embodiments where the platform 2000 is mounted in a fixed location, the platform 2000 may have a power supply coupled to an electrical grid. In these embodiments, the platform 2000 may include power tee circuitry to provide for electrical power drawn from a network cable to provide both power supply and data connectivity to the platform 2000 using a single cable.

Power management integrated circuitry (PMIC) 2026 may be included in the platform 2000 to track the state of charge (SoCh) of the battery 2024, and to control charging of the platform 2000. The PMIC 2026 may be used to monitor other parameters of the battery 2024 to provide failure predictions, such as the state of health (SoH) and the state of function (SoF) of the battery 2024. The PMIC 2026 may include voltage regulators, surge protectors, power alarm detection circuitry. The power alarm detection circuitry may detect one or more of brown out (under-voltage) and surge (over-voltage) conditions. The PMIC 2026 may communicate the information on the battery 2024 to the processor circuitry 2002 over the interconnect 2006. The PMIC 2026 may also include an analog-to-digital (ADC) convertor that allows the processor circuitry 2002 to directly monitor the voltage of the battery 2024 or the current flow from the battery 2024. The battery parameters may be used to determine actions that the platform 2000 may perform, such as transmission frequency, mesh network operation, sensing frequency, and the like. As an example, the PMIC 2026 may be a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

A power block 2028, or other power supply coupled to a grid, may be coupled with the PMIC 2026 to charge the battery 2024. In some examples, the power block 2028 may be replaced with a wireless power receiver to obtain the power wirelessly, for example, through a loop antenna in the platform 2000. A wireless battery charging circuit, such as an LTC4020 chip from Linear Technologies of Milpitas, Calif., among others, may be included in the PMIC 2026. The specific charging circuits chosen depend on the size of the battery 2024, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 21:
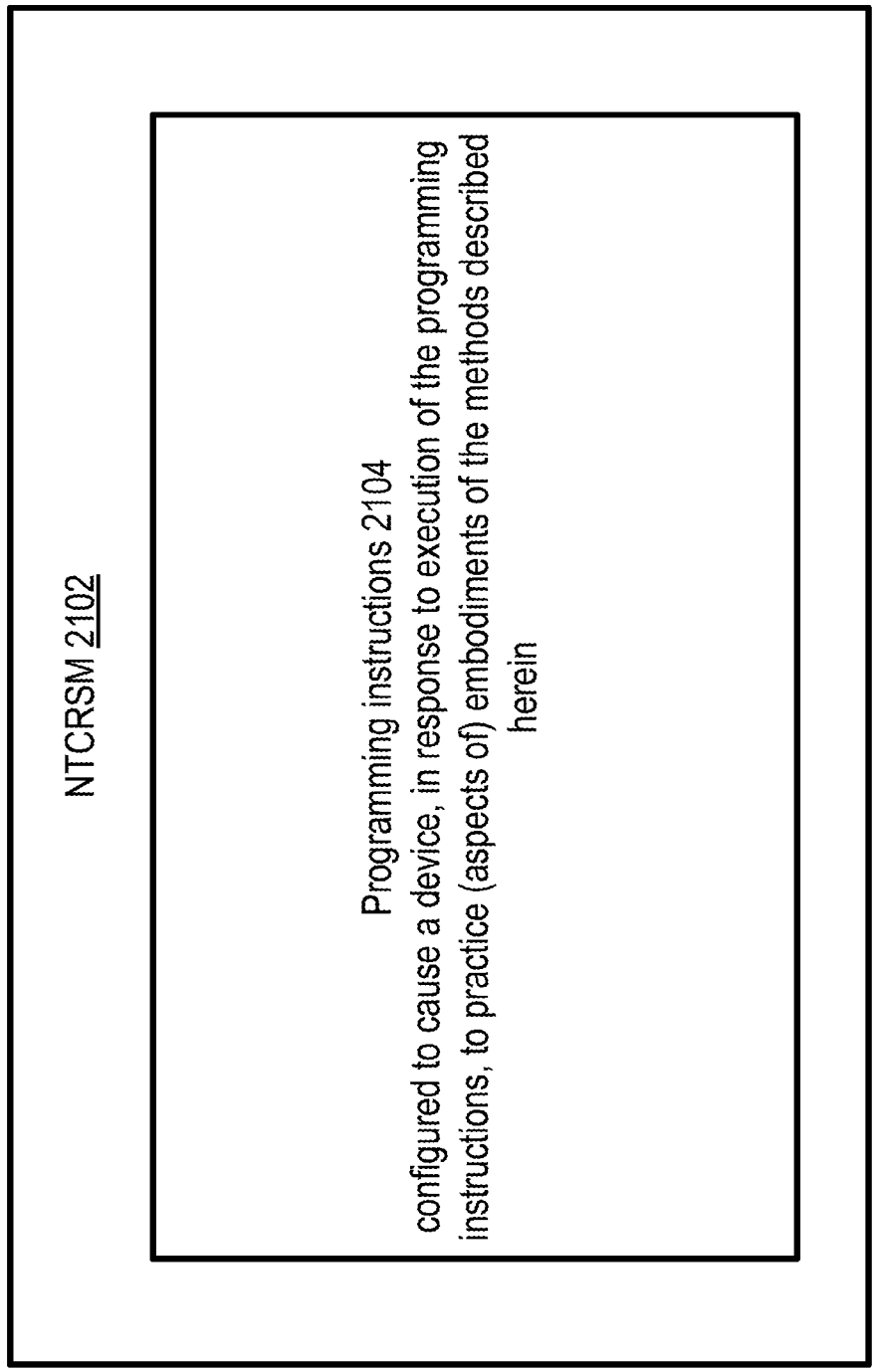
FIG. 21 illustrates an example non-transitory computer-readable storage media according to various embodiments.

Furthermore, the present disclosure may take the form of a computer program product or data to create the computer program, with the computer program or data embodied in any tangible or non-transitory medium of expression having the computer-usable program code (or data to create the computer program) embodied in the medium. FIG. 21 illustrates an example non-transitory computer-readable storage media (NTCRSM) that may be suitable for use to store instructions (or data that creates the instructions) that cause an apparatus (such as any of the devices/components/systems shown and described herein), in response to execution of the instructions by the apparatus, to practice selected aspects of the present disclosure. As shown, NTCRSM 2102 may include a number of programming instructions 2104 (or data to create the programming instructions). Programming instructions 2104 may be configured to enable a device (e.g., any of the devices/components/systems described herein), in response to execution of the programming instructions, to perform various programming operations associated with operating system functions, one or more applications, and/or aspects of the present disclosure. In some embodiments, the programming instructions 2104 (or data to create the programming instructions) to be executed may be in a pre-configured form that may require configuration instructions to install or provision the programming instructions 2104 to an apparatus (such as any of the devices/components/systems described herein). When installed/provisioned, configured and executed, the programming instructions 2104 can complete or perform various programming operations associated with operating system functions, one or more applications, and/or aspects of the present disclosure (including various programming operations associated with FIGS. 3-7).

In alternate embodiments, programming instructions 2104 (or data to create the instructions) may be disposed on multiple NTCRSM 2102. In alternate embodiments, programming instructions 2104 (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 2102 may be embodied by devices described for the storage circuitry 2008 and/or memory circuitry 2004 described with regard to FIG. 20. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 2083, instructions 2082, 2070 discussed previously with regard to FIG. 20) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 2000, partly on the system 2000, as a stand-alone software package, partly on the system 2000 and partly on a remote computer or entirely on the remote computer or server (e.g., system 1900). In the latter scenario, the remote computer may be connected to the system 2000 through any type of network, including a LAN or WAN, or the connection may be made to an external computer (e.g., through the Internet using an Internet Service Provider).

VI. Example Implementations

Illustrative examples of the devices, systems, and methods disclosed herein are provided below. An embodiment of the devices, systems, and methods may include any one or more, and any combination of, the examples described below Example A01 includes a method to manage session and service registration and continuity for moving vehicles, the method comprising: receiving, by a center server, an access network selection message from an individual vehicle user equipment (vUE) via an access network to which the individual vUE is attached; selecting, by the center server, an individual edge server of a plurality of edge servers to which traffic, workloads, and/or computational tasks of the individual vUE should be offloaded; and sending, by the center server, information of the individual edge server to the individual vUE.

Example A02 includes the method of example A01 and/or some other example(s) herein, wherein each of the plurality of edge servers are disposed at an edge of an access network, and each of the plurality of edge servers are arranged to provide computing resources to one or more vUEs.

Example A03 includes the method of examples A01-A02 and/or some other example(s) herein, wherein the selection is based on receipt of an access network selection message from an individual vUE, information contained in the access network selection message, and/or compute capabilities of the individual edge server.

Example A04 includes the method of examples A01-A03 and/or some other example(s) herein, wherein the information of the individual edge server includes one or more of an Internet Protocol (IP) address of the individual edge server and compute capabilities of the individual edge server.

Example A05 includes the method of example A04 and/or some other example(s) herein, wherein the compute capabilities of the individual edge server include one or more of vehicle data analytics capabilities, traffic control services capabilities, content streaming services capabilities, High Definition Map (HDM) processing capabilities, autonomous or intelligent driving service capabilities, vehicle-to-cloud (V2C) capabilities.

Example A06 includes the method of examples A01-A05 and/or some other example(s) herein, further comprising: sending, by the center server, vUE information of the individual vUE to the individual edge server.

Example A07 includes the method of example A06 and/or some other example(s) herein, wherein the vUE information includes one or more of an identity of the individual vUE, location information of the individual vUE, access network registration information of the communication network, and access network identity information of the communication network, wherein the access network registration information includes an attached access network type or radio access technology (RAT) type of the communication network, and wherein the access network identity information includes a public land mobile network identity (PLMNID).

Example A08 includes the method of examples A01-A07 and/or some other example(s) herein, wherein the access network is a first access network, the individual edge server is a first edge server, and the method further comprises: receiving, by the center server, an access network reselection message from the individual vUE via a second access network to which the individual vUE has attached; and selecting, by the center server, a second edge server of the plurality of edge servers to which traffic, workloads, and/or computational tasks of the individual vUE should be offloaded.

Example A09 includes the method of example A08 and/or some other example(s) herein, wherein the selection of the second edge server is based on receipt of the access network reselection message, information contained in the access network reselection message, and/or compute capabilities of the second edge server.

Example A10 includes the method of example A09 and/or some other example(s) herein, further comprising: sending, by the center server, a handover request to the first edge server, the handover request instructing the first edge server to release a UE context of the individual vUE and handover the individual vUE to the second edge server.

Example A11 includes the method of example A10 and/or some other example(s) herein, further comprising: sending, by the center server, information of the second edge server to the individual vUE after the handover request is sent to the first edge server.

Example A12 includes the method of examples A08-A11 and/or some other example(s) herein, wherein the first access network is a cellular network or a wireless local area network (WLAN) and the second access network is a different one of the cellular network or the WLAN; or the first access network is a first cellular network operated by a first mobile network operation (MNO) and the second access network is a second cellular network operated by a second MNO.

Example A13 includes the method of examples A01-A12 and/or some other example(s) herein, wherein the center server comprises one or more computing systems of a cloud computing service or a service provider platform, and the plurality of edge servers are Content Delivery Network (CDN) servers or a Multi-access Edge Computing (MEC) hosts.

Example B01 includes a method to be performed by a vehicular user equipment (vUE), the method comprising: performing an attachment procedure to attach to an access network; generating an access network selection message (AccessNetworkSelectNotify) based on successful performance of the attachment procedure, the AccessNetworkSelectNotify indicating the attachment to the access network; and transmitting the AccessNetworkSelectNotify to a center server via the access network.

Example B02 includes the method of example B01 and/or some other example(s) herein, further comprising: receiving a registration request acceptance message from the center server via the access network, the registration request acceptance message indicating an edge server to which traffic, workloads, and/or computational tasks are to be offloaded.

Example B03 includes the method of example B02 and/or some other example(s) herein, wherein the registration request acceptance message includes edge server information of the indicated edge server, wherein the edge server information includes one or more of an Internet Protocol (IP) address of the individual edge server and compute capabilities of the individual edge server, wherein the compute capabilities of the individual edge server include one or more of vehicle data analytics capabilities, traffic control services capabilities, content streaming services capabilities, High Definition Map (HDM) processing capabilities, autonomous or intelligent driving service capabilities, vehicle-to-cloud (V2C) capabilities.

Example B04 includes the method of examples B01-B03 and/or some other example(s) herein, further comprising: performing a background data transfer procedure with the edge server via the access network.

Example B05 includes the method of examples B02-B04 and/or some other example(s) herein, wherein the access network is a first access network, and the method further comprises: performing an attachment procedure to attach to a second access network based on detection of disconnection of the vUE from the first access network.

Example B06 includes the method of example B05 and/or some other example(s) herein, further comprising: generating an access network reselection message (AccessNetworkReselectNotify) based on successful performance of the attachment procedure to the second access network, the AccessNetworkReselectNotify indicating the attachment to the second access network; and transmitting the AccessNetworkReselectNotify to the center server via the second access network.

Example B07 includes the method of example B06 and/or some other example(s) herein, wherein the registration request acceptance message is a first registration request acceptance message, the edge server is a first edge server, and the method further comprises: receiving a second registration request acceptance message from the center server via the second access network, the second registration request acceptance message indicating a second edge server to which traffic, workloads, and/or computational tasks are to be offloaded.

Example B08 includes the method of example B07 and/or some other example(s) herein, further comprising: resuming a background data transfer procedure with the second edge server via the second access network.

Example B09 includes the UE of examples B05-B08 and/or some other example(s) herein, wherein the vUE comprises a cellular network baseband System-on-Chip (SoC) for attaching to the first or second access network and a WiFi based baseband SoC for attaching to a different one of the first or second network.

Example B10 includes the method of examples B05-B08 and/or some other example(s) herein, wherein the vUE comprises a first cellular network baseband SoC associated with a first mobile network operator (MNO) of the first access network and a second cellular network SoC associated with a second MNO of the second access network, the second MNO being different than the first MNO.

Example B11 includes the method of examples B05-B08 and/or some other example(s) herein, wherein the vUE comprises a cellular network baseband SoC configured with a first subscriber identity module (SIM) for attaching to the first access network and configured with a second SIM for attaching to the second access network.

Example C01 includes a method to be performed by an edge server, the method comprising: receiving a vehicle user equipment (vUE) provisioning message from a center server, the vUE provisioning message indicating a vUE that is to offload traffic, workloads, and/or computational tasks to the edge server and a network to which the vUE is attached; identifying the network to which the vUE is attached based on the vUE provisioning message; and sending a subscription request message to the identified network, the subscription request message for subscribing to receive notifications about vUE network access events and vUE mobility events.

Example C02 includes the method of example C01 and/or some other example(s) herein, further comprising: receiving a notification from the identified network, wherein the notification indicates occurrence of a vUE network access event or a vUE mobility event.

Example C03 includes the method of example C02 and/or some other example(s) herein, wherein, when the notification indicates that the vUE is reachable via the identified network, the method comprises: starting or resuming a background data transfer procedure with the vUE via the identified network.

Example C04 includes the method of examples C02-C03 and/or some other example(s) herein, wherein, when the notification indicates that the vUE is not reachable via the identified network, the method comprises: halting, stopping, or pausing a background data transfer procedure with the vUE via the identified network.

Example C05 includes the method of example C04 and/or some other example(s) herein, further comprising: receiving a handover request from the center server, the handover request indicating a target edge server; and sending a UE context to the target handover.

Example C06 includes the method of examples C01-005 and/or some other example(s) herein, wherein the edge server is a Multi-access Edge Computing (MEC) server or a Content Delivery Network (CDN) server.

Example D01 may include a method for a wireless network, comprising: selecting one or more base stations in a cellular network to offload data of a traffic; and applying data plane of the cellular network to handle the traffic.

Example D02 may include the method of example D01 and/or some other example herein, further comprising: interfacing with a core network of the cellular network via IP connections. Example D03 may include the method of example D01 and/or some other example herein, further comprising: conducting traffic routing actions according to traffic rules configured by a Mobile Edge Computing Management server. Example D04 may include the method of example D03 and/or some other example herein, wherein the traffic routing actions include forward, drop, pass-through, or duplicate. Example D05 may include the method of example D03 and/or some other example herein, wherein the Mobile Edge Computing Management server is connected to the apparatus via Mm5 interface. Example D06 may include the method of example D01 and/or some other example herein, wherein the selecting one or more base stations are configured to select the one or more base stations to meet service requirements on latency and capacity. Example D07 may include the method of any of the examples D01-D06 and/or some other example herein, wherein the method is implemented in or employed by an edge server in an Automotive Edge Computing Consortium (AECC) Managed Service Provider (MSP) Enterprise Network.

Example D08 may include a method for in a wireless network, comprising: configuring traffic rules for conducting traffic routing actions for a traffic by an edge server; and configuring connections from the edge server to a center server by leveraging cellular network IP transport resources of a cellular network.

Example D09 may include the method of example D08 and/or some other example herein, wherein the edge server interacts with the cellular network via IP connections. Example D10 may include the method of example D08 and/or some other example herein, wherein the edge server is coupled to the center server by a cellular core network. Example D11 may include the method of example D08 and/or some other example herein, wherein the traffic routing actions include forward, drop, pass-through, or duplicate. Example D12 may include the method of example D08 and/or some other example herein, wherein the apparatus is coupled to the edge server via Mm5 interface. Example D13 may include the method of example D08 and/or some other example herein, wherein the edge server is to select one or more base stations in the cellular network to offload data of the traffic. Example D14 may include the method of any of the examples D08-D13 and/or some other example herein, wherein the method is implemented in or employed by a Mobile Edge Computing Management server of an Automotive Edge Computing Consortium (AECC) Managed Service Provider (MSP) Enterprise Network. Example D15 may include Edge server resides on site close to RAN and compliance with ETSI MEC Reference Architecture, comprising: a data plane module to conduct traffic routing action according to traffic rule configuration via Mm5 from MEC Management; a Traffic Filter that supports IP Address, Port, ProtoType, IPDSRC . . . etc. (Notes: the traffic filter policy requires different AECC traffic flow use different port); a Routing action that supports forward, drop, pass-through, duplicate . . . etc.; and Routing destination that supports application, local network and external networks.

Example E01 includes a method comprising: mapping or causing to map cellular access information to an automotive edge computing consortium (AECC) service; and performing or causing to perform a mobility service provider (MSP) center server selection.

Example E02 includes a method comprising: mapping or causing to map cellular access information to an automotive edge computing consortium (AECC) service, the cellular access information including access point name (APN) information or data network name (DNN) information; and selecting or causing to select a mobility service provider (MSP) center server.

Example E03 includes the method of examples E01-E02 and/or some other examples herein, wherein the method is performed by a next-generation NodeB (gNB) or a portion thereof.

Example E04 includes an MSP center server selection method comprising: mapping, by a cellular network element, cellular access info (e.g., APN or DNN) to AECC service;

authorizing, by the cellular network element, vehicle system access to an AECC system when there is service agreement between AECC and cellular operator; and performing, by the cellular network element or the vehicle system, MSP center server selection.

Example E05 includes an MSP center server-centric MSP edge server selection method, comprising: collecting, by an MSP center server, information for MSP edge server selection; and selecting, by the MSP center server, an appropriate MSP edge server for a vehicle system based on the collected information. Example E06 includes the method of example E05 and/or some other examples herein, wherein the information for MSP edge server selection includes one or more of a location of the system, location of one or more MSP edge servers, compute capabilities of the one or more MSP edge servers, access networks to which the vehicle system can access, and status information of the access networks including load (or overload) data, congestion data, performance metrics, subscription information, and/or the like. Example E07 includes the method of examples E05-E06 and/or some other examples herein, wherein the method is considered to be an AECC application level solution.

Example E08 includes a cellular assisted MSP edge server selection method, comprising: providing, by a cellular network element, information to assist in edge server selection to a selected MSP center server. Example E09 includes the method of example E08 and/or some other examples herein, further comprising: selecting, by the MSP center server, an appropriate MSP edge server for a vehicle system based on the collected information.

Example E10 includes the method of examples E08-E09 and/or some other examples herein, wherein the information to assist in edge server selection comprises location data and an edge server list. Example E11 includes the method of example E10 and/or some other examples herein, wherein the information to assist in edge server selection comprises the information for MSP edge server selection of example E06. Example E12 includes the method of examples E08-E11 and/or some other examples herein, further comprising: receiving, by the cellular network element from the MSP center server, an instruction to verify the vehicle system's reachability for selection of an edge server based on tariff (or traffic). Example E13 includes the method of examples E08-E12 and/or some other examples herein, further comprising: determining, by the cellular network element, whether a WLAN hotspot is connected to the cellular network based on a location of the vehicle system and speed information, wherein selection of an edge server is to take place in advance to store data requested by the vehicle system.

Example E14 includes a vehicle centric MSP edge server selection method, comprising: obtaining, by a vehicle system, measurements through primary and alternative cellular networks to determine a status of the primary and alternative cellular networks; selecting, by the vehicle system, an MSP edge server based on a selection criteria and the determined status of the primary and alternative cellular networks; and reporting, by the vehicle system, the selected MSP edge server to a serving MSP center server. Example E15 includes the method of example E14 and/or some other examples herein, wherein each option could suggest an edge server to build an edge server list. Example E16 includes the method of example E15 and/or some other examples herein, wherein the selection criteria comprises the information for MSP edge server selection of example E06.

Example Z01 may include an apparatus comprising means to perform one or more elements of a method described in or related to any of examples A01-A13, B01-B11, C01-C06, D01-D15, E01-E14, or any other method or process described herein. Example Z02 may include one or more non-transitory computer-readable media comprising instructions to cause an electronic device, upon execution of the instructions by one or more processors of the electronic device, to perform one or more elements of a method described in or related to any of examples A01-A13, B01-B11, C01-006, D01-D15, E01-E14, or any other method or process described herein. Example Z03 may include an apparatus comprising logic, modules, or circuitry to perform one or more elements of a method described in or related to any of examples A01-A13, B01-B11, C01-006, D01-D15, E01-E14, or any other method or process described herein. Example Z04 may include a method, technique, or process as described in or related to any of examples A01-A13, B01-B11, C01-006, D01-D15, E01-E14, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of examples A01-A13, B01-B11, C01-006, D01-D15, E01-E14, or portions thereof. Example Z06 may include a signal as described in or related to any of examples A01-A13, B01-B11, C01-006, D01-D15, E01-E14, or portions or parts thereof. Example Z07 may include a datagram, packet, frame, segment, protocol data unit (PDU), or message as described in or related to any of examples A01-A13, B01-B11, C01-006, D01-D15, E01-E14, or portions or parts thereof, or otherwise described in the present disclosure.

Example Z08 may include a signal encoded with data as described in or related to any of examples A01-A13, B01-B11, C01-006, D01-D15, E01-E14, or portions or parts thereof, or otherwise described in the present disclosure. Example Z09 may include a signal encoded with a datagram, packet, frame, segment, protocol data unit (PDU), or message as described in or related to any of examples A01-A13, B01-B11, C01-006, D01-D15, E01-E14, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of examples A01-A13, B01-B11, C01-006, D01-D15, E01-E14, or portions thereof. Example Z11 may include a computer program comprising instructions, wherein execution of the program by a processing element is to cause the processing element to carry out the method, techniques, or process as described in or related to any of examples A01-A13, B01-B11, C01-006, D01-D15, E01-E14, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein. Any of the above-described examples may be combined with any other example (or combination of examples), unless explicitly stated otherwise.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

VI. Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code.

Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof.

The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-GSB, ITS-GSC, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element (s) that integrate local data by utilizing a combination of localized network(s) and distributed computation.

The term "edge computing" encompasses many implementations of distributed computing that move processing activities and resources (e.g., compute, storage, acceleration resources) towards the "edge" of the network, in an effort to reduce latency and increase throughput for endpoint devices (e.g., user equipment, etc.). Such edge computing implementations typically involve the offering of such activities and resources in cloud-like services, functions, applications, and subsystems, from one or multiple locations accessible via wireless networks. The references to the "edge" of a network, cluster, domain, system or computing arrangement as used herein may refer to groups or groupings of functional distributed compute elements.

The term "edge compute node" at least in some embodiments refers to an identifiable entity implementing an aspect of edge computing operations, whether part of a larger system, distributed collection of systems, or a standalone apparatus. Additionally or alternatively, the term "edge compute node" may refer to a real-world, logical, or virtualized implementation of a compute-capable element in the form of a device, gateway, bridge, appliance, system, subsystem, component, etc., whether operating in a server, client, endpoint, or peer node, and whether located at an "edge" of an network or at a connected location further within the network.

As used herein, the term "computational offloading" or "offloading" refers to the transfer of resource intensive computational tasks or workloads from a device, computing system, etc., to an external platform such as an edge node/ server, cluster, grid, cloud computing service, and/or the like.

As used herein, the term "workload" may refer to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by the processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like.

Various algorithms may be used to determine a workload and/or workload characteristics, which may be based on any of the aforementioned workload types.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A computing system to manage session and service registration and continuity for moving vehicles, the computing system comprising:
   network interface circuitry arranged to communicatively couple the computing system with a plurality of Mobility Service Provider (MSP) edge servers, wherein:
   each of the plurality of MSP edge servers are disposed at an edge of a first communication network or a second communication network, and
   each of the plurality of MSP edge servers are arranged to provide computing resources to one or more vehicle user equipment (vUEs), and wherein the network interface circuitry is arranged to:
   receive an access network selection message from an individual vUE via the first communication network to which the individual vUE is attached,
   send, to the individual vUE, information of a first MSP edge server of the plurality of MSP edge servers to which workloads of the individual vUE should be offloaded,
   receive an access network reselection message from the individual vUE via the second communication network to which the individual vUE has attached,
   send a handover request to the first MSP edge server, wherein the handover request is to instruct the first MSP edge server to release a UE context of the individual vUE and handover the individual vUE to a second MSP edge server; and
   processing circuitry connected to the network interface circuitry, wherein the processing circuitry is arranged to operate an edge node allocation module to:
   select the first MSP edge server based on receipt of the access network selection message; and
   select the second MSP edge server of the plurality of MSP edge servers to which workloads of the individual vUE should be offloaded, wherein the selection of the second MSP edge server is based on receipt of the access network reselection message from the individual vUE.

2. The computing system of claim 1, wherein the information of the first MSP edge server includes one or more of an Internet Protocol (IP) address of the first MSP edge server and compute capabilities of the first MSP edge server.

3. The computing system of claim 2, wherein the compute capabilities of the first MSP edge server include one or more of vehicle data analytics capabilities, traffic control services capabilities, content streaming services capabilities, High Definition Map (HDM) processing capabilities, autonomous or intelligent driving service capabilities, and vehicle-to-cloud (V2C) capabilities.

4. The computing system of claim 1, wherein the network interface circuitry is arranged to send vUE information of the individual vUE to the first MSP edge server.

5. The computing system of claim 4, wherein the vUE information includes one or more of an identity of the individual vUE, location information of the individual vUE, access network registration information of the first or second communication network, and access network identity information of the first or second communication network, wherein the access network registration information includes an attached access network type or radio access technology (RAT) type of the first or second communication network, and wherein the access network identity information includes a public land mobile network identity (PLMNID).

6. The computing system of claim 1, wherein the network interface circuitry is arranged to send information of the second MSP edge server to the individual vUE after the handover request is sent to the first MSP edge server.

7. The computing system of claim 6, wherein the first communication network is a cellular network or a wireless local area network (WLAN) and the second communication network is a different one of the cellular network or the WLAN; or the first communication network is a first cellular network operated by a first mobile network operation (MNO) and the second communication network is a second cellular network operated by a second MNO.

8. The computing system of claim 1, wherein the computing system is part of a cloud computing service or a service provider platform, and the first or second MSP edge server is a Content Delivery Network (CDN) server or a Multi-access Edge Computing (MEC) host.

9. A user equipment (UE) disposed in a vehicle to operate in an edge computing network, the UE comprising:
   baseband circuitry arranged to perform a first attachment procedure according to a first wireless communication protocol to attach to a first access network and perform a second attachment procedure according to a second wireless communication protocol to attach to a second access network; and
   application circuitry communicatively coupled with the baseband circuitry, the application circuitry arranged to operate an edge networking application to:
   generate a first access network selection message based on successful performance of the first attachment procedure, wherein the first access network selection message indicates the attachment to the first access network,
  provide the first access network selection message to the baseband circuitry for transmission of the first access network selection message to a Mobility Service Provider (MSP) center server via the first access network,
  receive, from the MSP center server via the baseband circuitry, information of a first MSP edge server to which workloads of the UE should be offloaded,
  generate a second access network selection message based on successful performance of the second attachment procedure, wherein the second access network selection message indicates the attachment to the second access network, and
  provide the second access network selection message to the baseband circuitry for transmission of the second access network selection message to the MSP center server via the second access network,
  wherein the second access network selection message is to cause the MSP center server to send a handover request to the first MSP edge server, and the handover request is to instruct the first MSP edge server to release a UE context of the UE and handover the UE to a second MSP edge server.

10. The UE of claim 9, wherein the application circuitry is arranged to operate the edge networking application to:
  receive a registration request acceptance message from the MSP center server via the first or second access network and the baseband circuitry, wherein the registration request acceptance message indicates the first MSP edge server.

11. The UE of claim 10, wherein:
  the registration request acceptance message includes MSP edge server information of the first MSP edge server, wherein the MSP edge server information includes one or more of an Internet Protocol (IP) address of the first MSP edge server and compute capabilities of the first MSP edge server, and
  the compute capabilities of the first MSP edge server include one or more of vehicle data analytics capabilities, traffic control services capabilities, content streaming services capabilities, High Definition Map (HDM) processing capabilities, autonomous or intelligent driving service capabilities, and vehicle-to-cloud (V2C) capabilities.

12. The UE of claim 9, wherein the application circuitry is arranged to operate a data plane (DP) module to:
  perform a background data transfer procedure with the first MSP edge server via the first access network and the baseband circuitry.

13. The UE of claim 10, wherein the baseband circuitry is first baseband circuitry, and wherein the UE comprises second baseband circuitry arranged to:
  perform the second attachment procedure according to the second wireless communication protocol to attach to the second access network based on detection of disconnection of the first baseband circuitry from the first access network.

14. The UE of claim 13, wherein the application circuitry is arranged to operate the edge networking application to:
  provide the second access network selection message to the second baseband circuitry for transmission of the second access network selection message to the MSP center server via the second access network.

15. The UE of claim 14, wherein the registration request acceptance message is a first registration request acceptance message, and the application circuitry is arranged to operate the edge networking application to:
  receive a second registration request acceptance message from the MSP center server via the second access network and the second baseband circuitry, wherein the second registration request acceptance message indicates the second MSP edge server to which workloads are to be offloaded.

16. The UE of claim 15, wherein the application circuitry is arranged to operate a DP module to:
  resume a background data transfer procedure with the second MSP edge server via the second access network and the second baseband circuitry.

17. The UE of claim 16, wherein:
  the first baseband circuitry is a cellular network baseband System-on-Chip (SoC) and the second baseband circuitry is a WiFi based baseband SoC;
  the first baseband circuitry is the WiFi based baseband SoC and the second baseband circuitry is the cellular network SoC;
  the first baseband circuitry is a first cellular network baseband SoC associated with a first mobile network operator (MNO) and the second baseband circuitry is a second cellular network SoC associated with a second MNO different than the first MNO; or
  the first baseband circuitry is a cellular network baseband SoC configured with a first subscriber identity module (SIM) associated with the first MNO and the second baseband circuitry is the cellular network SoC configured with a second SIM associated with the second MNO different than the first MNO.

18. One or more non-transitory computer readable media (NTCRM) comprising instructions, wherein execution of the instructions by one or more processors of a first Mobility Service Provider (MSP) edge server is to cause the first MSP edge server to:
  receive a vehicle user equipment (vUE) provisioning message from a MSP center server, wherein the vUE provisioning message indicates a vUE that is to offload computational resources to the first MSP edge server and a first network to which the vUE is attached;
  identify the first network to which the vUE is attached based on the vUE provisioning message;
  transmit a subscription request message to the identified first network, wherein the subscription request message is for subscribing to receive notifications about vUE network access events and vUE mobility events from the first network; and
  receive a handover request from the MSP center server, wherein the handover request indicates to handover the vUE to a second MSP edge server and requests release of a UE context associated with the vUE, wherein the handover request is based on an access network reselection message from the vUE indicating that the vUE has attached to a second network.

19. The one or more NTCRM of claim 18, wherein execution of the instructions is to cause the first MSP edge server to:
  receive a notification from the identified first network, wherein the notification indicates an occurrence of a vUE network access event or a vUE mobility event.

20. The one or more NTCRM of claim 19, wherein, when the notification indicates that the vUE is reachable via the identified first network, execution of the instructions is to cause the first MSP edge server to:

start or resume a background data transfer procedure with the vUE via the identified first network.

21. The one or more NTCRM of claim 19, wherein, when the notification indicates that the vUE is not reachable via the identified first network, execution of the instructions is to cause the first MSP edge server to:

halt, stop, or pause a background data transfer procedure with the vUE via the identified first network.

22. The one or more NTCRM of claim 21, wherein execution of the instructions is to cause the first MSP edge server to:

send the UE context to the second MSP edge server.

23. The one or more NTCRM of claim 18, wherein the first MSP edge server is a Multi-access Edge Computing (MEC) server or a Content Delivery Network (CDN) server and the second MSP edge server is a MEC server or a CDN.

* * * * *